US011882165B2

(12) United States Patent
Van Wie et al.

(10) Patent No.: US 11,882,165 B2
(45) Date of Patent: *Jan. 23, 2024

(54) REALTIME KERNEL

(71) Applicant: Sococo, Inc., Austin, TX (US)

(72) Inventors: David Van Wie, Eugene, OR (US); Joseph Altmaier, North Liberty, IA (US)

(73) Assignee: Sococo, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,831

(22) Filed: Mar. 1, 2021

(65) Prior Publication Data

US 2021/0185105 A1    Jun. 17, 2021

Related U.S. Application Data

(60) Continuation of application No. 16/221,334, filed on Dec. 14, 2018, now Pat. No. 10,972,523, which is a
(Continued)

(51) Int. Cl.
*H04L 65/60*      (2022.01)
*H04L 12/00*     (2006.01)
(Continued)

(52) U.S. Cl.
CPC .............. *H04L 65/60* (2013.01); *A63F 13/30* (2014.09); *G06F 3/165* (2013.01); *H04L 12/00* (2013.01); *H04L 65/00* (2013.01); *H04L 65/403* (2013.01); *H04L 65/764* (2022.05); *H04L 65/765* (2022.05); *H04L 67/1059* (2013.01);
(Continued)

(58) Field of Classification Search
CPC ..... H04L 65/60; H04L 65/765; H04L 65/764; H04L 65/00; H04L 65/403; H04L 67/141; H04L 67/34; H04L 67/131; G06F 3/165
See application file for complete search history.

(56) References Cited

U.S. PATENT DOCUMENTS

| 10,972,523 B2* | 4/2021 | Van Wie ................. H04L 65/00 |
| 2009/0276771 A1* | 11/2009 | Nickolov ............ H04L 67/1008 718/1 |
| 2010/0005531 A1* | 1/2010 | Largman ................. G06F 21/53 726/24 |

FOREIGN PATENT DOCUMENTS

JP     2004-30571    *  1/2004  ............. G06F 17/30

OTHER PUBLICATIONS

Notice of Allowance dated Nov. 27, 2020, filed in U.S. Appl. No. 16/221,334, pp. 1-7.
(Continued)

*Primary Examiner* — Kristie D Shingles

(57) ABSTRACT

A realtime kernel supports realtime communications between communicants operating on respective network nodes. The realtime kernel handles the complex tasks of connecting to communicants, virtual areas, and other network resources, switching those connections in response to user inputs, and mixing realtime data streams. The realtime kernel enables developers to focus on developing high-level communications functionality instead of low-level plumbing code. The realtime kernel imposes relatively low computational resource requirements so that realtime communications performance can be achieved using a wide range of computing devices and network connections that currently are available.

19 Claims, 20 Drawing Sheets

Related U.S. Application Data continuation of application No. 14/722,156, filed on May 27, 2015, now Pat. No. 10,158,689, which is a continuation of application No. 14/045,562, filed on Oct. 3, 2013, now Pat. No. 9,055,131, which is a division of application No. 12/630,973, filed on Dec. 4, 2009, now Pat. No. 8,578,000.

(60) Provisional application No. 61/120,372, filed on Dec. 5, 2008.

(51) Int. Cl.
| | | |
|---|---|---|
| *H04N 21/00* | (2011.01) | |
| *H04L 65/00* | (2022.01) | |
| *H04L 65/403* | (2022.01) | |
| *H04L 67/00* | (2022.01) | |
| *A63F 13/30* | (2014.01) | |
| *H04L 65/75* | (2022.01) | |
| *G06F 3/16* | (2006.01) | |
| *H04L 67/104* | (2022.01) | |
| *H04L 67/141* | (2022.01) | |
| *H04L 67/131* | (2022.01) | |

(52) U.S. Cl.
CPC ............ *H04L 67/141* (2013.01); *H04L 67/34* (2013.01); *H04N 21/00* (2013.01); *H04L 67/131* (2022.05)

(56) References Cited

OTHER PUBLICATIONS

Terminal Disclaimer Filed (Electronic) Oct. 28, 2020, filed in U.S. Appl. No. 16/221,334, pp. 1-2.
Terminal Disclaimer Approved (Electronic) Oct. 28, 2020, filed in U.S. Appl. No. 16/221,334, p. 1.
Response to Non-Final Office Action dated Oct. 28, 2020, filed in U.S. Appl. No. 16/221,334, pp. 1-8.
Non-Final Rejection dated May 28, 2020, filed in U.S. Appl. No. 16/221,334, pp. 1-8.
Response to Non-Final Office Action dated Feb. 24, 2020, filed in U.S. Appl. No. 16/221,334, pp. 1-13.
Non-Final Rejection dated Aug. 22, 2019, filed in U.S. Appl. No. 16/221,334, pp. 1-9.

\* cited by examiner

REALTIME KERNEL

CROSS-REFERENCE TO RELATED APPLICATIONS

Under 35 U.S.C. § 119(e), this application claims the benefit of U.S. Provisional Application No. 61/120,372, filed Dec. 5, 2008, the entirety of which is incorporated herein by reference.

This application also relates to the following co-pending patent applications, the entirety of each of which is incorporated herein by reference:

U.S. patent application Ser. No. 12/418,243, filed Apr. 3, 2009;

U.S. patent application Ser. No. 11/923,629, filed Oct. 24, 2007; and

U.S. patent application Ser. No. 11/923,634, filed Oct. 24, 2007.

BACKGROUND OF THE INVENTION

Interest in avatar-based virtual reality communications systems has grown with the increased availability of computing systems that have high-processing-power and high-bandwidth network connections. A primary goal of such a virtual reality system is to create a virtual space in which users can interact and communicate using realtime data streams, such as audio, video and text chat streams. The virtual space typically is defined by a computer graphics specification that describes the visual geometry of the space, the colors and textures that are mapped onto the visual geometry, the collision properties that control how users maneuver within the space, and auditory properties, such as, reverberation and sound absorption properties, of the space.

In a typical virtual reality system, the users communicate with each other from respective computers through an interface that is a source, a sink, or both a source and a sink of one or more of the realtime data streams that are supported by the system. A virtual reality software application running on each of the user's computers configures its own audio and graphic rendering based on position information describing the positions of avatars in the virtual space. The position information typically is received either directly from the other users' computers or indirectly from a central presence server. By default, the virtual reality software application typically connects each source represented in the virtual space to every sink represented in the virtual space, subject to conditions specified in global switching rules, local user preferences, and the properties of objects within the virtual space. These conditions typically are specified in terms of relative distances between objects. For example, some virtual reality software applications are configured so that realtime data stream connections are not established if the separation distance between avatars exceeds a maximum threshold distance.

A successful virtual reality communications system typically should have relatively low computational resource requirements so that realtime communications performance can be achieved using currently available computing devices and network bandwidth constraints. In addition, such a system typically should be implemented in a way that encourages area designers to develop virtual areas that increase the adoption of the system by users.

BRIEF SUMMARY OF THE INVENTION

In one aspect, the invention features a method in accordance with which one or more stream handling instructions are received at a local network node from a remote network node. The one or more stream handling instructions include a specification of a stream handler for processing at least one realtime data stream. At the local network node, a stream handler is created in accordance with the specification. A resultant data stream is produced at the local network node. In this process, a realtime data stream is processed through the created stream handler.

In another aspect, the invention features a method in accordance with which a specification of a realtime stream handler is parsed from one or more stream handling instructions. In this process, an input source identifier, an output sink identifier, and a respective identifier of each of one or more data processing objects are parsed from the one or more stream handing instructions. Realtime stream handling objects corresponding to respective ones of the identifiers are instantiated, A directed graph that includes ones of the instantiated realtime stream handling objects are created in accordance with the specification. A realtime data stream is received from an input source corresponding to the input source identifier. A resultant data stream is produced at an output sink corresponding to the output sink identifier. In this process, the realtime data stream is processed through the directed graph.

In another aspect, the invention features a method in accordance with which at least one realtime data stream connection is established between a local network node and at least one remote network node. At the local network node, at least one realtime data stream that is sourced by the remote network node is processed. In this process, the at least one realtime data stream is processed through one or more realtime data processing operations to produce a resultant data stream. The processing is monitored. In response to a determination based on the monitoring that the processing deviates from a performance target, the processing is modified in accordance with a realtime performance targeting routine.

In another aspect, the invention features a method in accordance with which, on a local network node, a first session is established with a remote network node on a transport stream in accordance with a connectionless transport protocol. On behalf of one or more software entities on the local network node, one or more channels over which data is transmitted between the local network node and the remote network node in the first session automatically are opened. In the first session, a table is maintained. The table identifies open ones of the channels and associates respective attribute values with the identified channels. In response to a determination that the first session has failed, a second session with the remote network node is automatically attempted to be established on a second transport stream in accordance with the connectionless transport protocol. In response to successful establishment of the second session, each of the channels identified in the table automatically is opened.

In another aspect, the invention features a method in accordance with which a list of kernel components that include one or more kernel service components is parsed. All the kernel components in the parsed list that are missing from a local repository are determined. Each of the kernel components determined to be missing is retrieved. Kernel services are instantiated from ones of the kernel service kernel components. The instantiated kernel services are executed to communicate with one or more remote network nodes in a communication environment defined with respect to a virtual area.

In another aspect, the invention features a method that is performed on a local network node. In accordance with this method the local network node is configured to support realtime communications with at least one remote network node in a context defined by a virtual area. The configuration process includes: returning a list comprising identifiers of all plugins associated with the specified API in a plugin database in response to a call to enumerate all plugins that support a specified application programming interface (API); delivering a list comprising identifiers of all variants of the given API that are supported by the identified plugin in response to a call to enumerate variants of a given API supported by an identified one of the plugins; and loading the identified plugin and providing a pointer to an instance of the identified variant in response to a call to instantiate an identified one of the variants of an identified API supported by an identified one of the plugins. At least one realtime data stream connection is established between the configured local network node and the at least one remote network node.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

DETAILED DESCRIPTION OF THE INVENTION

Figure 1:
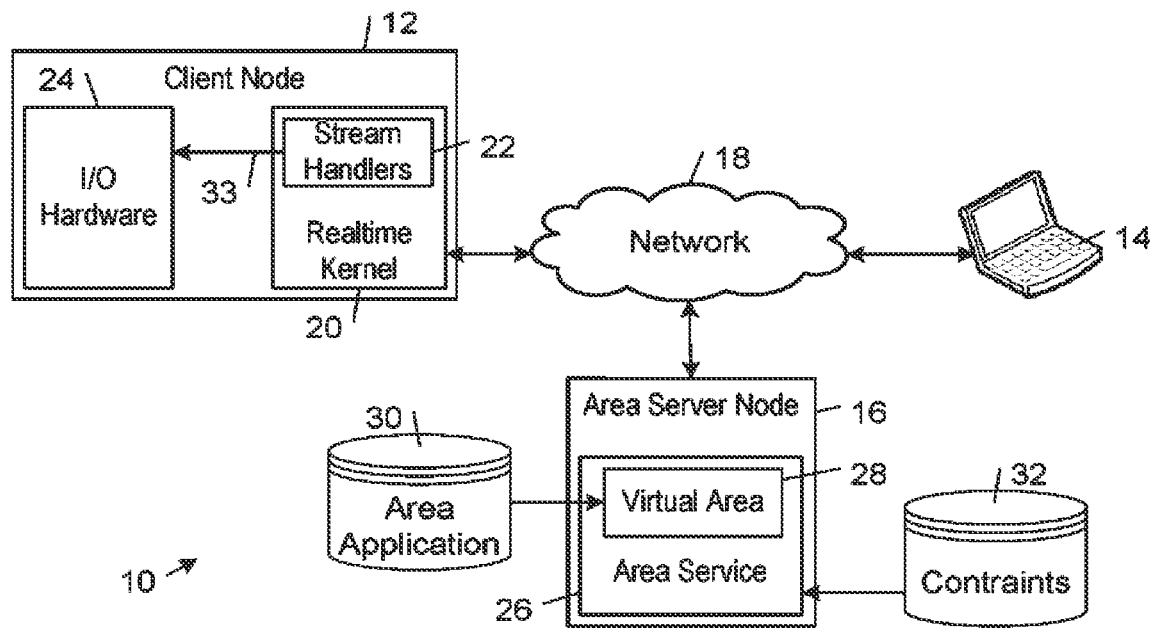
FIG. 1 is a diagrammatic view of an embodiment of a virtual area communication environment that includes a first client network node, a second client network node, and an area server network node 16 that are interconnected by a network.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "computer" is any machine, device, or apparatus that processes data according to computer-readable instructions that are stored on a computer-readable medium either temporarily or permanently.

A "computer operating system" is a software component of a computer that manages and coordinates the performance of tasks and the sharing of software and hardware resources. A "kernel" is a collection of software components that can be invoked by software applications to provide specific functions for accessing computer resources (e.g., CPU, memory, network links, and peripheral resources). A "software application" (also referred to as software, an application, computer software, a computer application, a program, and a computer program) is a set of instructions that a computer can interpret and execute to perform one or more tasks.

An "application programming interface" (or API) is a set of declarations of the functions (or procedures) that an operating system, library, or service provides to support requests made by a software application. An API specifies an interface and the behavior of the identifiers specified in that interface. An implementation of an API refers to the software application code that provides the functionality described by the API. A "computer data file" is a bock of information that durably stores data for use by a software application.

A "service" is a process that performs a task on its own initiative (independently of other processes).

A "manager" is a gateway for a service to perform tasks. A manager does not perform a task on its own initiative.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device, part of a device (e.g., a computer), or software that receives data.

A "data source" (referred to herein simply as a "source") is any of a device, part of a device (e.g., a computer), or software that originates data.

A "network node" (also referred to simply as a "node") is a junction or connection point in a communications network. Exemplary network nodes include, but not limited to, a terminal, a computer, and a network switch. A "server network node" is a host computer on a network that responds to requests for information or service. A "client network node" is a computer on a network that requests information or service from a server. A "network connection" is a link between two communicating network nodes. The term "local network node" refers to a network node that currently is the primary subject of discussion. The term "remote network node" refers to a network node that is connected to a local network node by a network communications link.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "stream mix" is a combination of two or more realtime data streams of the same or semantically consistent type (e.g., audio, video, chat, and motion data). For example, a set of voice streams might be mixed into a single voice stream or a voice stream might be mixed into the audio portion of a video stream.

A "switching rule" is an instruction that specifies a connection or disconnection of one or more realtime data sources and one or more realtime data sinks subject to one or more conditions precedent.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual area communication environment. The virtual area application typically includes definitions of geometry, physics, and realtime switching rules that are associated with one or more zones of the virtual area.

A "virtual communication environment" is a representation of a computer-managed space that includes at least one virtual area and supports realtime communications between communicants.

A "zone" is a region of a virtual area that is associated with at least one switching rule or governance rule. A switching rule controls switching (e.g., routing, connecting, and disconnecting) realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded).

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

In the context of a virtual area, an "object" is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

A "communicant" is a person who communicates or otherwise interacts with other persons over a network connection, where the communication or interaction may or may not occur in the context of a virtual area. A "user" is a communicant who is operating a particular network node that defines a particular perspective for descriptive purposes.

An "area server" is a network node that includes an area network infrastructure service, which administers a virtual area that hosts a virtual area application by managing sessions of client nodes associated with objects in the virtual area.

As used herein, the term "includes" means includes but not limited to, and the term "including" means including but not limited to.

II. INTRODUCTION

The embodiments that are described herein provide a realtime kernel that supports realtime communications between communicants operating on respective network nodes. The realtime kernel handles the complex tasks of connecting to communicants, virtual areas, and other network resources, switching those connections in response to user inputs, and mixing realtime data streams. The realtime kernel enables developers to focus on developing high-level communications functionality instead of low-level plumbing code. The realtime kernel imposes relatively low computational resource requirements so that realtime communications performance can be achieved using a wide range of computing devices and network connections that currently are available.

In some embodiments, the realtime kernel supports remote configuration and execution of audio and graphic rendering engines, as well as switching of realtime data streams in response to instructions (also referred to as definitions) that are received from a remotely hosted virtual area application. In this way, the realtime kernel enables virtual area designers to maintain control over the presentation of immersive virtual communication environments on remote client network nodes, thereby encouraging the development of a wide variety of different types of virtual areas and increasing the number of users who will want to adopt the communications system.

In some embodiments, the realtime kernel monitors the processing of a realtime data stream and adapts the processing based on deviations of the processing from a performance target. In this way, the realtime kernel increases the likelihood that realtime performance can be achieved regardless of the computing environment in which the realtime data stream processing is being performed.

In some embodiments, the realtime kernel implements a stream transport protocol that is efficient in connection and disconnection, as well as in transport. In some of these embodiments, the stream transport protocol provides a connection-oriented, encrypted connection over a connectionless transport protocol (e.g., UDP). The realtime kernel additionally provides between a client application and the transport layer a reconnection mechanism that automatically attempts to reestablish failed connections without intervention by the client application, thereby adding reliability on top of an inherently unreliable communication protocol.

In some embodiments, the realtime kernel has a plugin architecture that allows the functionalities of kernel components to be provided by one or more plugins that can be loaded dynamically on client network nodes. In this way, kernel components can be independently developed and remotely managed and updated. The plugin architecture additionally allows the installation footprint of the realtime kernel to be reduced substantially, thereby allowing the kernel to be installed on a wide range of client devices including those with significant computing and memory resource constraints.

III. OVERVIEW

A. Introduction

FIG. 1 shows an embodiment of an exemplary virtual area communication environment 10 that includes a first client network node 12, a second client network node 14, and an area server network node 16 that are interconnected by a network 18. The first client network node 12 includes an embodiment of a realtime kernel 20 that includes one or more configurable stream handlers 22, and input/output (I/O) hardware 24. The second client network node 14 typically is configured in substantially the same way as the first client network node 12. The area server network node 16 includes an area network infrastructure service 26 (also referred to simply as an "area service") that administers a virtual area 28 by managing sessions of the first and second client nodes 12, 14 in the virtual area 28. The virtual area 28 hosts a virtual area application 30 that includes a description of a virtual area that is used in creating a virtual area communication environment. The area service 26 administers the virtual area 28 in accordance with the virtual area application 30.

In the process of creating the shared virtual area communication environment, the area service 26 remotely configures the realtime kernels in the first and second client network nodes 12, 14 in accordance with the remote virtual area application 30 subject to a set of constraints 32 on the virtual area application 30. The constraints 32 typically include controls on access to the virtual area. The access controls typically are based on one or more of capabilities (where access is granted to communicants or client nodes having proper capabilities or permissions) and an access control list (where access is granted to communicants or client nodes having identities that are on the list). In some embodiments, the constraints 32 are administered by a security network infrastructure service (described below). Client software applications operating on the first and second client network nodes 12, 14 allow communicants to access the shared virtual area communication environment by presenting respective views of the virtual area in accordance with data received from the area service 26 via the realtime kernel 20 and by providing an interface for receiving commands from the communicants. The communicants typically are represented in the virtual area by respective avatars, which move about the virtual area in response to commands that are input by the communicants at their respective network nodes. Each communicant's view of the virtual area typically is presented from the perspective of the communicant's avatar, which increases the level of immersion that is experienced by the communicant. Each communicant typically is able to view any part of the virtual area around his or her avatar. The realtime kernels operating on the first and second client network nodes 12, 14 establish realtime data stream connections with other network nodes sharing the virtual area communication environment based at least in part on the positions of the communicants' avatars in the virtual area.

Figure 2:
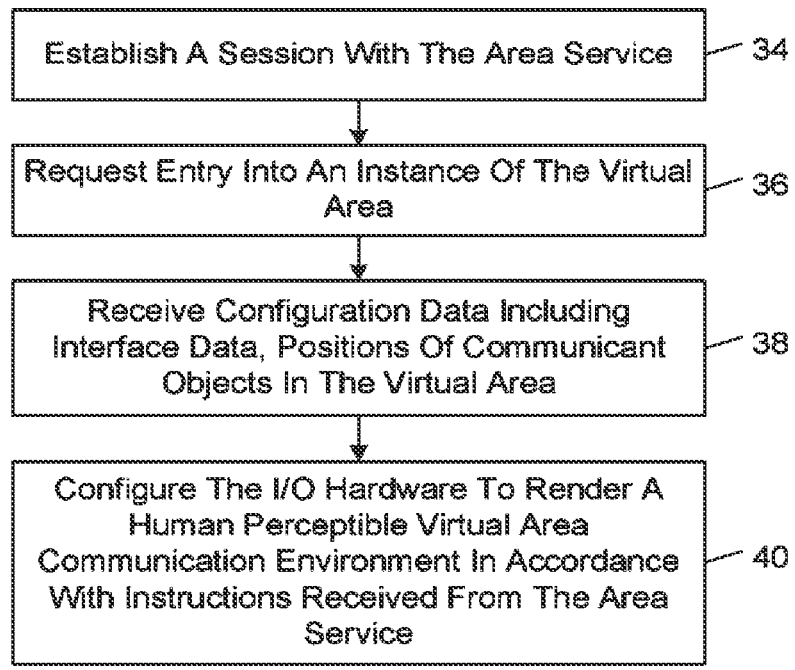
FIG. 2 is a flow diagram of an embodiment of a method that is performed by an embodiment of a realtime kernel.

FIG. 2 shows an exemplary embodiment of a method that is implemented by the realtime kernel 20. In accordance with this method, the realtime kernel 20 establishes a session with the area service 26 (FIG. 2, block 34). Either in response to communicant input or automatically, the realtime kernel 20 requests entry into an instance of the virtual area 28 (FIG. 2, block 36). If the constraints 32 on the communicant's access to the virtual area instance are satisfied, the area service 26 transmits to the realtime kernel 20 configuration data that includes current state information, including the positions of avatars in the virtual area. The realtime kernel 20 receives the configuration data from the area service 26 (FIG. 2, block 38). The realtime kernel 20 configures the I/O hardware 24 to render a human perceptible virtual area communicant environment in accordance with instructions received from the area service 26 (FIG. 2, block 40).

In some embodiments, the process of configuring the I/O hardware 24 involves dynamically configuring at least one of the stream handlers 22 in accordance with the instructions that are received from the remote network node 14 and the position data. For example, the virtual area application 30 may specify one or more audio effects that should be applied to audio streams that are associated with the objects currently in the virtual area, in which case the area service 26 sends to the realtime kernels executing on the first and second client network nodes 12, 14 instructions that configure their respective audio stream handlers to implement the specified effects in accordance with the positions of the respective objects in the virtual area.

The realtime kernel 20 processes realtime data streams that are associated with the communicant objects through each of the configured stream handlers 22 to produce a respective output 33. Depending on its content, the output 33 may be stored on a computer-readable medium or converted into a human-perceptible output by the I/O hardware operating on the first and second network nodes 12, 14. For example, audio output signals are converted into audible sounds by audio hardware (e.g., a sound card and speakers) and graphic output signals are converted into visible images by graphic hardware (e.g., a video card and a display). In some embodiments, the output 33 that is produced by at least one of the stream handlers 22 is processed by one or more downstream software components that in turn produce an output that either may be stored on a computer-readable medium or converted into a human-perceptible output.

B. An Exemplary Operating Environment

The realtime kernel 20 operates in the context of the virtual area communication environment 10, which includes the network 18 and a network infrastructure service environment that includes a number of network infrastructure services including the area service 26. The realtime kernel 20 and the network infrastructure service environment constitute a platform for creating virtual area communication environments for communicants.

1. Network Environment

The network 18 may include any of a local area network (LAN), a metropolitan area network (MAN), and a wide area network (WAN) (e.g., the internet). The network 18 typically includes a number of different computing platforms and transport facilities that support the transmission of a wide variety of different media types (e.g., text, voice, audio, and video) between network nodes.

The realtime kernel 20 typically operates on a network node that includes software and hardware resources which—together with administrative policies, user preferences (including preferences regarding the exportation of the user's presence and the connection of the user to areas and connection targets), and other settings—define a local configuration that influences the administration of realtime connections with other network nodes. The network connections between network nodes may be arranged in a variety of different stream handling topologies, including a peer-to-peer architecture, a server-mediated architecture, and hybrid architectures that combine aspects of peer-to-peer and server-mediated architectures.

Figure 3A:
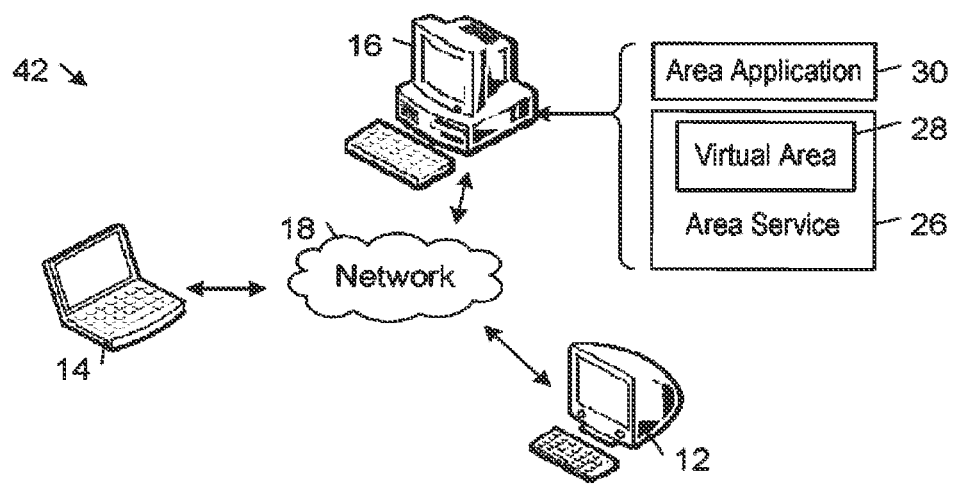
FIG. 3A is diagrammatic view of an embodiment of a virtual area communication environment in which network nodes communicate in a peer-to-peer architecture.

FIG. 3A shows an embodiment 42 of the virtual area communication environment 10 in which the first and second network nodes 12, 14 and the remote network node 16 are interconnected by the communications network 18 in a peer-to-peer architecture. In this architecture, each of the network nodes 12-16 transmits state changes (e.g., avatar movements in the virtual area 28) to each of the other network nodes. One of the network nodes (typically the network node that initiates a communication session) operates as an "area server". In the illustrated embodiment, the network node 16 has assumed the role of an area server. The area server network node 16 maintains global state information and serves as a data server for the other network nodes 12, 14. The global state information includes a list of all of the objects that are in the virtual area and their respective locations in the virtual area. The area server network node 16 sends instructions that configure the other network nodes 12, 14. The area server network node 16 also registers and transmits initialization information to other network nodes that request to join the communication session. In this process, the area server network node 16 transmits to each joining client network node a list of components (e.g., plugins) that are needed to render the virtual area 28 on the client network node in accordance with the virtual area application 30. The realtime kernels on the client network nodes 12, 14 typically retrieve any missing components on the list from a remote server (e.g., a plugin server). The area server network node 16 also ensures that other network nodes 12, 14 can synchronize to a global state if a communications fault occurs.

Figure 3B:
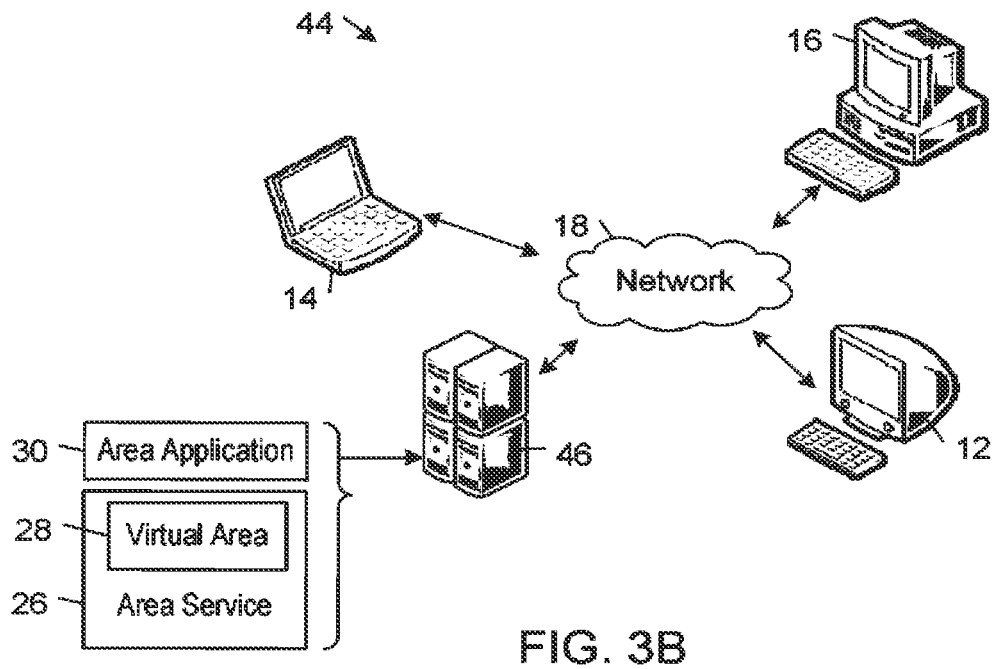
FIG. 3B is a diagrammatic view of an embodiment of a virtual area communication environment in which network nodes communicate in a server-mediated architecture.

FIG. 3B shows an embodiment 44 of the virtual area communication environment 10 in which the network nodes 12-16 (also referred to as "area client" network nodes in this architecture) communicate in an architecture that is mediated by an area server 46. In this embodiment, the area server 46 assumes the area server functions that were performed by the network node 16 in the peer-to-peer architecture embodiment shown in FIG. 3A. In this regard, the area server 46 maintains global state information and serves as a data server for the area client network nodes 12-16. This architecture allows the realtime data stream switching between the area client nodes 12-16 to be handled in a variety of topologies, including a peer-to-peer topology, a fully server-mediated topology in which the area server 46 operates as a communications broker between the network nodes 12-16, and a hybrid topology that combines aspects of the peer-to-peer topology and the fully server-mediated topology. Exemplary topologies of these types are described in U.S. application Ser. Nos. 11/923,629 and 11/923,634, both of which were filed on Oct. 24, 2007.

2. Network Infrastructure Services

One or more network infrastructure services typically cooperate with the realtime kernel 20 in the process of establishing and administering the network connections with other network nodes. The network infrastructure services may run on a single network node or may be distributed across multiple network nodes. The network infrastructure services typically run on one or more dedicated network nodes (e.g., a server computer or a network device that performs edge services, such as routing and switching). In some embodiments, however, one or more of the network infrastructure services run on at least one of the communicants' network nodes. Among the network infrastructure services that are included in the exemplary embodiment of the virtual area communication environment 10 are an account service, a security service, the area service 26, a rendezvous service, and an interaction service.

The account service manages communicant accounts in the network infrastructure service environment. The account service also manages the creation and issuance of authentication tokens that can be used by client network nodes to authenticate themselves to any of the network infrastructure services.

The security service controls communicants' access to the assets and other resources of the virtual area communication environment 10. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the virtual area communication environment 10.

The area service 26 administers a virtual area. In this process, the area service 26 manages connections that are associated with the virtual area subject to the capabilities of the requesting entities, maintains global state information for the virtual area, and serves as a data server for the client network nodes participating in a shared communication session in a context defined by the virtual area. The global state information includes a list of all the objects that are in the virtual area and their respective locations in the virtual area. The area service 26 sends instructions that configure the client network nodes. The area service 26 also registers and transmits initialization information to other client network nodes that request to join the communication session. In this process, the area service 26 transmits to each joining client network node a list of components (e.g., plugins) that are needed to render the virtual area 28 on the client network node in accordance with the virtual area application 30. The area service 26 also ensures that the client network nodes can synchronize to a global state if a communications fault occurs.

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database.

The interaction service maintains an interaction database that records interactions between communicants and supports queries on the interaction database subject to the capabilities of the requesting entities. For every interaction between communicants, one or more services in the virtual area communication environment 10 (e.g., the area service 26) transmit interaction data to the interaction service. In response, the interaction service generates one or more respective interaction records in the relationship database. Each interaction record describes the context of an interaction. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other streams shared during the interaction. Thus, for each realtime interaction, the interaction service tracks when it occurred, where it occurred, and what happens during the interaction in terms of communicants involved (e.g., entering and exiting), objects that are activated/deactivated, and the files that were shared.

The interaction service is able to present the results of queries on the interaction database records in a sorted order (e.g., most frequent or most recent) based on place. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the interaction database can be combined with other searches. For example, queries on the interaction database may be combined with queries on contact history data generated for interactions with contacts using a communication system (e.g., Skype, Facebook, and Flickr) that is outside the domain of the network infrastructure service environment.

3. Virtual Areas

The realtime kernel 20 administers the realtime connections with network nodes in a communication context that is defined by an instance of a virtual area. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

As explained above, communicants typically are represented by respective avatars in a virtual area that has an associated visualization. The avatars move about the virtual area in response to input commands that are input by the communicants at their respective network nodes. The communicant's view of a virtual area instance that has an associated visualization typically is presented from the perspective of the communicant's avatar, and each communicant typically is able to view any part of the visual virtual area around his or her avatar, increasing the level of immersion that is experienced by the communicant.

Figure 4:
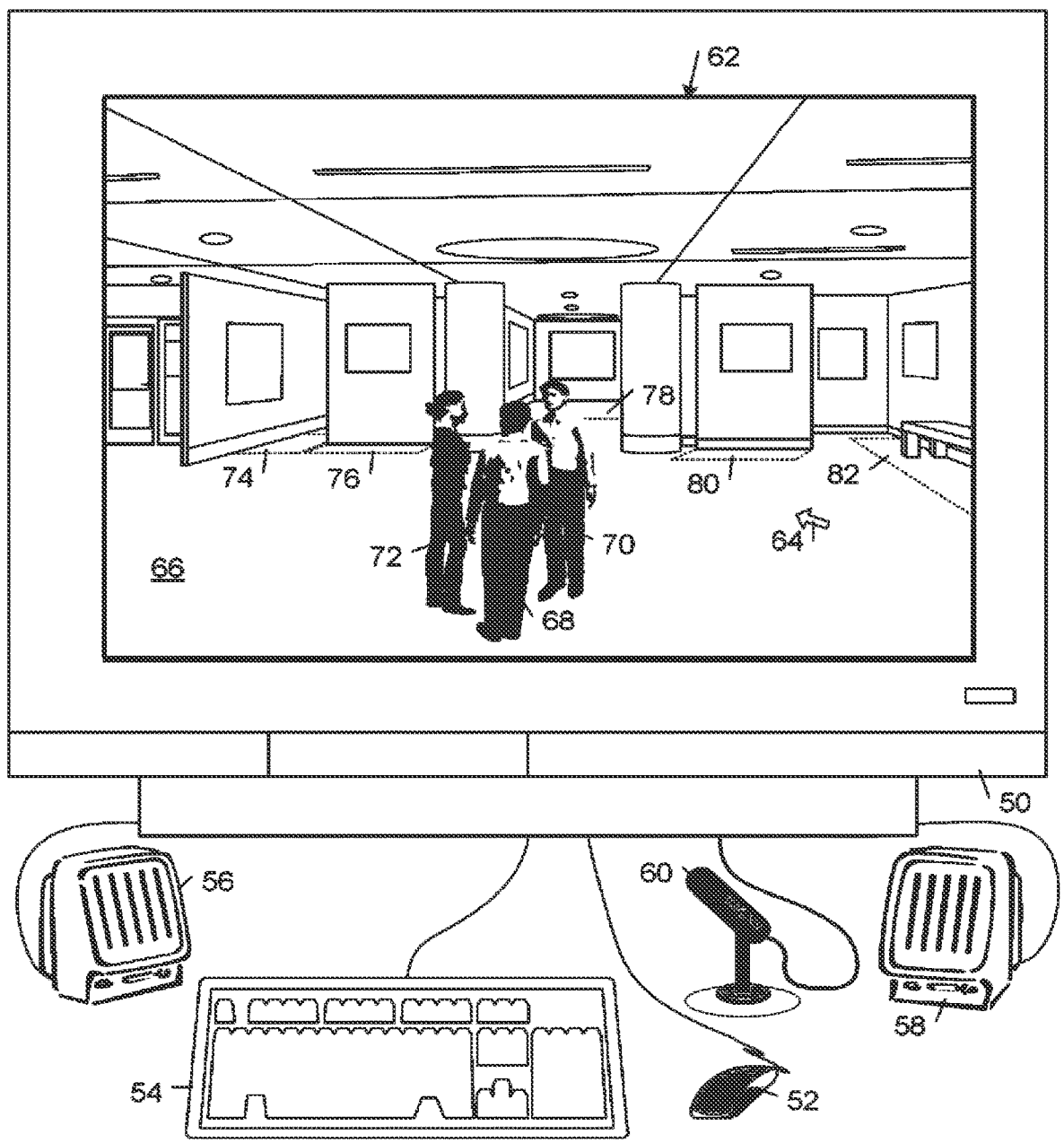
FIG. 4 is a diagrammatic view of an embodiment of a network node that includes a graphical user interface presenting a depiction of a virtual area.

FIG. 4 shows an embodiment of an exemplary network node that is implemented by a computer system 48. The computer system 48 includes a display monitor 50, a computer mouse 52, a keyboard 554, speakers 56, 58, and a microphone The display monitor 50 displays a graphical user interface 62. The graphical user interface 62 is a windows-based graphical user interface that can include multiple windows, icons, and a pointer 64. In the illustrated embodiment, the graphical user interface 62 presents a two-dimensional depiction of a shared virtual area 66 that is associated with a three-dimensional visualization representing an art gallery. Communicants are represented in the virtual area 66 by respective avatars 68, 70, 72, each of which may have a respective role (e.g., a curator, an artist, and a visitor) in the context of the virtual area 66.

As explained in detail below, the virtual area 66 includes zones 74, 76, 78, 82 that are associated with respective rules that govern the switching of realtime data streams between the network nodes that are represented by the avatars 68-72 in the virtual area 66. (During a typical communication session, the dashed lines demarcating the zones 74-82 in FIG. 4 are not visible to the communicants although there may be visual cues associated with such zone boundaries.) The switching rules dictate how local connection processes executing on each of the network nodes establishes communications with the other network nodes based on the locations of the communicants' avatars 68-72 in the zones 74-82 of the virtual area 66.

A virtual area is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area. In some embodiments, the geometric elements of the virtual area are described in accordance with the COLLADA—Digital Asset Schema Release 1.4.1 Apr. 2006 specification (available from http://www.khronos.org/collada/), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. Application No. 61/042,714 (which was filed on Apr. 4, 2008), Ser. No. 11/923,629 (which was filed on Oct. 24, 2007), and Ser. No. 11/923,634 (which was filed on Oct. 24, 2007).

4. Other Platform Components

The realtime kernel 20 is designed to work as a component of a local network node as part of a client software package that additionally includes:
  a. a Heads-Up Display (HUD) software application;
  b. local Human Interface Device (HID) and audio playback devices;
  c. a So3D graphical display, avatar, and physics engine;
  d. a system database and storage facility.

a. Heads-Up Display (HUD)

The Heads-up Display (HUD) is an application interface to the realtime kernel 20, which operates on each client network node. The HUD is a small, lightweight interface that a user can keep up and running all the time on his or her desktop. It is the user's interface for launching virtual area applications, providing him or her with immediate access to realtime contacts and realtime collaborative places (or areas). A virtual area is integrated with the user's desktop through the HUD and the realtime kernel 20 such that the user can drag and drop files into the virtual area communications environment, use files stored in association with the virtual area using the native client software applications independently of the virtual area communications environment while still present in a virtual area, and more generally treat presence and position within a virtual area as an aspect of their operating environment analogous to other operating system functions rather than just one of several applications.

Figure 5A:
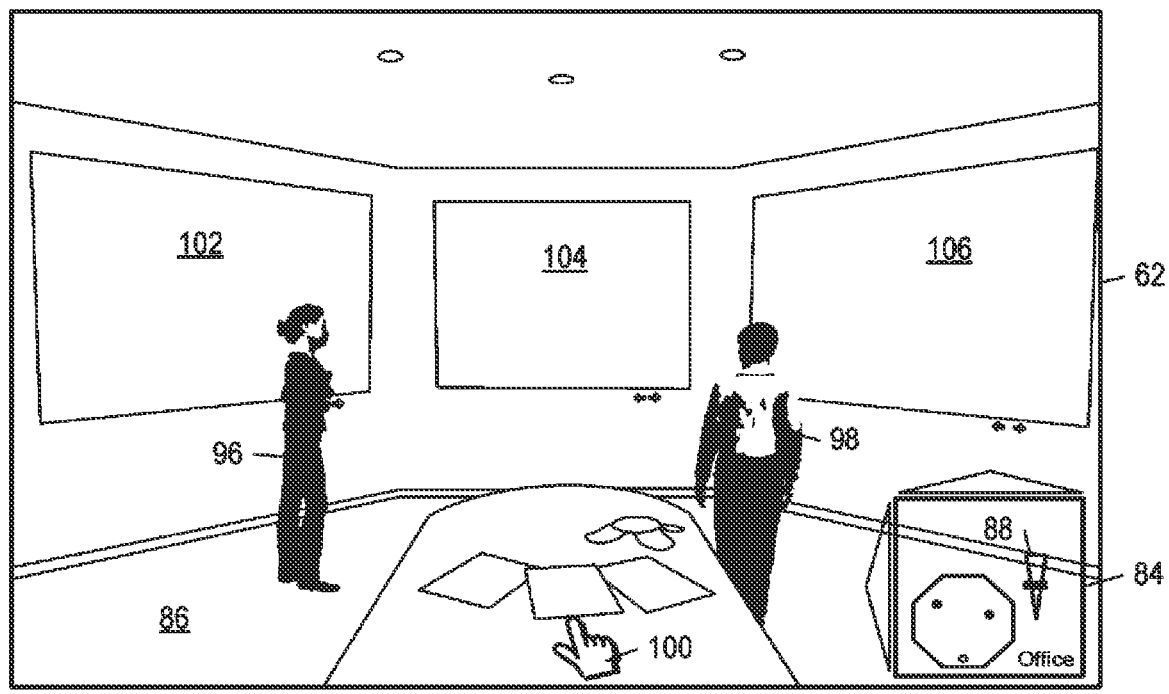
FIG. 5A is a diagrammatic view of an embodiment of a heads-up display (HUD) superimposed on a graphical user interface presenting a depiction of a virtual area.
Figure 5B:
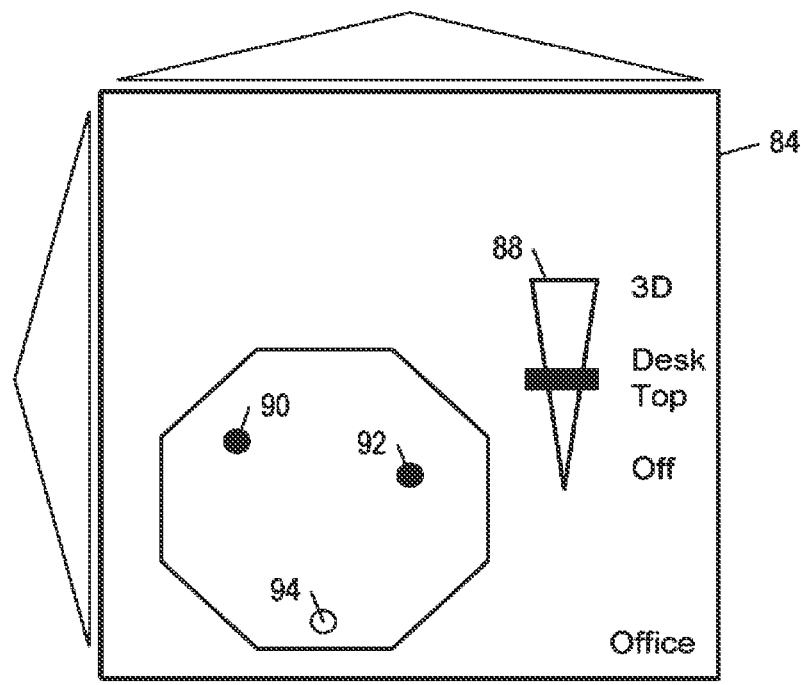
FIG. 5B is a diagrammatic view of the HUD shown in FIG. 5A.

FIGS. 5A and 5B show an embodiment 84 of the HUD that is implemented by a translucent user interface that is docked in the lower right hand corner of the communicant's desktop. The HUD 84 is the application interface to the platform. Characteristics of the HUD 84 include:
  Small, lightweight application that is intended to be running all the time on the user's desktop; and
  Provides the user with an easy interface to see and interact with contacts as well as the virtual areas where interactions occur.

In this embodiment, the HUD 84 is implemented by a substantially transparent (semi-translucent) user interface overlay that provides a persistent interface and access to controls. In the embodiment shown in FIG. 5A, the HUD 84 is transparent except for a limited set of one or more of the following semi-translucent elements of the interface:
  the outline of progressive immersion control;
  the outline of user's current location;
  the sprites representing realtime contacts in the virtual area 86; and
  the line demarcating the border of HUD area.

The communicant is able to work in a normal desktop computing environment while the realtime kernel 260 and the HUD 84 are running and ready to initiate realtime communications sessions. For example, the communicant may work with other applications, such as Microsoft® Excel®, to create a document that can later be shared in a realtime communications session. The virtual area 86 is integrated with the communicant's desktop such that the communicant can drag and drop files into the virtual area, use files stored in association with the virtual area using native client software applications independently of the virtual area communications environment while still present in a virtual area, and more generally treat presence and position within a virtual area as an aspect of the operating environment analogous to other operating system functions rather than one of several applications.

While the communicant interacts in the virtual area 86, the HUD 84 provides the communicant with independent control over his or her desired visualization. For example, a communicant may display a minimized view of the virtual area (minimized to the lower right-hand corner of the desktop) and participate in an audio conversation with another communicant in the virtual area while working in different application such as Microsoft® Excel®. A communicant then can change his or her visualization schema and enter into a more immersive three-dimensional rendering of the virtual area 86. This is accomplished by changing the setting of the progressive immersion slider 88 in the HUD 84 from "Desktop" to "3D". Once in the 3D visualization mode, the communicant's desktop displays a 3D rendition of the virtual are 86 (as shown in FIG. 5A). The communicants (represented by sprites 90, 92, 94 in the Desktop mode) now take the form of three-dimensional avatars 96, 98, 100, as shown in FIG. 5A.

Figure 5C:
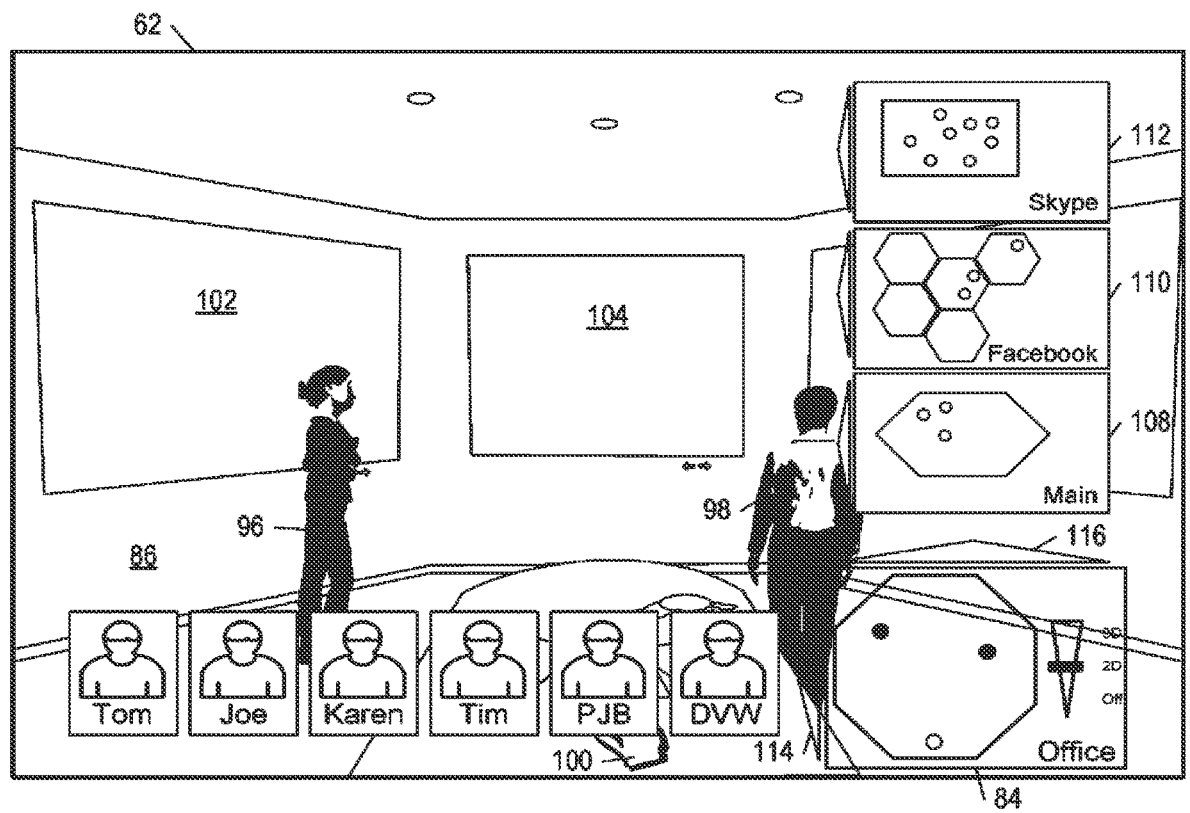
FIG. 5C is a diagrammatic view of an expanded view of the HUD shown in FIG. 5A.

Any data that is associated with the virtual area 86 can be displayed on view screens 102, 104, 106. A view screen is a generic data rendering component that can be used to render any arbitrary data. Examples of the types of data that can be rendered on a view screen include:
  Microsoft PowerPoint presentation
  Video
  output of a Webcam
  realtime data that comes directly from an organization's ERP system As shown in FIG. 5C, the HUD 84 is designed to serve as a true interface that displays information and provides access to controls with only minimal obscuration of the underlying parts of the graphical user interface 62 being presented on the communicant's display monitor. The HUD 84 efficiently shows:
  the ones of the communicant's realtime contacts that currently are online,
  where the communicant and the communicant's realtime contacts currently are "located" in the virtual area 86,
  a progressive immersion control that controls the visualization of the virtual area 86, and
  navigation controls that enable the user to quickly connect to a particular place.

In particular, the HUD 84 provides communicants with immediate access to their realtime contacts and the virtual area where realtime collaboration occurs. The HUD 84 allows navigation through areas based on the locations of people as well as views into virtual areas. These virtual areas can be accessed in several ways: most frequently used, most recently used, or an application specific way.

The HUD 84 shows an ordered set of place tiles 108, 110, 112. Clicking on one of the place tiles brings the user to the virtual area represented by the selected place tile. For people, we have a basic metaphor of Go (to the communicant's area) and Get (bring, them to the user's area). This is refined in the HUD 84 by allowing communicants to queue requests to go or get, as well as communicate with people via text or voice without "moving." The HUD 84 notifies the communicant when each communication request is received from another communicant. The communicant can accept the request, ignore it, or add it to a communications queue. In this way, communicants can respond to non-priority communications at a later time. For example, a communicant can queue communications received during a time when the communicant is busy (e.g., engaged in a current communications session) and, after the communicant is free, the communicant can respond to communication requests in the communications queue.

As described above, the interaction network infrastructure service maintains an interaction database that records who the communicant meets with and where. The interaction service responds to queries on the relationship database with query results that may be presented in a sorted order (e.g., most frequent or most recent) based on place. In this way, the relationship database information can be used to drive a frequency sort of who the communicant met in which areas, as well as sorts of who the communicant has met with regardless of area, and sorts of the areas the communicant has frequented most often. This data is used in the HUD 84. This data also may be used by virtual area application developers as part of a heuristic system (e.g. a rule that permits people who have visited a particular virtual area more than five times to enter without knocking by default, or people who were present in a virtual area at a particular time to modify and delete files created by another communicant there at the same time).

In FIG. 5C, the HUD 84 presents a series of place tiles 108, 110, 112 that represent respective virtual areas. Each of the virtual areas is tied to queries on the relationship database. With respect to each virtual area, the rendezvous service does a query on the relationship database for all of the contacts the user has met with in that virtual area. The rendezvous service typically presents the identified contacts in a list that is sorted either by frequency or by recentness of interaction (e.g., the contact with whom the communicant interacted with last). In other embodiments, the contacts may be sorted in some other application-dependent way.

Queries on the relationship database can be combined with other searches. For example, queries on the relationship database may be combined with queries on contact history data generated for interactions with contacts using another communication system (e.g., Skype, Facebook, and Flickr). In one example, the Skype virtual area 112 may be associated with a query on a communicant's relationship data associated with the Skype virtual area 112 and the communicant's Skype history data to produce a sorted list of realtime contacts of the user that are associated with the Skype virtual area 112.

FIG. 5Q shows the basic navigation of contacts and virtual areas in the HUD 84. Clicking on the left-facing arrow associated with each of the virtual area tiles 108-112 displays a list of realtime contacts sorted by frequency of interaction, in a given place. For example, clicking on the left-facing arrow 114 of the main HUD tile 84 (labeled "Office") displays the realtime contacts the user communicates with most frequently in the virtual area 86. The list of contacts (represented by respective icon tiles) is sorted by frequency. The first contact in the list (DVW in this example) represents the contact that the user collaborates with most frequently in the virtual area 86, followed by PJB, Tim, etc. Clicking on the upward-facing arrow 116 displays a set of place tiles representing some or all the virtual areas the communicant has visited. The set of place tiles typically is sorted by frequency, recentness, or other ordering. The virtual area place tiles show the realtime activity currently occurring in the corresponding virtual areas. For example, DVW, Kim and Joe (represented by respective sprites in the Main virtual area tile 108) are all present in the Main virtual area and are having a realtime conversation, whereas, Jeff, Ann and Jane (represented by respective sprites in the virtual area tile 110) are all in the Facebook virtual area.

Should any communicant exit a virtual area or enter a virtual area, the presence indicators (i.e., the sprites shown by circles, which typically are associated with names or other identifiers) in that virtual area will automatically be updated in realtime. This feature demonstrates the ability of a virtual area designer to put application-specific realtime data into a place tile. The place tile may appear either associated with a communicant, or with the communicant's places. For example, a game developer may export a map of where a communicant is in their game environment such that other people connected to that communicant through the relationship database receive a realtime feed of that communicant's current activities. These people can use this virtual area tile to navigate to that communicant, communicate with him or her, or contact him or her (e.g., send an invitation to enter a virtual area). The HUD 84 manages this interface to contacts and virtual areas for many different virtual areas simultaneously.

The realtime data used in the HUD virtual area tiles 84, 108, 110, 112 is provided by an interface that is managed by the area service hosting the relevant area via the realtime kernel 20. Each area service may provide a different respective HUD virtual area tile data feed to communicants based on the communicants' permissions to view the hosted virtual area. For example, if a communicant enters a virtual area that the communicant does not have permission to view, the HUD virtual area tile may show limited or no detailed information. In addition, the HUD virtual area tile data feed that is provided by the hosting area service may be customized by the virtual area provider operating that area service to present an application-specific view of the virtual area to subscribing HUDs.

b. Local Human Interface Device (HID) and Audio Playback Devices

The local HID devices enable a communicant to input commands and other signals into the client network node while participating in a virtual area communications session. Exemplary HID devices include a computer keyboard, a computer mouse, a touch screen display, and a microphone.

The audio playback devices enable a communicant to playback audio signals received during a virtual area communications session. Exemplary audio playback devices include audio processing hardware (e.g., a sound card) for manipulating (e.g., mixing and applying special effects) audio signals, and speakers for outputting sounds.

c. So3D Graphical Display, Avatar, and Physics Engine

The So3D engine is a three-dimensional visualization engine that controls the presentation of a respective view of a virtual area and objects in the virtual area on a display monitor. The So3D engine typically interfaces with a graphical user interface driver and the HID devices to present the views of the virtual area and to allow the communicant to control the operation of the HUD application.

The So3D engine typically receives graphics rendering instructions from the area service 26 via the realtime kernel 20. In some embodiments, the So3D engine also reads a communicant avatar database that contains images needed for rendering the communicant's avatar in the virtual area. Based on this information, the So3D engine generates a visual representation (i.e., an image) of the virtual area and the objects in the virtual area from the point of view (position and orientation) of the communicant's avatar in the virtual area. The visual representation typically is passes to the graphics rendering components of the operating system, which drive the graphics rendering hardware to render the visual representation of the virtual area on the client network node.

The communicant can control the presented view of the virtual area by transmitting commands from a HID device (e.g., a computer mouse) to the realtime kernel 20, which transmits view control commands to the So3D engine. The So3D engine updates the view of the virtual area in accordance with the view control commands. The So3D engine also updates the graphic representation of the virtual area on the display monitor in accordance with updated object position information that is received from the area service 26 via the realtime kernel 20.

d. System Database and Storage Facility

The system database and storage facility stores various kinds of information that is used by the platform. Exemplary information that typically is stored by the storage facility includes the presence database, the interaction database, an avatar database, a real user id (RUID) database, an art cache database, and a virtual area specification database. This information may be stored on a single network node or it may be distributed across multiple network nodes.

C. Exemplary Communication Session

Referring back to FIG. 4, during a communication session, each of the client network nodes generates a respective set of realtime data streams (e.g., motion data streams, audio data streams, chat data streams, file transfer data streams, and video data streams). For example, each communicant manipulates one or more input devices (e.g., the computer mouse 52 and the keyboard 54) that generate motion data streams, which control the movement of his or her avatar in the virtual area 66. In addition, the communicant's voice and other sounds that are generated locally in the vicinity of the computer system 48 are captured by the microphone 60. The microphone generates audio signals that are converted into realtime audio streams. Respective copies of the audio streams are transmitted to the other network nodes that are represented by avatars in the virtual area 66. The sounds that are generated locally at these other network nodes are converted into realtime audio signals and transmitted to the computer system 48. The realtime kernel 20 converts the audio streams that are generated by the other network nodes into audio signals that are rendered by the speakers 56, 58. The motion data streams and audio streams may be transmitted from each of the communicant nodes to the other client network nodes either directly or indirectly. In some stream handling topologies, each of the client network nodes receives copies of the realtime data streams that are transmitted by the other client network nodes. In other stream handling topologies, one or more of the client network nodes receives one or more stream mixes that are derived from realtime data streams that are sourced (or originated) from other ones of the network nodes.

In some embodiments, the area service 26 maintains global state information that includes a current specification of the virtual area, a current register of the objects that are in the virtual area, and a list of any stream mixes that currently are being generated by the network node that is hosting the area service 26. The objects register typically includes for each object in the virtual area a respective object identifier (e.g., a label that uniquely identifies the object), a connection handle (e.g., a URI, such as an IP address) that enables a network connection to be established with a network node that is associated with the object, and interface data that identifies the realtime data sources and sinks that are associated with the object (e.g., the sources and sinks of the network node that is associated with the object). The objects register also typically includes for each object one or more optional role identifiers, which may be assigned explicitly to the objects by either the communicants or the area service 26, or may be inferred from other attributes of the objects. In some embodiments, the objects register also includes the current position of each of the objects in the virtual area as determined by the area service 26 from an analysis of the realtime motion data streams received from the network nodes associated with objects in the virtual area. In this regard, the area service 26 receives realtime motion data streams from the network nodes associated with objects in the virtual area, tracks the communicants' avatars and other objects that enter, leave, and move around in the virtual area based on the motion data. The area service 26 updates the objects register in accordance with the current locations of the tracked objects.

In the process of administering realtime data stream connections with other network nodes, the area service 26 maintains for each of the client network nodes a set of configuration data, including interface data, a zone list, and the positions of the objects that currently are in the virtual area. The interface data includes for each object associated with each of the client network nodes a respective list of all the sources and sinks of realtime data stream types that are associated with the object. The zone list is a register of all the zones in the virtual area that currently are occupied by the avatar associated with the corresponding client network node. When a communicant first enters a virtual area, the area service 26 typically initializes the current object positions database with position initialization information. Thereafter, the area service 26 updates the current object positions database with the current positions of the objects in the virtual area as determined from an analysis of the realtime motion data streams received from the other client network nodes sharing the virtual area.

Figure 6:
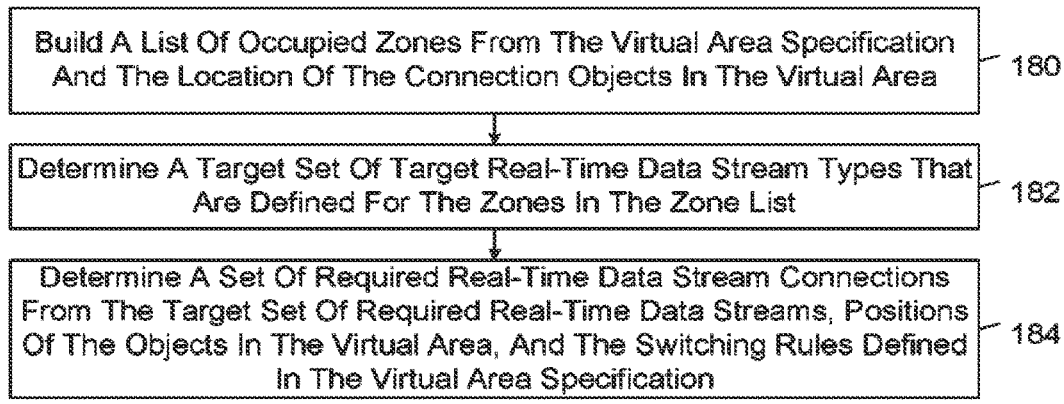
FIG. 6 is a flow diagram of an embodiment of a method that is implemented by an embodiment of an area network infrastructure service.

FIG. 6 shows an embodiment of a method in accordance with which an embodiment of the area service 26 determines a set of required realtime data stream connections to make when the user enters a virtual area or crosses a boundary between zones of a virtual area. The area service 26 builds the list of occupied zones for each communicant from the virtual area specification and the location of the communicant's avatar in the virtual area instance (FIG. 6, block 180). In this process, the area service 26 retrieves the current position of the user's avatar in the virtual area instance from the current object positions database, which contains the coordinates of the avatar's current position in the virtual area instance. The area service 26 then compares the current position of the communicant's avatar with the zone definitions in the virtual area specification. The area service 26 compiles the occupied zones list from all the zones in the virtual area specification that coincide with the current position of the communicant's avatar. For example, in some embodiments, the occupied zones list consists of all the zones whose meshes contain the current position of the communicant's avatar.

The area service 26 determines a set of target realtime data stream types that are defined for the zones in the occupied zones list (FIG. 6, block 182). The area service 26 then determines a set of required realtime data stream data from the set of target realtime data stream types, the positions of the objects in the virtual area instance, and the switching rules defined in the virtual area specification (FIG. 6, block 184).

In some exemplary embodiments, after the area service 26 has determined the set of realtime data stream data that enables the user to participate in a collaborative communication session with other network nodes in the shared virtual area instance (FIG. 6, block 184), the area service 26 determines the realtime data stream connections that will result in the delivery of the required data stream data to the computer system 120.

In some of these embodiments, the area service 26 determines a realtime data stream handling topology that delivers the set of realtime data streams to the computer system 120 based at least in part on bandwidth capabilities of the computer system 120. In this process, the area service 26 determines a respective form in which to receive each of the realtime data streams from an unmixed realtime data stream and a stream mix derived from a combination of realtime data streams. The area service 26 also determines a network route over which each of the realtime streams is received from a direct peer-to-peer network route and a network route mediated by one or more of the other network nodes. After the stream handling topology has been determined, the area service 26 sends instructions to the realtime kernel operating on the computer system 120. The instructions specify the required realtime data stream connections between the computer system 120 and other ones of the network nodes in accordance with the determined stream handling topology.

Figure 7:
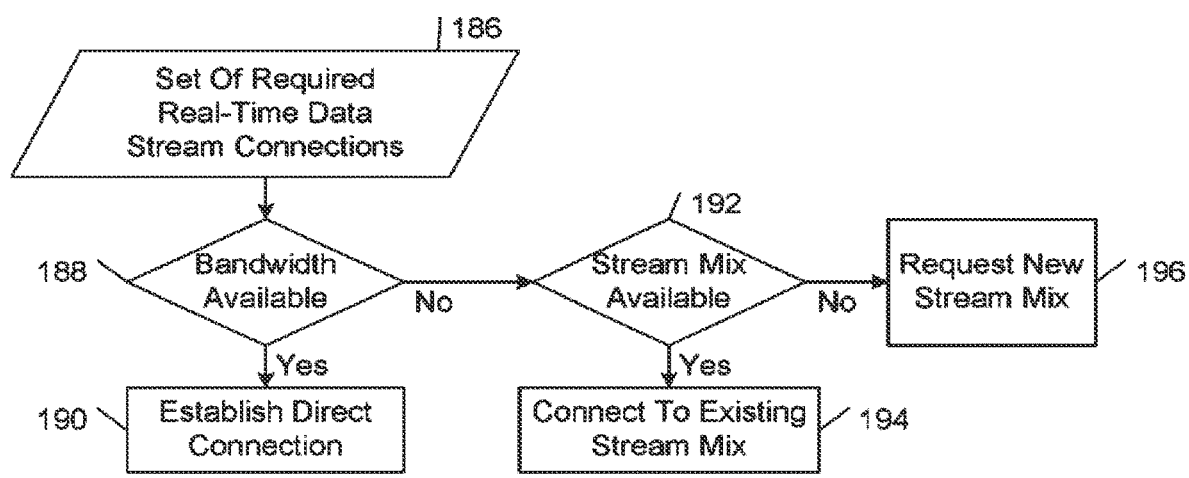
FIG. 7 is a flow diagram of an embodiment of a method that is implemented by an embodiment of a realtime kernel.

FIG. 7 shows an embodiment of a method that is implemented by the realtime kernel 20 in the process of determining a topology of realtime data stream connections that deliver the required data stream data to the computer system 120.

In accordance with this method, the realtime kernel 20 determines if the computer system 120 has sufficient bandwidth to receive the set of required realtime data stream data 186 directly from the other network nodes (FIG. 7, block 188). In this process, the other network nodes transmit link requests to the computer system 120. The link requests indicate the respective bandwidth requirements for transmitting the respective sets of realtime data streams needed by the computer system 120. The realtime kernel 20 compares the overall bandwidth that is needed to establish the required direct connections with the download bandwidth that is available currently to the computer system 120.

If the available bandwidth is at least equal to the overall required bandwidth, the realtime kernel 20 establishes direct connections with the other network nodes that provide the required realtime data stream data (FIG. 7, block 190). In this process, the realtime kernel 20 creates sockets (e.g., TCP sockets or specialized realtime sockets optimized for performance) between the computer system 120 and one or more of the other network nodes. The realtime kernel 20 processes the realtime data streams, including encrypting them, recording them, and delivering the processed data streams to downstream software components as needed for rendering into the user interface and transmission over the network 18.

If the available bandwidth is less than the required bandwidth (FIG. 7, block 188), the realtime kernel 20 checks the stream mix list to determine if a stream mix that provides the required realtime data stream data currently is being generated by the area service 26 (FIG. 7, block 192). If the needed stream mix is available, the realtime kernel 20 establishes with the area service 26 a connection over which a copy of the needed realtime data stream mix is transmitted from the area server 28 to the computer system 120 (FIG. 7, block 194). If the needed stream mix is not available, the realtime kernel 20 sends a stream mix request to the area service 26 (FIG. 7, block 196). If possible, the area service 26 generates the needed stream mix in response to the stream mix request.

IV. SYSTEM ARCHITECTURE

A. Introduction

A communicant typically connects to the network 18 from a client network node, which typically is implemented by a general-purpose computer system or a dedicated communications computer system (or "console", such as a network-enabled video game console). The network node executes communications processes that establish realtime data stream connections with other network nodes and typically executes visualization rendering processes that present a view of each virtual area entered by the communicant.

Figure 8:
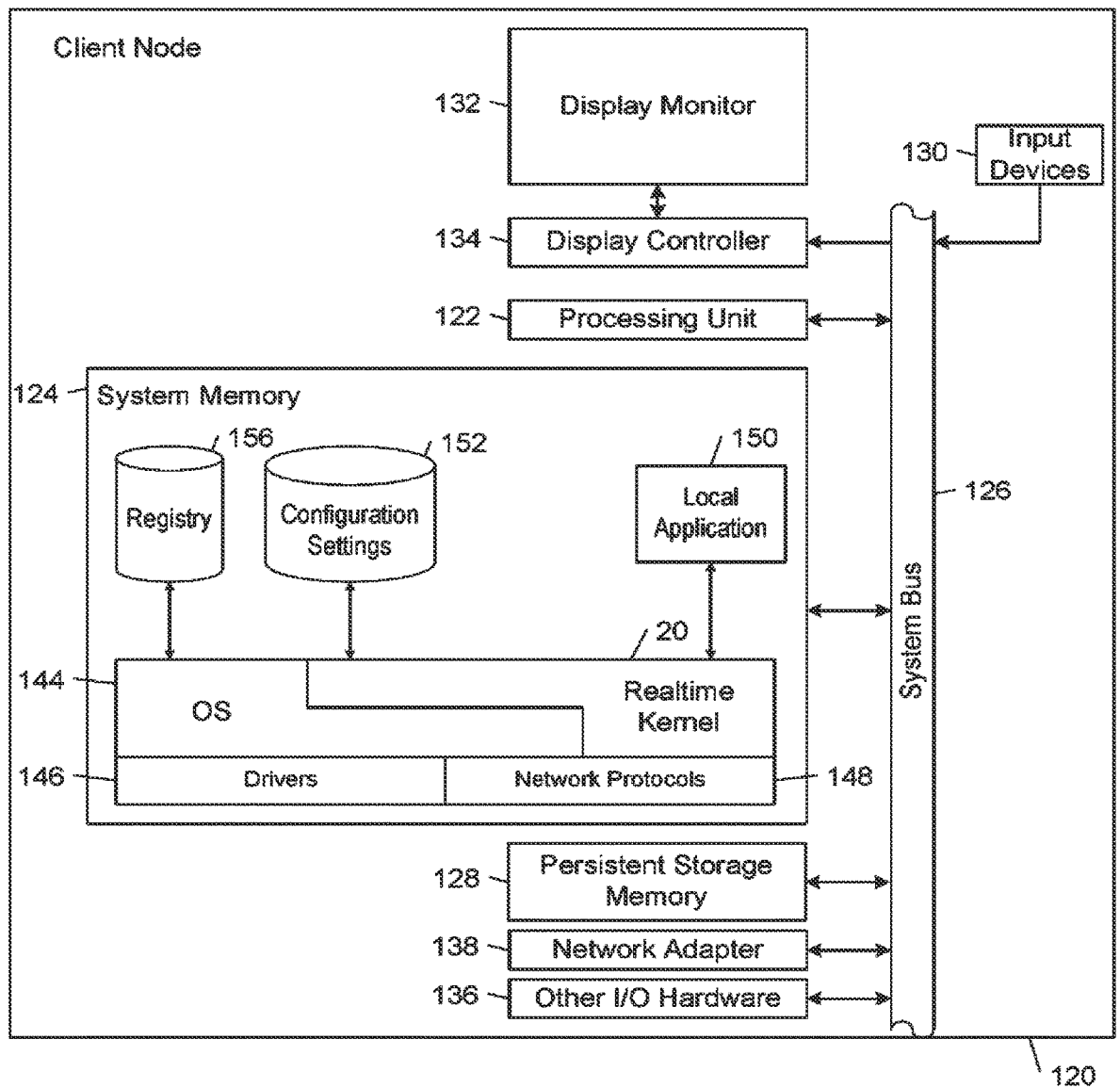
FIG. 8 is a block diagram of an embodiment of a client network node that includes an embodiment of a realtime kernel.

FIG. 8 shows an embodiment of a client network node that is implemented by a computer system 120. The computer system 120 includes a processing unit 122, a system memory 124, and a system bus 126 that couples the processing unit 122 to the various components of the computer system 120. The processing unit 122 may include one or more data processors, each of which may be in the form of any one of various commercially available computer processors. The system memory 124 may include a read only memory (ROM) that stores a basic input/output system (BIOS) that contains start-up routines for the computer system 120 and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A communicant may interact (e.g., input commands or data) with the computer system 120 using one or more input devices 130 (e.g. one or more keyboards, computer mice, microphones, cameras, joysticks, physical motion sensors such Wii input devices, and touch pads). Information may be presented through a graphical user interface (GUI) that is presented to the communicant on a display monitor 132, which is controlled by a display controller 134. The computer system 120 also may include other input/output hardware 136 (e.g., peripheral output devices, such as speakers and a printer). The computer system 120 connects to other network nodes 138, 140, and 142 through a network adapter 138 (also referred to as a "network interface card" or NIC).

A number of program modules may be stored in the system memory 124, including an operating system (OS) 144 (e.g., the Windows XP® operating system available from Microsoft Corporation of Redmond, Washington U.S.A.), the realtime kernel 20, drivers 146 (e.g., a GUI driver), network protocols 148, a local software application 150 (e.g., the HUD 84), and data (e.g., input data, output data, program data, a registry 156, and the configuration settings 152).

B. Operating System

The operating system 144 hosts software applications by providing the base operating system services for creating a run-time execution environment on the computer system 120. Among the exemplary types of services that typically are provided by the operating system are resource management, file management, security, authentication, verification, notification, and user interfaces (e.g., windowing, menus, dialogs, etc.).

The services relating to the management of the resources (e.g., memory, processors, and I/O devices) of the computer system 120 typically are implemented by an operating system kernel. File management may be implemented by the operating system kernel or it may be implemented by a separate file system manager (e.g., the installable file system, which is provided in some Microsoft® Windows® operating systems). In the process of opening a file (e.g., a computer data file or a software application file), the file system manager typically calls an appropriate file system driver that looks up the disk storage location of the file in a database (e.g., a file allocation table, such as FAT, FAT98, VFAT, MFT, and CDFS) that maps out the storages locations of the file on the disk. Other operating system functions, such as security, authentication, verification, notification, and user interfaces, may be provided by one or more other components of the operating system (e.g., the executive services layer in some Microsoft® Windows® operating systems).

Among the exemplary types of services that typically are provided by the operating system kernel are process management, memory management, device management, and system call handling. Process management includes running applications and providing an application programming interface (API) to hardware components of the computer system. In the process of running a software application, the operating system kernel typically sets up an address space in memory for the software application, loads a file that contains the software application code into the address space, and executes the loaded software application code. Memory management involves managing software application accesses to the system memory 124. Device management involves providing access to hardware devices through device drivers. System call handling involves providing an API that exposes the operating system kernel services to user mode software applications. By invoking the API (e.g., through inter-process communication mechanisms and system calls), a software application can request a service from the operating system kernel, pass parameters, and receive results that are generated by the service in response to the request.

The operating system 144 typically stores hardware and software configuration information, user preferences, and setup information in the registry 156. For example, the registry 156 typically contains the following information: parameter values that are needed to boot and configure the system; system-wide software settings that control the operation of the operating system 144; a security database; and per-user profile settings. In some embodiments, the connection rules 32 are stored in the registry 156 instead of a separate database.

C. Network Protocols

The network protocols 148 control or enable the connection, communication, and transfer of data between the computer system 120 and other network nodes. Exemplary types of network protocols include the Transmission Control Protocol/Internet Protocol (TCP/IP), the User Datagram Protocol/Internet Protocol (UDP/IP), the realtime Transport Protocol (RTP), and the Session Initiation Protocol (SIP).

The TCP/IP includes a TCP portion and an IP portion. The TCP portion of the protocol provides the transport function by breaking a message into smaller packets, reassembling the packets at the other end of the communication network, and re-sending any packets that get lost along the way. The IP portion of the protocol provides the routing function by assigning to the data packets addresses for the destination network and the target node at the destination network. Each data packet that is communicated using TCP/IP includes a header portion that contains the TCP and IP information. The IP provides no guarantee of packet delivery to the upper layers of the communications stack. The TCP, on the other hand, provides a connection-oriented, end-to-end transport service with guaranteed, in-sequence packet delivery. In this way, the TCP protocol provides a reliable, transport layer connection.

The UDP is a message-oriented transport layer protocol that provides an interface between the application layer and the internet layer. UDP does not guarantee message delivery to the application layer. UDP is a connectionless protocol in that there is no effort made to setup a dedicated end-to-end connection. A UDP sender retains no state information about UDP messages after they are sent. Communication is based on transmission of messages in one direction from source to destination without checking the state of the receiver.

The RTP defines a standardized packet format for delivering audio and video over network connections. A variety of network protocols may be used in transmitting and receiving RTP data between network nodes, including peer-to-peer networking frameworks, a centralized server using TCP sockets alone or in combination with UDP, and multicast protocols.

The SIP provides means for users to locate one another, establish communicative sessions, and terminate active sessions. With a SIP transaction, session negotiations processes are handled in accordance with a Session Description Protocol (SDP).

D. Device Drivers

The device drivers 146 typically are implemented by software applications that enable other software applications (e.g., user-mode software applications and the operating system) to interact with hardware devices that are connected to the computer system 120. A device driver typically provides an API for functions that can be invoked by calls made by software processes in order to translate commands and data that are transferred between the software processes and the hardware device.

E. Realtime Kernel

1. Introduction

The realtime kernel 20 includes services that control the processing and switching of realtime data streams between the computer system 120 and other network nodes sharing a virtual area communication environment, as well as the presenting of a respective view of a virtual area and objects in the virtual area on the display monitor 132. In these processes, the realtime kernel interfaces with the operating system functions that communicate with the drivers 148 to translate commands and data to and from the hardware components of the computer system 120 in order to exchange realtime data streams with other network nodes and to present an immersive virtual area communication experience to the communicant.

Implementations of the realtime kernel 20 include one or more discrete modules or libraries (e.g., dynamic linked libraries) that are not limited to any particular hardware, firmware, or software configuration. In general, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components. In some implementations, process instructions (e.g., computer-readable code, such as computer software) for implementing the methods that are executed by the embodiments of the realtime kernel 20, as well as the data they generate, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

2. Exemplary Realtime Kernel Functionality

The realtime kernel 20 cooperates with one or more of the network infrastructure services in establishing and administering the network connections between the computer system 120 and the other network nodes sharing a virtual area communication environment. Among the exemplary functionalities that are involved in the process of establishing and administering network connections are session administration, remote-controlled stream handling, and realtime task scheduling.

e. Session Administration

Figure 9:
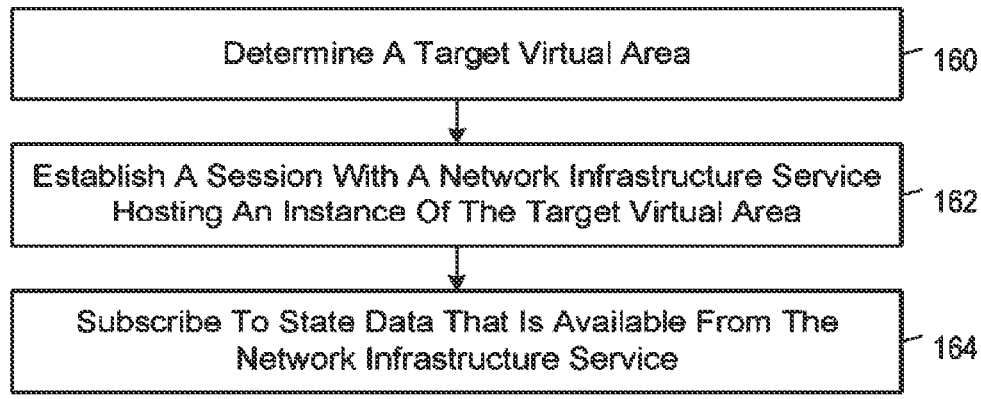
FIG. 9 is a flow diagram of an embodiment of a method that is implemented by an embodiment of the realtime kernel of FIG. 8 in response to a realtime kernel API call requesting a connection to a virtual area.

FIG. 9 shows an embodiment of a method that is implemented by the realtime kernel 20 in response to a realtime kernel API call requesting a connection to a virtual area.

In accordance with the method of FIG. 9, the realtime kernel 20 determines a designation of a virtual area (FIG. 9, block 160). In some embodiments, this functionality of the realtime kernel 20 is invoked by issuing a realtime kernel API call that includes a virtual area designation to a realtime kernel service. The realtime kernel API call may be made by any of a software application, an operating system service.

The realtime kernel 20 establishes a session with a network infrastructure service that hosts the designated virtual area (FIG. 9, block 162). In this process, the realtime kernel 20 establishes a session with the area service 26. The realtime kernel then transmits to the area service 26 a request to connect to the designated virtual area. The area service 26 determines an instance of the virtual area that is designated in the request received from the realtime kernel 20. After determining the instance of the virtual area instance, the area service 46 determines if the user's capabilities satisfy the capability requirements associated with the virtual area instance. If the user's capabilities meet the capability requirements, the area service 46 transmits a message indicating the availability of state data that describes a current state of the virtual area instance (e.g., a list of the objects currently in the virtual area instance, along with the names of communicants associated with those objects).

The realtime kernel 20 subscribes to state data describing the current state of the virtual area instance (FIG. 9, block 164). In response to the subscription request, the area service 26 publishes the state data to a channel on the link between the realtime kernel 20 and the area service 26.

In some embodiments, So3D engine of the realtime kernel 20 invokes a user interface service of the operating system 144 to render a human-perceptible view of the state data. For example, the So3D engine may invoke the interface service to render a representation of each of the communicants associated with objects currently in the area on the display 132. In some embodiments, the communicants may be represented by an icon, thumbnail image, or other graphic that optionally is labeled with the communicant's name. In some embodiments, the state data is presented in a graphical interface of a software application that triggered the invocation of the realtime kernel 20. In some embodiments, the state data is presented in an embodiment of the heads-up display (HUD) interface 84 (see FIGS. 5A-5C).

After a connection has been established with a virtual area instance, the software application that triggered the invocation of the realtime kernel 20 can give the user an option to request entry into the virtual area instance or can automatically request entry into the virtual area instance on behalf of the user.

Figure 10:
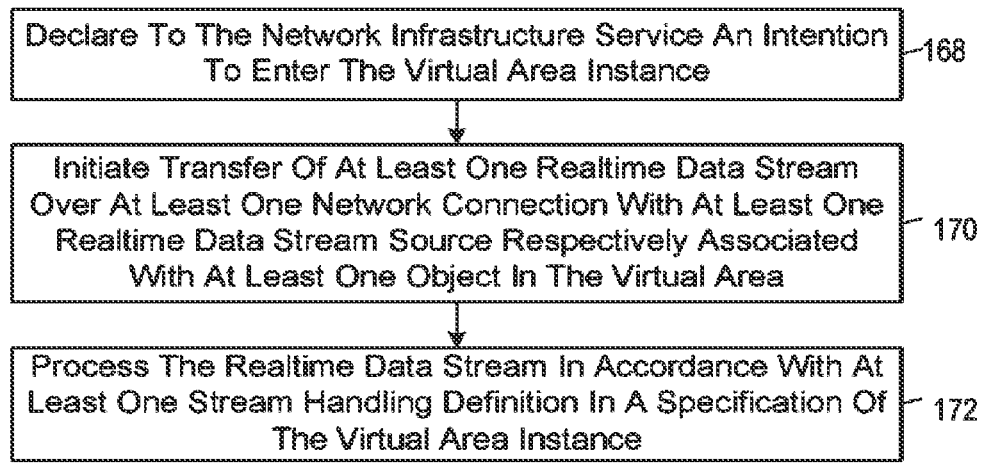
FIG. 10 is a flow diagram of an embodiment of a method that is implemented by an embodiment of the realtime kernel of FIG. 8 in response to a realtime kernel API call requesting entry into a virtual area.

FIG. 10 shows an embodiment of a method that is implemented by the realtime kernel 20 in response to a realtime kernel API call requesting entry into a virtual area.

In accordance with the method of FIG. 10, the realtime kernel 20 declares an intention to enter the virtual area to the network infrastructure service hosting the virtual area (FIG. 10, block 168). In this process, the realtime kernel 20 sends a message containing the declaration to the area service 26. The message may be sent on a channel of an existing link with the area service 26 or over a new link that is established with the area service 26 by the realtime kernel 20. In response, the area service 26 determines if the user's capabilities satisfy the capability requirements that are associated with the virtual area instance. If the user's capabilities meet the capability requirements, the area service 26 returns configuration data to the realtime kernel 20. The configuration data typically includes a definition of the virtual area instance, a register of the objects currently in the virtual area instance, and a set of realtime data stream sources and sinks that are associated with objects in the virtual area in accordance with the specification of the virtual area instance.

The realtime kernel 20 initiates transfer of at least one realtime data stream over at least one network connection with at least one realtime data stream source respectively associated with at least one object in the virtual area (FIG. 10, block 170). In this process, the realtime kernel 20 ascertains one or more network nodes that are associated with the instance of the virtual area based on the configuration data that was received from the area service 26. The realtime kernel 20 then initiates transfer of at least one realtime data stream over at least one network connection with at least one of the ascertained network nodes. The connections between the realtime kernel 20 and the other network nodes may be peer-to-peer connections or server-mediated connections. With respect to a peer-to-peer connection, the connection target network node and the realtime kernel 20 typically authenticate one another, and then establish a link over which to transmit the at least one realtime data stream either to or from the connection target. Links typically are one-way and requested by the transmitter and accepted or rejected by the receiver.

In the illustrated embodiment, the realtime kernel 20 processes the initiated realtime data streams in accordance with at least one stream handling definition in the specification of the virtual area instance (FIG. 10, block 172). In this process, the realtime kernel 20 assembles a set of stream processing objects into a directed graph in accordance with the stream processing configuration that is defined in the virtual area specification.

f. Remote-Controlled Stream Handling

Figure 11:
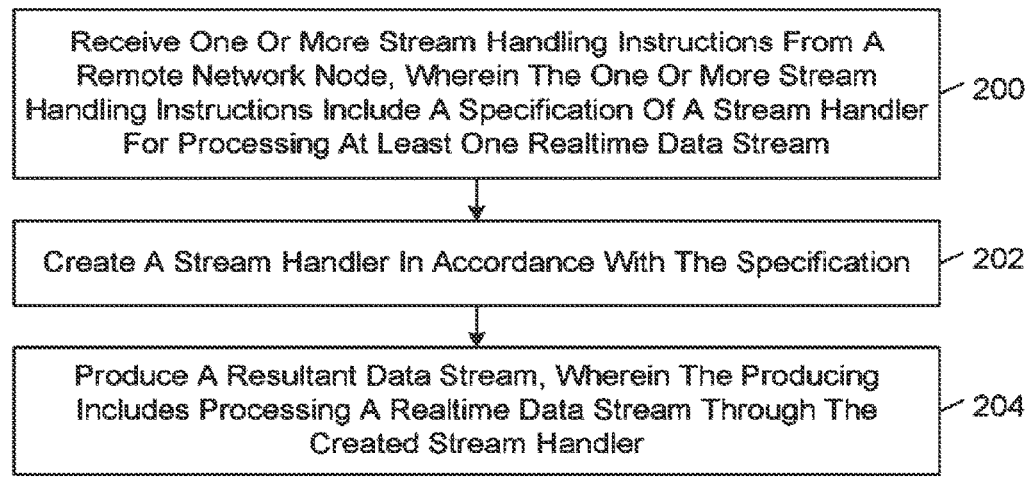
FIG. 11 is a flow diagram of an embodiment of a method that is implemented by an embodiment of the realtime kernel of FIG. 8 in response to stream handling instructions received from an area service.

FIG. 11 shows an embodiment of a method that is implemented by the realtime kernel 20 in response to stream handling instructions that are received from the area service 26.

In accordance with the method of FIG. 11, the realtime kernel 20 receives one or more stream handling instructions from the area service 26 operating on a remote network node, where the stream handling instructions include a specification of a stream handler for processing at least one realtime data stream (FIG. 11, block 200). The realtime kernel 20 creates a stream handler in accordance with the stream handler specification (FIG. 11, block 202). The stream handler typically includes a mixing function that is specified in the one or more stream handling instructions. The mixing function is used to mix the realtime data stream with at least one other realtime data stream to produce a mixed realtime data stream. The realtime kernel 20 produces a resultant data stream in a process that includes processing a realtime data stream through the created stream handler (FIG. 11, block 204). In some embodiments, this process involves determining configuration parameter values from realtime state information that is specified in the one or more stream handling instructions, and dynamically configuring the stream handler with the configuration parameter values.

Figure 12:
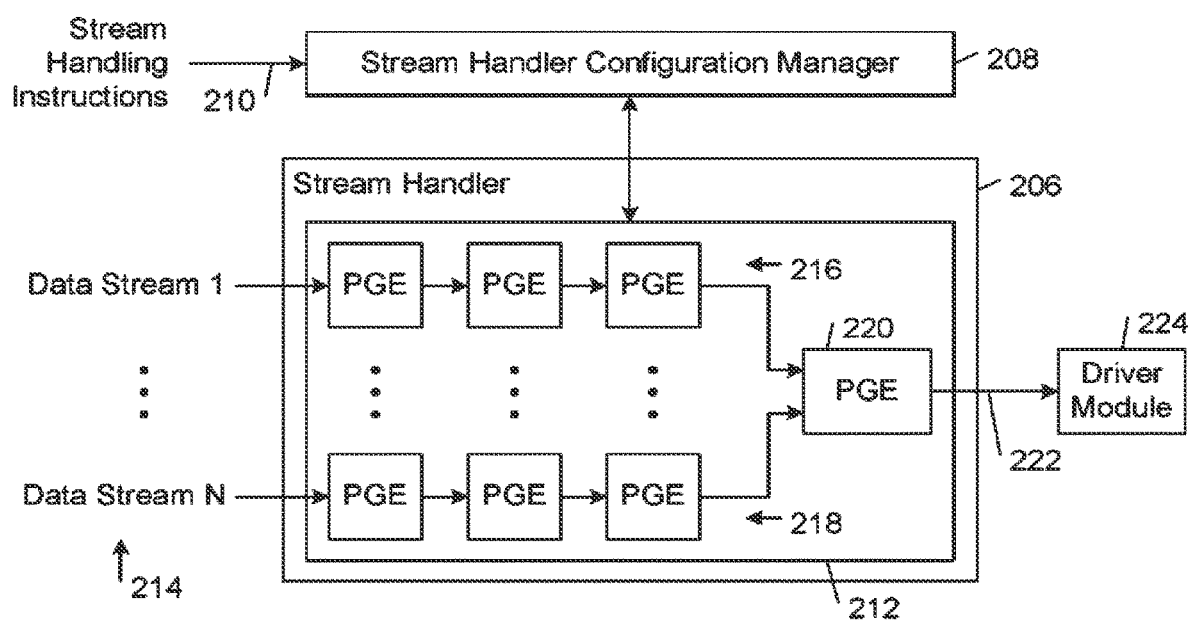
FIG. 12 is a block diagram of an embodiment of a stream handler that is created by a stream handler configuration manager.

FIG. 12 shows an embodiment of a stream handler 206 that is created by a stream handler configuration manager 208 (which is component of the realtime kernel in accordance with stream handling instructions 210 that are received from the area service 26. The stream handler configuration manager 208 typically is composed of one or more constituent services and other components of the realtime kernel 20. The stream handler configuration manager 208 constructs the stream handler 206 from a set of processing objects (also referred to as processing graph elements or PGEs). Each of the processing objects is a software object that is capable of performing a particular function on a data stream (e.g., a transformation function, a splitting function, and a mixing function). The stream handler configuration manager 208 instantiates the processing objects that are specified in the one or more stream handling instructions and assembles the instantiated processing objects into a directed graph component 212 of the stream handler 206 in accordance with the specification. In some embodiments, the stream handling instructions specify the processing objects with respective unique identifiers and the stream handler configuration manager 208 instantiates the processing objects by issuing calls that include respective ones of the identifiers to a processing object API. The stream handler 206 is configured to process multiple data streams 214 of a particular data type (e.g., audio, video, and motion data types) through respective processing chains 216-218, which are composed of respective ones of the processing objects. The stream handler 206 additionally includes a mixing object 220 (which was specified in the one or more stream handling instructions). In operation, the stream handler 206 executes the mixing object 220 to produce a mixed realtime data stream 222 from a combination of the processed realtime data streams 216-218. In some embodiments, at least one of the instantiated processing objects encapsulates a respective call to a driver module 224, which controls a hardware component of the local network node based at least in part on the resultant data stream 222.

g. Realtime Task Scheduling

Figure 13:
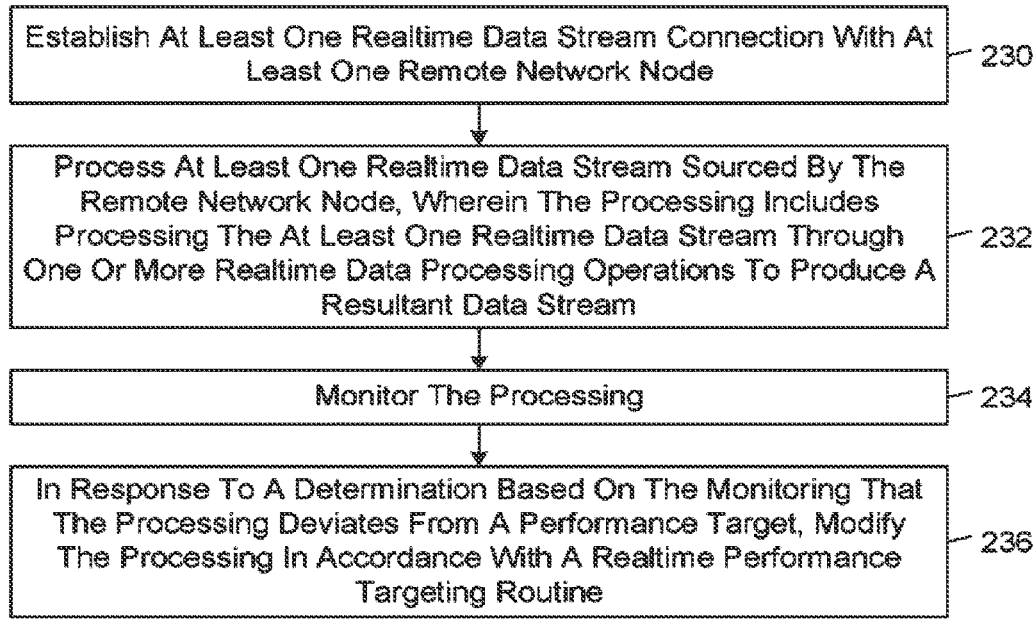
FIG. 13 is a flow diagram of an embodiment of a method that is implemented by an embodiment of the realtime kernel of FIG. 8 in a process of scheduling tasks that are performed by the realtime kernel.

FIG. 13 shows an embodiment of a method that is implemented by the realtime kernel 20 in a process of scheduling tasks that are performed by the realtime kernel 20.

In accordance with the method of FIG. 13, the realtime kernel 20 establishes at least one realtime data stream connection with at least one remote network node (FIG. 13, block 230).

The realtime kernel 20 processes at least one realtime data stream that is sourced by the remote network node (FIG. 13, block 232). In this process, the realtime kernel 20 processes the at least one realtime data stream through one or more realtime data processing operations to produce a resultant data stream.

The realtime kernel 20 monitors the processing of the at least one realtime data stream (FIG. 13, block 234). In some embodiments, the realtime kernel 20 monitors one or more of the following parameters: the rate at which the resultant data stream is produced; utilization of at least one processor of the local network node; and bandwidth utilization by at least one networking resource of the local network node. In some embodiments, the realtime data stream is packetized into frames and the realtime kernel 20 monitors the processing of each of each of the frames during each of successive fixed length intervals that are set in accordance with a local clock, which typically is synchronized with a remote master clock service. Based on the monitoring, the realtime kernel 20 determines whether or not the processing of the realtime data stream deviates from a performance target. In some embodiments, the performance target includes a time-based threshold on the production of the resultant data stream. For example, in some embodiments, the performance target is a predicate (i.e., condition) on the rate at which frames of the resultant data stream are produced. Exemplary performance targets of this type include a target threshold and a target range.

In response to a determination that the processing of the at least one realtime data stream varies from a performance target, the realtime kernel 20 modifies the processing in accordance with a realtime performance targeting routine (FIG. 13, block 236).

Figure 14:
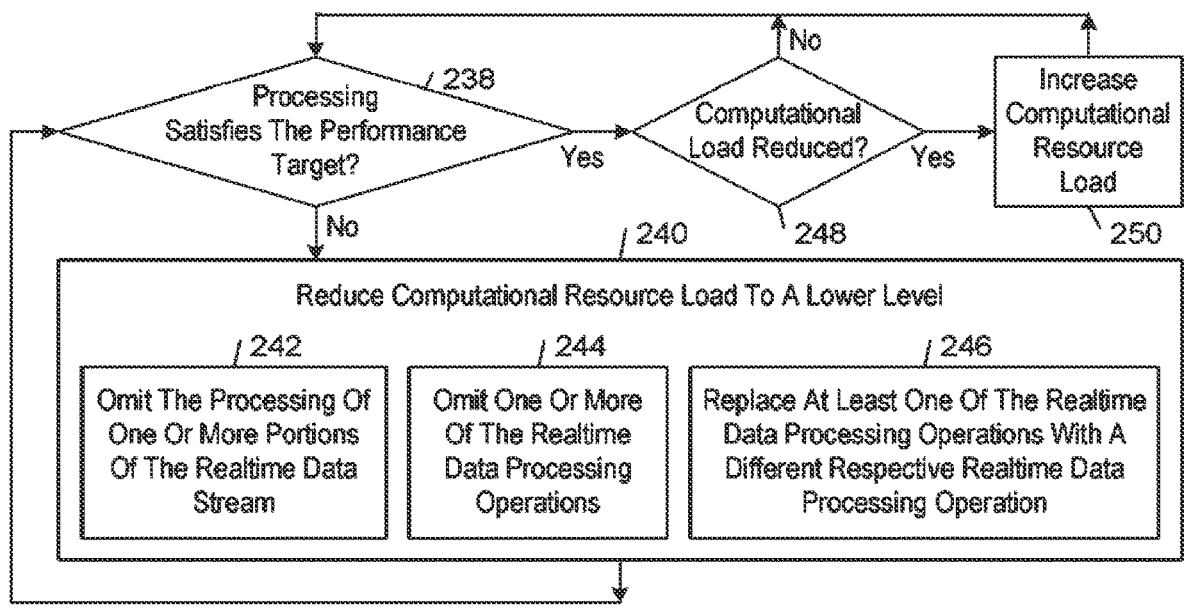
FIG. 14 is a flow diagram of an embodiment of a method that is implemented by an embodiment of the realtime kernel of FIG. 8 based on the monitoring of the processing of the at least one realtime data stream.

FIG. 14 shows an embodiment of a method that is performed by the realtime kernel 20 based on the monitoring of the processing of the at least one realtime data stream. In response to a determination that the processing of the at least one realtime data stream fails to satisfy the performance target (FIG. 14, block 238), the realtime kernel 20 reduces that computational resource load to a lower level (FIG. 14, block 240). Depending on the design of the realtime performance targeting routine, the realtime kernel 20 typically reduces the computational resource in one or more of the following ways: the realtime kernel 20 may omit the processing of one or more portions of the realtime data stream (FIG. 14, block 242); the realtime kernel 20 may omit one or more of the realtime data processing operations (FIG. 14, block 244); and the realtime kernel 20 may replace at least one of the realtime data processing operations with a different respective data processing operation (FIG. 14, block 246). In the process of omitting the processing of one or more portions of the realtime data stream (FIG. 14, block 242), the realtime kernel 20 typically performs at least one of the following operations: omitting one or more of the data processing operations that are characterized by respective performance values that are outside the performance target; and preferentially omitting one or more of the data processing operations based on priority values that are respectively assigned to ones of the data processing operations.

If the processing of the at least one realtime data stream satisfies the performance target (FIG. 14, block 238) and the computational load has been reduced to a lower level by any of the methods described above (FIG. 14, block 248), the realtime kernel 20 increases the computational load from the lower level (FIG. 14, block 250). The realtime kernel 20 typically increases the computational resource load by reversing one or more of the operations that were used to reduce the computational resource load in block 240 in accordance with a heuristic. If the processing of the at least one realtime data stream satisfies the performance target (FIG. 14, block 238) and the computational load has not been reduced to a lower level by any of the methods described above (FIG. 14, block 248), the realtime kernel 20 maintains the current processing of the realtime data stream.

In some embodiments, the realtime kernel 20 instantiates processing objects that perform respective ones of the data processing operations on the at least one realtime data stream. The realtime kernel 20 builds a directed graph from ones of the instantiated processing objects and processes the at least one realtime data stream through the directed graph.

Depending on the realtime performance targeting routine, the realtime kernel 20 may modify the processing of the realtime data stream by pruning one or more of the instantiated processing objects from the directed graph. In some embodiments, the processing objects are assigned respective priority values, and the realtime kernel 20 prunes processing objects by removing ones of the instantiated processing objects from the directed graph based on the assigned priority values. For example, in some of these embodiments, the pruning includes removing from the directed graph ones of the instantiated processing objects having assigned respective priority values that fail to satisfy a priority threshold.

In some embodiments, the realtime kernel 20 builds from ones of the instantiated processing objects a second directed graph that is used to process a second realtime data stream that is sourced by one of the local network node and the at least one remote network node. In some of these embodiments, the first and second directed graphs are assigned respective priority values, and the realtime kernel modifies the processing of the first and second realtime data streams by preferentially modifying one of the first and second directed graphs based on the assigned priority values. For example, the realtime kernel may tear down the one of the first and second directed graphs that is assigned a lowest priority value.

In some embodiments, the realtime kernel 20 processes a second realtime data stream through the directed graph, where the second realtime data stream is sourced by one of the local network node and the at least one remote network node. In some of these embodiments, the first and second realtime data streams are assigned respective priority values, and the realtime kernel 20 preferentially modifies the processing of one of the first and second realtime data streams based on the assigned priority values.

In some embodiments, the realtime kernel 20 establishes respective realtime data stream connections between the local network node and multiple remote network nodes. The realtime kernel 20 processes through the directed graph realtime data streams that are sourced by respective ones of the remote network nodes. In some of these embodiments, the realtime data streams are assigned respective priority values, and the realtime kernel 20 preferentially modifies the processing of one or more of the realtime data streams based on the assigned priority values. The directed graph typically includes multiple directed chains of respective ones of the instantiated processing objects. The realtime kernel 20 typically processes a respective one of the realtime data streams through each of the directed chains. In some of these embodiments, the realtime kernel 20 iteratively modifies the processing of the realtime data streams until the processing is within the specified performance target. During each of the iterations, the modifying typically includes performing one or more of (i) removing one or more of the chains from the directed graph and (ii) pruning one or more of the instantiated processing objects from the directed graph.

V. EXEMPLARY REALTIME KERNEL EMBODIMENT

A. Introduction

Figure 15:
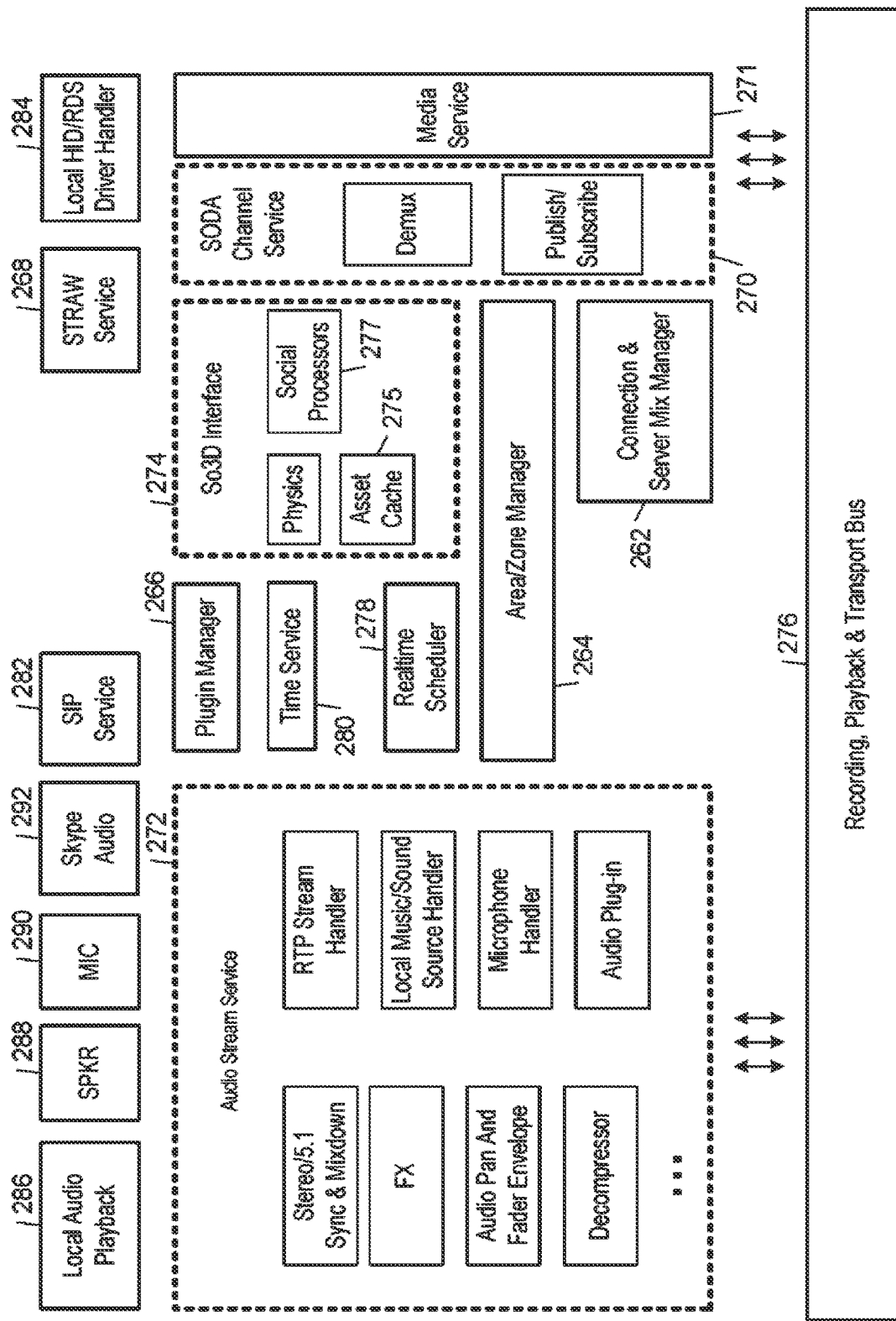
FIG. 15 is a block diagram of an embodiment of the realtime kernel of FIG. 8.

FIG. 15 shows an embodiment 260 of the realtime kernel 20. The realtime kernel 260 supports remote configuration and execution of a 2D/3D graphics rendering engine and an audio mixing and switching engine on different network nodes to create a sense of physical presence between two or more communicants. In the process of managing all communicants interacting in a single virtual area instance at one time, the area service 26 remotely configures the sessions between the realtime kernel 260 and other network nodes via a packet transport component (referred to herein as the STRAW service 268) of the realtime kernel 260. In some embodiments, the realtime kernel 260 configures data streams (e.g., realtime audio data streams) point-to-point (P2P), so as to minimize communication with the area service 26. The area service 26 also can mix data streams and pipe them to client network nodes when necessary. The realtime kernel 260 will report P2P connection failures to the area service 26 so that the area service 26 can determine when to mix data streams for the client network nodes. The realtime kernel 260 has a small initial footprint, and loads updates and incremental functionality over network connections as plugins.

The realtime kernel 260 includes a set of managers and services. Among the realtime kernel managers are a connection and service mix manager 262, an area/zone manager 264, and a plugin manager 266. Among the realtime kernel services are a STRAW service 268, a SODA handler service 270, a media service 271, an audio stream service 272, a So3D interface service 274, an asset cache service 275, one or more social processors 277, a recording, playback, and transport bus service 276, a realtime scheduler service 278, a time service 280, a SIP service 282, a local HID/RDS driver handler service 284, and interface services for local audio devices including local audio playback 286, a local speaker 288, a local microphone 290, and Skype® audio. In one exemplary embodiment, the realtime kernel 260 is implemented by the following runtime package components:

LIBRARIES:

| Library Name | Description |
| --- | --- |
| SORK.DLL | Realtime scheduler 278 |
| Compress.DLL | Compression engine |
| Media.DLL | Media Service 271 for streaming audio transport |
| SODA.DLL | SODA channel service 270 for streaming SODA definition transport |
| GIPS.DLL | GIPS voice components |
| OpenAL.DLL | Open Audio Library for sound card support |
| AudioSvc.DLL | Audio stream service 272 |
| TransBus.DLL | Media transport bus including Audio stream service 272 |
| OpenAL.DLL | Sound card |
| STRAW.DLL | STRAW Service 268 (packet transport engine) |
| CSMMgr.DLL | Connection and Server Mix Manager 262 |
| AreaZone.DLL | Area/Zone Manager 264 |
| ArtCache.DLL | Asset Cache service providing SODA interface to art in local db |
| So3D.DLL | SODA interface to the 3D rendering engine |
| TimeSID.DLL | Network time standard interface |
| PlugInMgr.DLL | Plugin manager |

OTHER PLUGINS:

Encryption algorithm
Compression algorithm
Authentication algorithm
Credential
Audio Mix
Audio Source
Audio Codec
Audio Calculation
Graphical effect
Physics extension
Script extension
Input device hosting

B. Realtime Kernel Design

As shown in FIG. 15, the realtime kernel 260 is designed as a collection of services, plugins and a realtime scheduler, which constitute a platform for rendering virtual area communication environments in accordance with instructions received from the area service 26. Services work together to implement the platform, operating at different levels—from network features through audio and graphics rendering configuration. Plugins are of various classes, each adhering to a Plugin Management API, each with its own class API. The realtime scheduler 278 ensures that audio and graphic rendering occur at an even frame rate. The platform is configured in accordance with an instance of a virtual area by area service 26 through SODA definition records transmitted over a STRAW UDP socket (see section VI, which contains SODA definitions for an exemplary set of SODA records). The STRAW service 268 de-multiplexes SODA record streams using a publish/subscribe model. SODA records are transmitted only when a subscriber exists on the other end of a STRAW socket. Received SODA records are delivered to one or more subscribers on arrival. Services support local APIs for use by the So3D graphics engine and the HUD 84.

The following sub-sections describe the installation, design, and operation of embodiments of the realtime kernel 260 and its components.

1. Installation
a. Overview

In some embodiments, the virtual area based rendering platform is downloaded as a software package over the internet as an installation package. It is delivered by HTTP download from a download server. On client network nodes operating a Microsoft® Windows® operating system, the platform software package is a .msi package. The initial installation is a single package that is amended on the download server as updates become available. When a new client network node performs a current installation, no other updates are needed until such time as subsequent updates are created.

The realtime kernel 260 makes use of plugins to customize applications. Necessary plugins are included in the installation package. From time to time components may be updated independently (e.g., realtime kernel services may be point-released and plugins may be added). In this case a separate Windows®.msi installation package may be created for the point release and registered with an update server. The installed platform software will be informed of the update and will offer the communicant the option of upgrading. Some communicants may delay upgrading until more than one update is available. When the communicant finally agrees to upgrade, all available updates will be loaded and applied sequentially.

Multiple versions of a plugin may be present on a client network node at the same time. This is because the client network node typically negotiates features, and chooses the plugin that suits the API and version requirements. Each plugin advertises its API and variants. The plugins will have different file names to avoid name collision in the file system. Two plugins with the same API and different variants are different implementations, and the choice is made by the service requesting the plugin (perhaps by negotiation with a server for instance). When a plugin is loaded with the same API and variant as an existing plugin, this is a bug-fix. The new plugin replaces the old one. Services are always replaced by an upgrade. There are never two services with the same API. The Windows® installation uses a manifest and bundled Windows® dependent DLLs, to guarantee a functioning product regardless of the update state of the Windows® environment. The Windows® side-by-side feature is used to avoid conflicting with other product installation requirements.

b. Update Server

The update server contains installation packages for each supported host operating environment, and upgrade packages for each previous supported installation package.

The client network node and the update server communicate over a reliable STRAW channel. The update server publishes available upgrade definitions for each supported host operating environment. The virtual area based rendering platform software that is installed on the client network node subsequently may subscribe to an upgrade. The update server begins sending the desired software piecemeal.

In some embodiments, a client version and upgrade tool is installed on each client network node to allow the user to see the current client software version, list available upgrades and start and monitor the upgrade process. The client network node will keep a table of the GUIDs of the upgrade packages that have been applied. It will present this list to the update server, and in return get a list of pending upgrades by GUID, in order of application. They will have attached description, size and date attributes.

An upgrade is marked "applied" only when the download completes, and the automatic install reports success. The automatic install process includes stopping any running SORK services so the DLLs can be overwritten. Downloading an upgrade is done through a sequence of SODA records, so the process can be interrupted and resumed without repeating any data transfer. The records include the upgrade GUID and an offset.

Since there is no requirement for rolling back or uninstalling, there is no need for any Microsoft® Windows® "side-by-side" library manifests. Any required libraries can be loaded as part of the upgrade.

The upgrade tool will make a registry entry or keep a file, containing the GUIDs of applied upgrades as well as the GUID of any current loading upgrade, its offset and a reference to the file on disk containing the data "so far". Upgrade packages are deleted once applied. If it is desirable to cache an upgrade package for multiple client network nodes, then point them each at the same client proxy which will do the caching.

c. Update Local Database

The client network node stores the virtual area based rendering platform services and plugins in an asset directory in local file system. The services and plugins are self-describing, through APIs and attached resources. No further information is kept on the client network node software state. When a client network node reinstalls the virtual area based rendering platform software, perhaps after an OS upgrade, existing plugins typically are revalidated. The fresh installation includes all basic services and plugins, but there may be present on the machine optional or application-specific plugins, which typically are deleted or re-validated. In some embodiments, the binary content of valid plugins is hashed and one-way encrypted and the resulting value is stored as an attached resource that is used to check whether or not the plugins are authentic. To validate a suspected plugin, the current plugin content is rehashed and encrypted, and the resulting value is compared with the existing resource. If the content does not match the resource, then the plugin is invalid.

d. Client Authentication

Network authentication typically is made once each time the realtime kernel 260 is launched. In some embodiments, an account server running the account network infrastructure service is used to authenticate the communicant and establish a real user identifier (RUID) for the communicant. The account server creates a token (subsequently included as part of the RUID) and gives it to the client network node to authenticate itself to other servers. In this process, the client network node is securely issued a credential at installation time. The credential typically is a CA-defined certificate that is signed by a certificate authority. The certificate contains a private and public key. The virtual area based rendering platform installation package creates a new credential containing just the public key. The private key is stored securely on the client network node. The virtual area based rendering platform installation package creates a signature using the private key to encrypt a digest of a communicant-supplied password, and transmits the signature securely to the account server. The account server recovers the digest and stores it as the client identifying secret.

When establishing connections, the realtime kernel 260 shares the credential with the account server. The account server responds with its credential (e.g., a server-side certificate). The client network node and the account server validate the credentials using a registration authority. Once verified, the server-side credential is valid for any server anywhere.

In some embodiments, the account server also provides a random 128-bit challenge phrase to the client network node. The client network node hashes the challenge phrase with a cryptographic digest of the communicant-provided password and returns this as a response. The account server also hashes the challenge phrase with the previously-obtained digest for that communicant and verifies that the response from the client network node matches. The network connection is now authenticated and the communicant is identified as the owner of the private key.

In some embodiments, the account server assigns to the communicant a random Client ID with attached signatures. The signature is a 128-bit hash of the Client ID encrypted using the account server private key. The signature can only be created by the account server. Anyone receiving the token can validate the communicant by decrypting the digest using the public key published by the account server and comparing it with the Client ID.

e. Account Server Authentication

Figure 16:
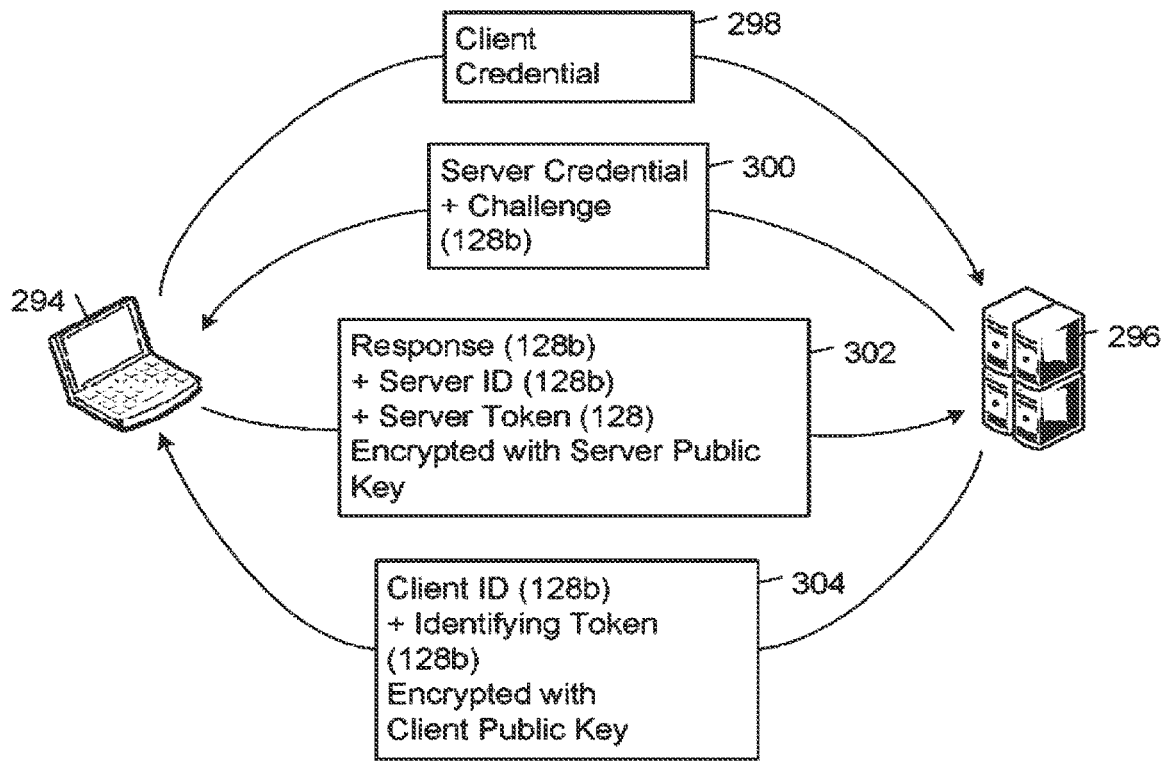
FIG. 16 is a flow diagram of an embodiment of a method by which an account server is authenticated through its credential.

FIG. 16 shows an embodiment of a method by which an account server 296 is authenticated through its credential. In accordance with this method, a client network node 294 and the account server 296 exchange credentials (FIG. 16; blocks 298, 300). The client network node 294 issues a Server ID and Server Token to the account server 296 for later fast validation of the account server 296 to the client network node 294 (FIG. 16; block 302). The account server 296 then issues the Client ID and an attached identifying token to the client network node 294 (FIG. 16; block 304). The authentication phase on the stream to the account server is encrypted using the participants' public keys.

2. Initialization Sequence

Figure 17:
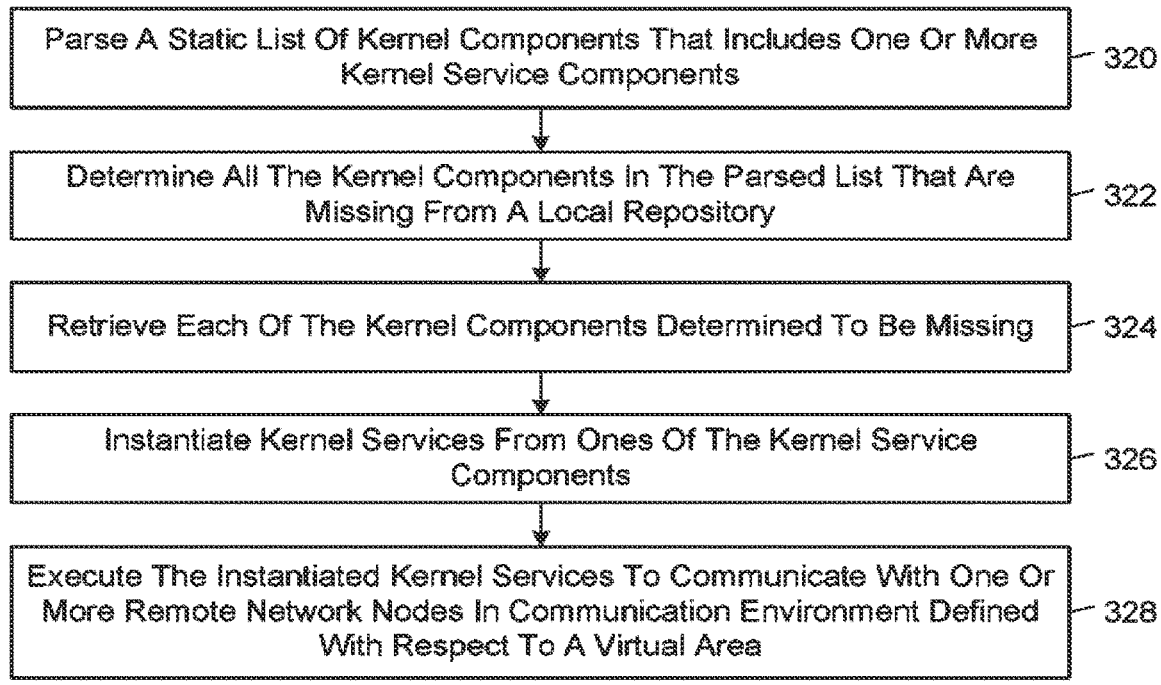
FIG. 17 is a flow diagram of an embodiment of a method that is implemented by a loader component of an embodiment of the realtime kernel of FIG. 8.

FIG. 17 shows an embodiment of a method that is implemented by a loader component of the realtime kernel 260 each time the operating system on the client network node is launched. In this process, the loader parses a static list of kernel components that includes one or more kernel service components (FIG. 17, block 320). The loader determines all the kernel components in the parsed list that are missing from a local repository (e.g., a directory in the loCal file system) (FIG. 17, block 322). The loader retrieves each of the kernel components that is determined to be missing (FIG. 17, block 324). In some embodiments, the loader instantiates on the client network node an update service that retrieves the missing kernel components from a remote network node (e.g., the download server or the update server). After the missing kernel components have been retrieved, the loader instantiates kernel services from respective ones of the kernel service components (FIG. 17, block 326). The instantiated kernel services are executed to communicate with one or more remote network nodes in a communication environment that is defined with respect to a virtual area (FIG. 17, block 328). For example, in some embodiments, the HUD 84 invokes the kernel services to communicate with an area server in order to establish a HUD session or an area session as described in detail herein.

In some embodiments, the following services of the realtime kernel 260 are loaded at boot time as Windows® service DLLs:

STRAW service 268
SODA service 270
media service 271
audio stream service 272
connection and server mix manager 262
area/zone manager 264
asset cache service 275
realtime scheduler service 278
HUD 84
default plugins In these embodiments, services are loaded by name, not by GUID. Only one copy of each service is present on a client network node at one time. After loading, the SODA channel service 270, the media service 271, the audio stream service 272, the area/zone manager, and the realtime scheduler service wait idle. The connection and server mix manager leaves audio un-configured and waits for a definition of a connection to an area server. The default plugins are registered by GUID as API class objects. They are loaded when referenced by GUID in a definition. The HUD 84 contacts the account server, authenticates and identifies the communicant. The HUD 84 creates a stream to the rendezvous network infrastructure service and the interaction network infrastructure service and populates its most recently used (MRU) friends and area lists and its frequency friends and area lists. The asset cache service 275 typically contacts the art database server and begins to cache digital resources according to a heuristic and update its GUID map.

3. Sessions

The realtime kernel 260 manages sessions between the client network node and other network nodes. During a session, data is shared between a server and the client network node as SODA definition records over STRAW sockets. Data is shared in a publish/subscribe model. The realtime kernel 260 subscribes only to the data the client network node needs. To subscribe, the realtime kernel 260 creates a STRAW channel to the desired server. A STRAW channel is negotiated by well-known GUID for a particular virtual area. In some embodiments, STRAW sockets are connected using an address that is provided through a configured DNS.

The area service will send publish messages indicating the data streams that are available to the communicant, tagging each with a GUID handle. The realtime kernel 260 then sends subscribe messages for the desired data streams. Any changes to area service data for the subscribed channels are sent as SODA definition records to all client network nodes that have subscribed to those channels.

There are two primary types of sessions: (a) a HUD session, which involves displaying current relationship and presence information in the HUD 84; and (b) an area session, which involves either lurking or entering a virtual area instance.

a. HUD Session

In a HUD session, the HUD 84 contacts the account server, the RUID server, and the rendezvous server, and through STRAW channels subscribes to the communicant's own account and relationship information. The HUD 84 then subscribes to presence information for closely-related contacts and virtual areas. At this point the HUD 84 can display dynamic presence information for closely-related contacts.

b. Area Session

In an area session, the HUD 84 subscribes to information about related virtual areas. In some embodiments, a directory server is consulted to determine the current area server hosting a virtual area specified by the HUD. A STRAW stream is created to the current area server.

The HUD subscribes to the presence data that is associated with the virtual area and updates its 2D head-up display with the names of the other communicants currently participating in the virtual area. At this point the communicant is "lurking" in the virtual area. The presence of a communicant can be displayed in a pop-up list, and an icon is displayed in the HUD area representation (e.g., in the Office place tile shown in FIGS. 5A-5C).

If the communicant directs the HUD 84 to enter a virtual area, then the realtime kernel informs the rendezvous service of the communicant's request to enter the virtual area. Other communicants that are subscribed to the presence information that is associated with the virtual area are informed of the new communicant that has entered the virtual area.

The realtime kernel 260 directs the So3D engine to launch an interactive environment. The So3D engine subscribes to the area server environment data (e.g., rendering and motion data). The area server begins to stream the requested area server environment data to the realtime kernel 260. The realtime kernel passes the requested data to the So3D engine, which renders the data according to the current visualization mode (e.g., 2D overhead view, low-resolution view, or fully immersive 3D view).

The area server defines raw microphone audio media streams between the client network nodes that are associated with objects in the virtual area. The area server also creates definitions of audio mix elements according to audio handling instructions (e.g., spatial effects definitions and zone definitions) in the virtual area specification. The connection and server mix manager 262 listens for audio definitions, which include GUID handles for each P2P audio stream, and creates media streams for each definition. Each of the media streams is registered with the local transport bus 276 and appropriate audio mixing components are created by the audio stream service 272. The area/zone manager 264 also subscribes to SODA definitions for audio and for avatar motion and orientation data. The area/zone manager 264 controls gain/mute of each audio stream as the communicant's avatar navigates the virtual area.

In some embodiments, the area/zone manager 264 additionally subscribes to relationship data, which the area/zone manager 264 uses to control avatar orientation/movement/pose within the virtual area via social processors 277 (see FIG. 15). In this process, the area/zone manager 264 sets parameter values of the social processors 277 based on the positions of the avatars in the virtual area and the relationship data. In this way, relationships can be indicated by changing the positions and orientations of an avatar's head when a communicant speaks (e.g., turning the avatar to face another avatar as it enters a zone of the virtual area, or orienting the avatar for optimal viewing of a view screen when a media zone of the virtual area is entered). In some embodiments, the social processors 277 are defined by third party developers and delivered to the client network nodes via plugins. Each social processor 277 is a set of instructions that are executed automatically when a specific event occurs (e.g., automatic motion triggered by proximity to other avatars, or position in an area, or both). A social processor 277 can be any arbitrary programmatic routine that controls the motion of avatars or objects in a virtual area. For example, in some embodiments, if an avatar approaches a view screen, one type of the social processor automatically snaps the avatar to a grid that is defined in the virtual area specification and centers the avatar in front of the view screen so that the user can easily see the contents of the view screen. In this way, the need for complex manipulation of movement of the avatar is eliminated. Another type of social processor 277 automatically pivots and turns an avatar to acknowledge the presence of another user. For example, an embodiment of this type of social processor is configured to automatically re-orient avatars in a virtual area from facing each other to respective orientations in which the avatars are facing a new communicant's avatar in response to the entry of the new communicant into the virtual area. In this case, the communicants that are associated with the avatars originally in the virtual area do not have to manipulate their avatars manually; instead, the social processor automatically rotates their heads to acknowledge the presence of the new communicant.

4. Managing Sessions

Figure 18:
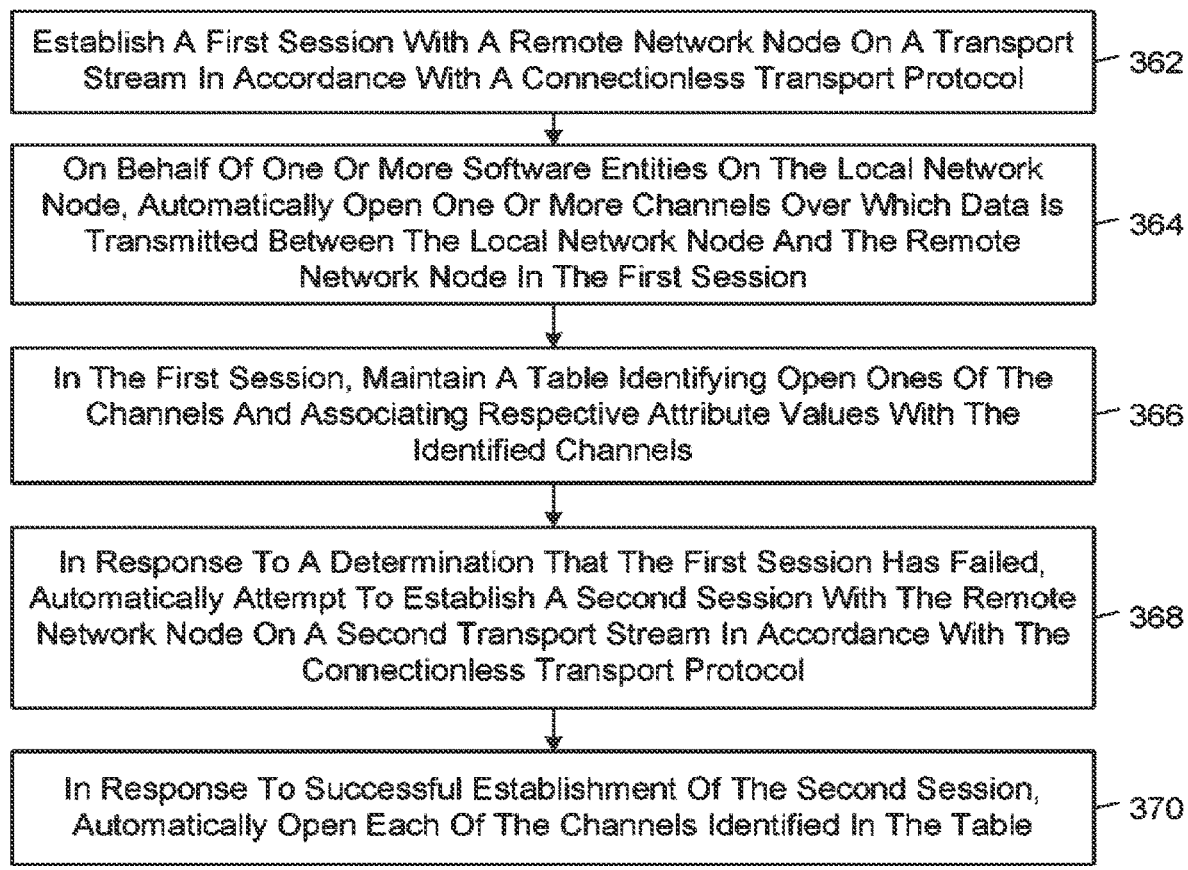
FIG. 18 is a flow diagram of an embodiment of a session management method that is implemented by a STRAW service component of an embodiment of the realtime kernel of FIG. 8.

FIG. 18 shows an embodiment of a session management method that is implemented by the STRAW service 268.

In accordance with the method of FIG. 18, on a local network node, the STRAW service 268 establishes a first session with a remote network node on a transport stream in accordance with a connectionless transport protocol (e.g., UDP) (FIG. 18, block 362). The STRAW service 268 creates a definition of the session, where the definition includes an Internet protocol (IP) address, a port address, and a globally unique identifier of a transport protocol. The STRAW service 268 sends the definition to the remote network node. The STRAW service 268 determines a first station definition that is assigned to the remote network node and stores the first station definition in the table as an attribute of each of the open channels. In this process, the STRAW service 268 parses a station definition record that is received from the remote network node. The station definition record includes a set of fields, where each of the fields is defined by a respective field type and an associated field value, and each of the field types is identified by a respective globally unique identifier (GUID).

On behalf of one or more software entities on the local network node, the STRAW service 268 automatically opens one or more channels over which data is transmitted between the local network node and the remote network node in the first session (FIG. 18, block 364). In this process, the STRAW service 268 sends to the remote network node records defining the local publish channels and a record of each of the local subscribe channels having an identifier that matches an identifier of one of the remote publish channels.

In the first session, the STRAW service 268 maintains a table that identifies open ones of the channels and associates respective attribute values with the identified channels (FIG. 18, block 366). The STRAW service 268 records attributes of local publish channels available from the local network node, local subscribe channels requested by the one or more software entities, remote publish channels available from the remote network node, and remote subscribe channels requested by the remote network node. In this process, the STRAW service 268 maintains for each of the local publish channels a record that includes an identifier of one of the software entities indicating a capacity to publish data on the local publish channel, an identifier of a remote network node subscribing to the local publish channel, and an identifier of the local publish channel. The STRAW service 268 maintains for each of the local subscribe channels a record that includes an identifier of one of the software entities subscribing to the local subscribe channel, an identifier of a remote network node indicating a capacity to publish data on the local subscribe channel, an identifier of the local subscribe channel, and one or more network transport parameters associated with the local subscribe channel. The STRAW service 268 maintains for each of the remote publish channels a record that includes an identifier of a remote network node indicating a capacity to publish data on the remote publish channel, and an identifier of the remote publish channel.

The STRAW service 268 transmits data between the local network node and the remote network node on the one or more open channels in the session. In some embodiments, the data is transmitted in the form of records each of which includes a set of fields. Each of the fields of a record is defined by a respective field type and an associated field value, and each of the field types is identified by a respective Gum. Some of the records are media records that contain media data, which includes packets of renderable data. Other records are configuration records that contain configuration data, which includes definitions of configuration settings. The media records and the configuration records typically are encapsulated in transport records over the transport stream. The media records typically are compressed using a first data compression service and the configuration records typically are compressed using a second data compression service. On transmission, the STRAW service 268 associates the transport records with identifiers of respective ones of the channels on which they are transmitted, encrypts the transport records, and sequences the encrypted transport records. On reception, the STRAW service 268 decrypts the transport records and dispatches the media records and the configuration records contained in the decrypted transport records to subscribing ones of the software entities.

In response to a determination that the first session has failed, the STRAW service 268 automatically attempts to establish a second session with the remote network node on a second transport stream in accordance with the connectionless transport protocol (FIG. 18, block 368). In some embodiments, the STRAW service 268 determines that the first session has failed in response to a determination that the current station definition assigned to the remote network node is different from the first station definition that was assigned to the remote network node when the first session was established.

In response to successful establishment of the second session, the STRAW service 268 automatically opens each of the channels identified in the table (FIG. 18, block 370).

5. Processing Data Streams

The realtime kernel 260 supports remote configuration of stream handlers for processing data streams that are received by a client network node from other network nodes. In response to instructions that are received from the area service 26, various services and other components of the realtime kernel 260 cooperatively construct and configure directed graphs of processing elements into stream handlers that are used to process data streams. The area service instructions configure the stream handlers in accordance with a virtual area application being hosted by a virtual area that is managed by the area service 26.

Figure 19:
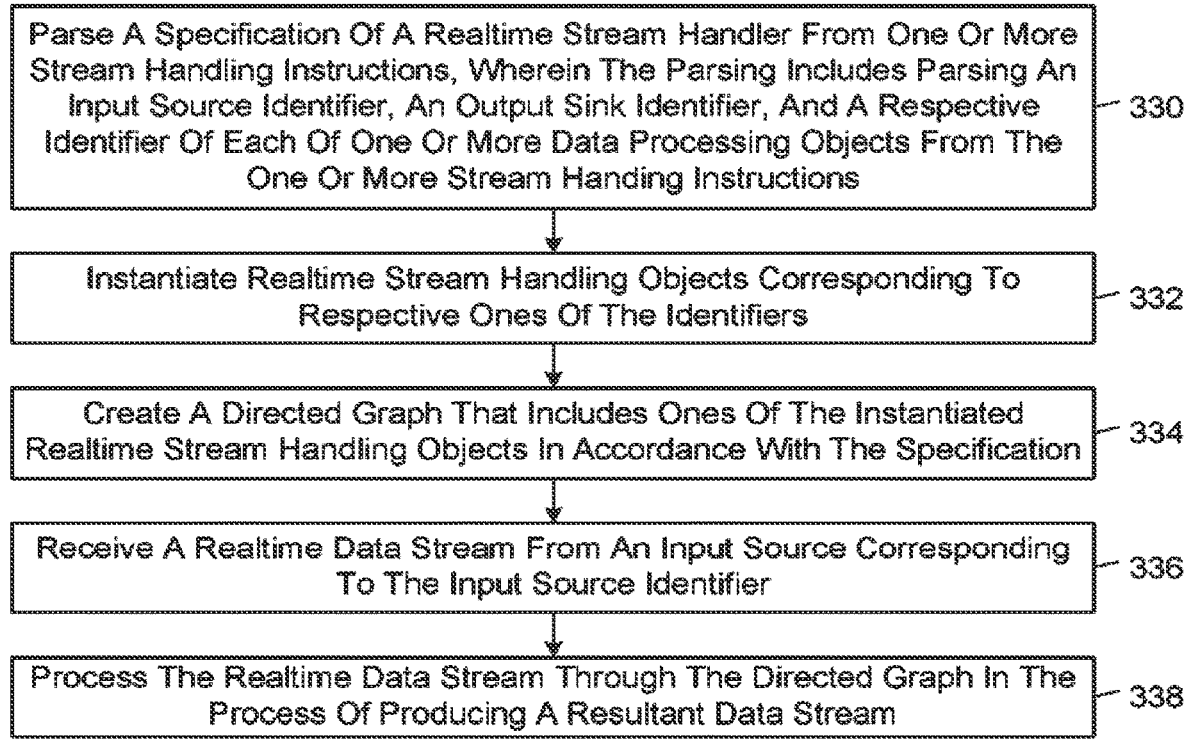
FIG. 19 is a flow diagram of an embodiment of a method that is implemented by components of an embodiment of the realtime kernel of FIG. 8 in response to remote stream handling instructions that are received from an area network infrastructure service.

FIG. 19 shows an embodiment of a method that is implemented by components of the realtime kernel 260 in response to remote stream handling instructions that are received from the area service 26.

In accordance with the method of FIG. 19, the realtime kernel 260 parses a specification of a realtime stream handler from one or more stream handling instructions (FIG. 19, block 330). In this process, the STRAW service 268 receives SODA definitions for configuring a stream handler from the area service 26. The STRAW service 268 dispatches the SODA definitions to the connection and server mix manager 262 and the area/zone manager 264. The connection and server mix manager 262 parses an input source identifier, an output sink identifier, and a respective identifier of each of one or more data processing objects from the one or more stream handing instructions.

The connection and server mix manager 262 instantiates realtime stream handling objects corresponding to respective ones of the identifiers (FIG. 19, block 332). The connection and server mix manager 262 registers the instantiated objects with the transport bus 276.

The transport bus 276 creates a directed graph that includes ones of the instantiated realtime stream handling objects in accordance with the specification (FIG. 19, block 334). The area/zone manager 264 passes audio calculation SODA definitions to specified audio calculation objects in the directed graph.

The STRAW service 268 receives a realtime data stream from an input source corresponding to the input source identifier (FIG. 19, block 336). The STRAW service 268 passes the realtime data stream to the media service 271, which processes the stream and passes it to the transport bus 276. The transport bus 276 executes the processing graph elements of the stream handler in sequence to perform the specified processing of the realtime data stream.

The stream handler produces a resultant data stream at an output sink corresponding to the output sink identifier (FIG. 19, block 338). The resultant data stream then is passed to rendering components of the client network node.

6. Services and Other Components of the Realtime Kernel

The components of the realtime kernel 260 include services, plugins, and libraries.

a. Compressor Library

| APIs: |
| --- |
| Compressor::Ctor( ) |
| Compressor::KeyFrame(preload) |
| Compressor::Compress(data, size, target) |
| Compressor::Decompress(data, size, target) |
| Compressor::Dtor( ) |
| Services: |
| Compressor |
| Client of: |
| PlugInMgr |

The compressor library implements an optional compression layer for transport data. It is not intended to compress protocol headers or link negotiation exchanges.

The compressor library is used by the SODA channel service 270 and by the media service 271. When encryption is configured, these services 270, 271 create two compressor instances and pipe channel data through. One compressor instance is used for transmit and the other compressor instance is used for receive.

The compressor library uses a compression/decompression plugin that is configured by variant. It is up to the service to negotiate the compression variant, and provide it to compressor.

b. Audio Stream Service

| APIs: |
|---|
| AudioService::Ctor(TransBus &) |
| AudioService::Mix(guidId, api, variant, owner, AudioComponent*source1, AudioComponent*source2, AudioComponent*&) |
| AudioService::Effect(guidId, api, variant, owner, AudioComponent*, AudioComponent*&) |
| AudioService::Source(guidId, api, device, AudioComponent*&) |
| AudioService::Calculation(guidScript, AudioComponent*, GUID RUIDSource, GUID RUIDSink, param 1, param2) |
| AudioService::Dtor( ) |
| Services: |
| AudioService |
| Client of: |
| TransBus.DLL |
| PlugInMgr.DLL |

In some embodiments, the audio stream service 272 is a Windows® service DLL.

The audio stream service 272 manages audio stream mixing. It defines APIs for creating and configuring audio processing graph elements (also referred to as AudioComponent objects), which are manipulated by the area/zone manager 264. The audio stream service 272 is a client of the transport bus 276. All audio processing graph elements are registered with the transport bus 276.

Audio processing graph elements are created through the plugin manager 266 (PlugInMgr) via the following API calls:

PlugInMgr::APIEnumerate(guiPluginApi)
PlugInMgr::VariantEnumerate(guidIdentifier, guidPluginApi)
PlugInMgr::CreateInstance(guidIdentifier, guidPluginApi, guidVariant)

The invocation of the PlugInMgr::CreateInstance( ) API yields a guidPlugin, representing an instance of the desired variant of the API.

The plugin APIs used for audio processing graph elements are:
Audio Mix
Audio Source
Audio Insert
Audio Send The caller supplies the variant, which is just passed along by the audio stream service 272. The variant represents an implementation of an audio processing graph element, as defined in the virtual area application. The audio stream service 272 then creates an AudioComponent object that encapsulates the plugin instance (guidPlugin). The AudioComponent uses the plugin manager 266 to access the methods of the plugin. The audio stream service 272 creates the correct type of derived AudioComponent for each audio API:
AudioMix
AudioSource
AudioInsert
AudioSend AudioComponent objects are registered with the transport bus 276. The transport bus API is used to link components into a graph. The AudioComponent API supports the operations of the transport bus 276 and the area/zone manager 264. The base class AudioComponent has the API of an AudioSource and an AudioSink, both of which are aspects of the same plugin.

c. STRAW Service

| Services: |
|---|
| STRAW.DLL |
| Client of: |
| Compress.DLL |
| PluginMgr |

(i) Overview

In some embodiments, the STRAW service 268 is a Windows® service DLL.

The STRAW service 268 implements a STRAW transport protocol that enables connection-oriented, encrypted secure socket connections between network nodes over a connectionless transport protocol (e.g., UDP). The STRAW transport protocol uses fixed-length globally unique identifiers (GUIDs) to identify all records and all field types in the records. For example, in some embodiments, a network node (or station) is defined by an IP_Address and a Port. In these embodiments, a STRAW station identification record defines a particular network node with the following set of GUIDs: {GUID1, GUID2, GUID3, GUID4, GUID5, GUIDE}, where
  GUID1 identifies the STRAW record as a SODA record;
  GUID2 identifies the STRAW record as a network node identification record;
  GUID3 is an IP address field tag;
  GUID4 is the IP address of the network node;
  GUID5 is an Port number field tag; and
  GUID6 is the Port number of the network node In these embodiments, the station identification record consists of binary data that can be readily compressed to a small size. In some embodiments, the size of one or more of the STRAW records may be further reduced by omitting the field tags. In these embodiments, both the transmitter and the receiver of the STRAW records know the format of the STRAW records so that the semantics of the field values are known without reference to any field tags.

Figure 20:
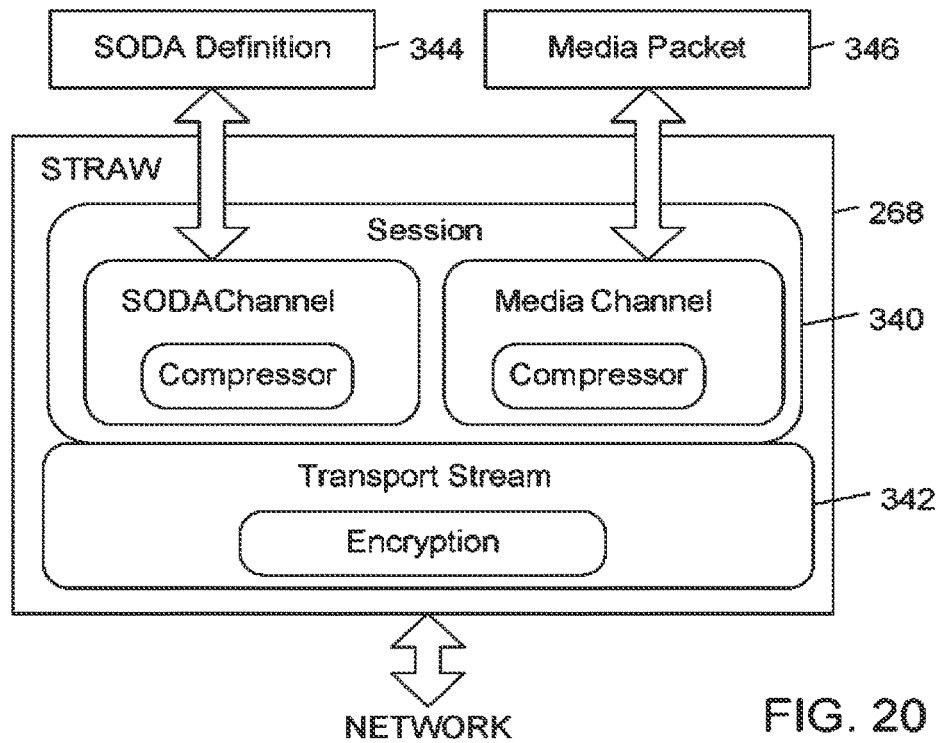
FIG. 20 is a diagrammatic view of components of transport protocol implemented by a STRAW service component of the an embodiment of the realtime kernel of FIG. 8.

Referring to FIG. 20, the STRAW service 268 manages a session 340 on a transport stream 342. In some embodiments, a stream in the context of a STRAW session is defined by a pair of {IP, port} addresses and a transport GUID. A session consists of zero or more logical channels, where a channel is a sequence of records appropriate for a particular kernel manager (e.g., the So3D graphics engine 274, the connection and server mix manager 262, and the area/zone manager 264). More than one kernel manager can receive records from the same stream, differentiated by channel.

The STRAW service 268 manages two kinds of channels: media channels that contain streaming data (e.g., audio); and SODA channels that contain SODA records of definitions (or instructions). STRAW records encapsulate SODA records and media records over a stream. STRAW records are encrypted, sequenced, and include a message integrity field. The sequence is independent of the record source or purpose—it is a link-level feature used to detect out-of-order or missing records.

STRAW records are identified by channel. GUIDs are used as channel identifiers. SODA and media records may be compressed at the channel level, as a stream irrespective of STRAW record encapsulation. Each SODA record contains one or more SODA definitions 344. Examples of SODA definitions include processing graph elements (e.g., Audio-Mix and AudioEffect), 3D rendering assets (e.g., texture and mesh), and RDS (e.g., avatar motion checkpoints). Each media record contains one media packet 346. Examples of media packets include audio codec and text.

Applications publish channels on a session using a well-known GUID ID. Kernel managers subscribe to channels. The publish/subscribe model is connectionless. A kernel manager that subscribes to a channel registers to receive notification of channel state changes and channel records as they arrive.

(ii) Stream Vs. Session Vs. Channel Vs. Record

In the context of STRAW sessions, a stream is a bi-directional UDP socket between two network nodes defined by two IP address/port pairs, and a transport GUID. A stream supports sessions of channels. A session is a logical node-to-node connection. Sessions transport channels for the two nodes. Sessions may pass through one or more proxy stations and are transported over streams that may contain multiple sessions.

A channel is a logical construct that transfers SODA or media records between two network nodes in a session. A channel can be reliable or unreliable, compressed or non-compressed. The content of a channel is identified by a content GUID. Channel records are transported in a sequence of STRAW records sharing the same header CHANNEL_CLIENT ID and with sequential packet numbers and a MAC field. The MAC calculation depends upon the packet sequence on the given channel in one direction only. All records transmitted on a single channel share a single set of configuration parameters (e.g., {Client, reliable, compressed}). Records on a single channel are compressed as a serial stream. Only reliable channels normally can be compressed. In some embodiments unreliable channels can be compressed with a compression process in which compression restarts on each key frame. In the case of a lost packet on an unreliable channel, records on that channel are discarded until a key frame is reached (because they cannot be decompressed out of order).

Compression uses Compress.lib. To improve compression a channel definition can include preload data, which is run through the compressor but not transmitted. The purpose is to prime the compression state tables with common phrases. The compression state table is reset and rebuilt each time a key frame is received.

| Encrypt STRAW Records individually |
| --- |
| STRAW Record |
| MAC: long |
| CHANNEL_CLIENT:GUID |
| PACKET #:short |
| KEYFRAME: bit |
| Compress Records by Channel |
| SODA Record |
| . . . |

(iii) SODA Records

SODA records are nested structures with an initial GUID ID and one or more SODA definitions. A SODA definition has a definition type, a definition length and one or more fields. The definition type is a well-known GUID (e.g., guidAsset). The length indicates total size of fields. Fields are a combination of type-specific fixed fields and nested SODA definitions. That is, SODA Record:
 guid ID
 SODA definition
 . . .
SODA Definition:
 Guid DefinitionType
 long length;
 [Field]—depend upon definitionType
Field:
 Fixed field
 Or SODA Definition
For example,

| SODA Record |
| --- |
| GUID: YYYY |
|    SODA Operation: length 318 |
|    OPERATION: ART_ASSET |
|    ATTRIBUTES: length 24 |
|    CLASS, TEXTURE |
|    COLLADA_NAME, Tex7 |
|    COLLADA_ID, 449 |
|    DATA: length 256 |
|    00 02 2B 6C 00 01 . . . |

SODA records are encapsulated within a STRAW record:

| STRAW Record |
| --- |
| MAC: long |
| CHANNEL CLIENT:GUID |
| PACKET #:short |
| KEYFRAME: bit |
| SODA Record |
| . . . |
| SODA Record |
| . . . |

(iv) Channel Reliability and Link-Level Protocol

STRAW records are numbered and contain a channel ID. After receiving a packet and after a short time delay the transport sends an ACK record containing the number of the next expected packet for each channel so that the sender can confirm transmitted records were received and can release local resources. There is no reliability feature for this ACK beyond periodic transmission. This scheme uses the minimum network resources for reliability, assuming that almost all records are successfully received.

A MAC field is calculated for each STRAW record transmitted. It is checked on receive.

For Reliable Channels:

If records in a channel are received out-of-order, a NACK is transmitted for the missing record. A MAC failure also results in a NACK being transmitted for the expected record. Up to four NACKs for a single record are permitted, and then the transport queues a failure message to any subscribing kernel managers and erases the channel definition.

For Unreliable Channels:

If records in a channel are received out-of-order, the missed packet number is signaled to any managers subscribed to the channel and no NACK is sent. A MAC failure is also indicated as a missed packet to any kernel managers subscribed to the channel and no NACK is sent. There is no threshold for missed packets, and the channel is never closed by the transport.

There is no need to "close" a channel. If all kernel managers unsubscribe, then data transmission over the channel stops. Since a channel is a logical entity, no operating system resources are used.

(v) Publish/Subscribe

The STRAW service 268 maintains a list of local publish and subscribe entries. Each entry contains Local Manager that created the entry
Server identifier
Channel identifier
Publish or Subscribe
Transport parameters (for Subscribe)

The list is initialized with
{STRAW Service, GUID_NULL, Session, Subscribe, Reliable, Uncompressed}

In this way, the STRAW service 268 subscribes to all arriving SODA records arriving on any session channel. These include publish and subscribe definitions. The GUID_NULL channel is never published and assumed by every server to be subscribed with a well-known channel ID on every stream.

The STRAW service 268 also maintains a table of all arrived publish definitions, for use in case a late subscribe is registered in the local list.
{IDClient, IDServer, IDChannel}
Where IDClient is a (possibly NULL) GUID of a particular client for which the channel is intended, IDServer is the remote source of channel records and IDChannel is a well-known GUID of a channel.

When the STRAW service 268 receives a session definition for a desired connection to another station, the STRAW service 268 establishes the stream, sends the session definition, and then sends all of the local table publish entries in a SODA record on the session channel. When a publish definition arrives at a STRAW service 268, the STRAW service 268 enters that definition into the publish definition table and then sends a subscribe definition on the session channel for each subscribe entry in the local list that had a matching Channel ID in the publish record. When a subscribe definition arrives, the STRAW service 268 begins sending definition updates (piped from the publishing Applications) on the given channel as STRAW records containing the SODA record for that definition. The records may be sent on more than one channel.

When a kernel manager desires to participate in a channel with a server, the kernel manager defines a subscribe request, whether or not any STRAW Streams exist to any servers. If a virtual area application publishes later (i.e., after stream is established) then the change in the local table triggers re-sending of the publish entries in the table, which automatically triggers any latent subscribe on the other end of the link. If a kernel manager subscribes later and there is an entry in the publish table, then the STRAW service 268 sends the subscribe request automatically. This process ensures that channel data is sent over a link only if it is desired by the receiver.

(vi) Channel Record Dispatching

STRAW records are decrypted as they arrive. If valid, their embedded records are uncompressed and then dispatched to all subscribing kernel managers. The list of local subscribe entries is examined, and all entries matching the Channel ID (in the subscribe transport info) receive a copy of the record on their message queue.

The subscribing kernel manager is responsible for freeing messages as they are processed. The bulk data portion of a message is not copied, but points to the original network buffer containing the STRAW Record. Each kernel manager frees messages such that when they are all freed the network buffer can be recycled.

(vii) Establishing a STRAW Stream

The client network node connects sessions over streams with servers and peer network nodes. In this process, each party authenticates itself to the other.

STRAW streams are authentic and secure. This means that:

the client network node is certain of the partner's identity;
messages are private;
received messages are certifiably the message that was sent (not been modified in the middle somewhere); and
messages will be interpretable by both parties, in the same way.

Part of a session definition is a list of stream transport plugin GUIDs. If the client network node responding to the definition supports at least one of the GUIDs, it loads the plugin and uses it to establish the session. The server creating the definition may examine the support list of each client network node involved and decide which transport plugin GUID to include in the definition.

Part of a session definition is a list of stream encryption plugin GUIDs. If the client network node responding to the definition supports at least one of the GUIDs, it loads the plugin and uses it to encrypt the Session. The server creating the definition may examine the support list of each client network node involved and decide which stream encryption pluginGUID to include in the definition.

(viii) Server Stream

In some embodiments, a stream from a client network node 344 to a server 346 is established using an address that is obtained from a server, such as a directory server, a map server, or an area server. Exemplary purposes of the stream include obtaining presence information, rendering a public space using rendering definitions from a map server, and rendering a virtual area using rendering definitions from an area server.

Figure 21:
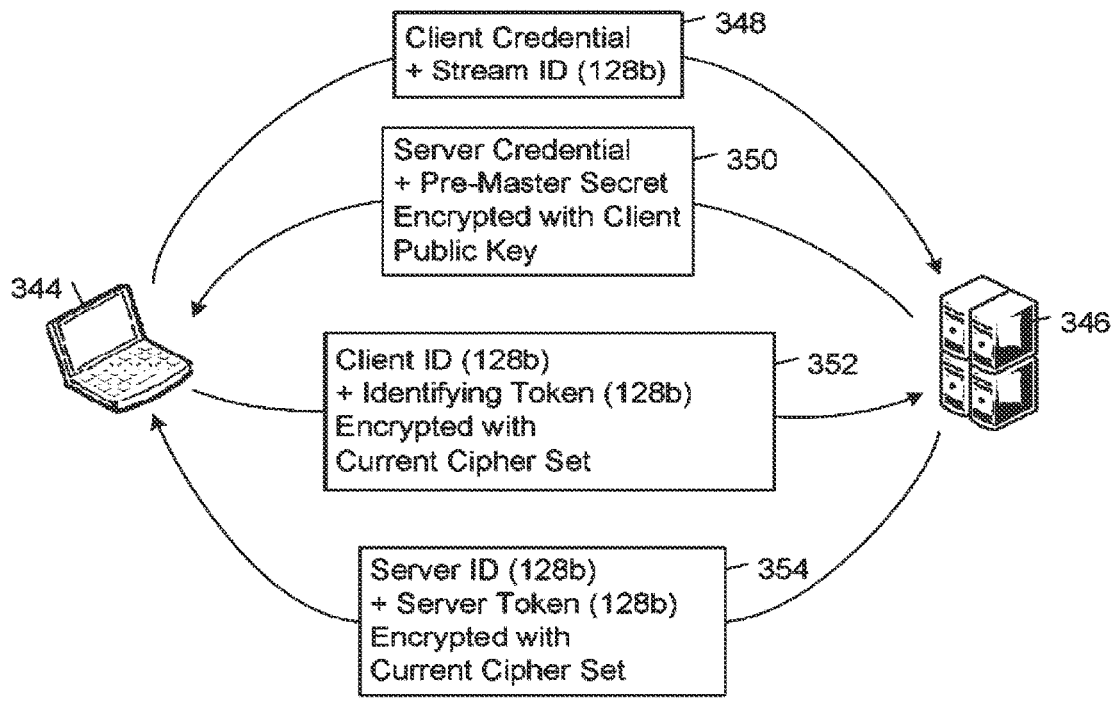
FIG. 21 shows an embodiment of a method by which a server stream is established between the client network node 344 and the server 346.

FIG. 21 shows an embodiment of a method by which a server stream is established between the client network node 344 and the server 346. In accordance with this method, the client network node 344 sends a client credential and a Stream ID to the server 346 (FIG. 21, block 348). The server 346 replies with a server credential and a pre-master secret (FIG. 21, block 350). Upon stream creation, the connecting client network node 344 negotiates a cipher set, and then authenticates by presents its identifying token (FIG. 21, block 352). The server 346 presents the server token appropriate for the client network node 344 (chosen by stream ID and communicated to the server 346 by the account server) (FIG. 21, block 354).

(ix) Client Stream

Figure 22:
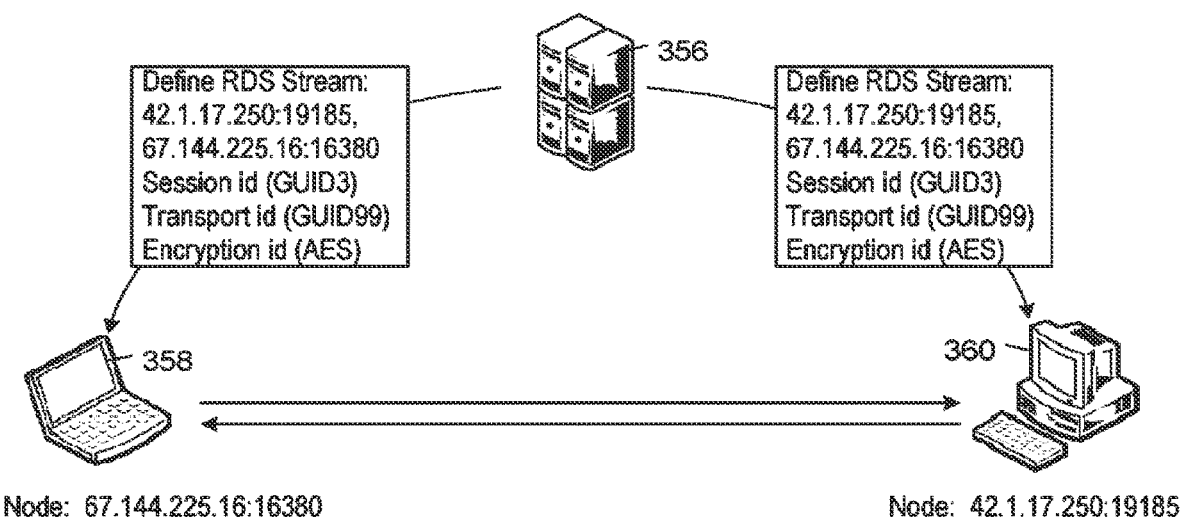
Referring to FIG. 22, each session is identified by a new GUID conjured up by the issuing server.

Referring to FIG. 22, each session is identified by a new GUID that is generated by the issuing server. Network nodes involved in the stream are informed of the session definition, and each network node communicates with the other using a hash of the session GU ID and Client ID as the stream encryption key. In the exemplary embodiment shown in FIG. 22, an area server 356 defines a session between two client network nodes 358, 360. Each of the client network nodes 358, 360 is authenticated to the area server, and uses an encrypted channel to communicate definitions (including session definitions). There is no need for the client network nodes 358, 360 to share any further authentication information with each other. Each of the client network nodes 358, 360 is identified by the server 346 with a respective GUID. Each session definition identifies both client network nodes

358, 360 by their GUIDs. The client network nodes 358, 360 can use this information to decide which channels to publish on the session.

If the stream or session fails for one of the client network nodes 358, 360, that client network node informs the area server 356 of the failure using a SessionFailure SODA definition. Reasons for failure include, for example, no compatible transport, no available channel, and reliable channel failure. In some embodiments, the area server 356 responds to the SessionFailure SODA definition by attempting to re-route the stream (e.g., by reflecting an audio stream through a proxy or server).

In some embodiments, the client network nodes 358, 360 communicate P2P in accordance with the Simple Traversal of UDP through Network Address Translators (NATs) (abbreviated STUN) network protocol. In these embodiments, the clients 358, 360 operate through respective NATs. A server (e.g., the area server 356) acts as a STUN server, which listens at two IP addresses in the network on the public side of the NATs and reports the mapped IP addresses and ports on the outside of the NATs. From this information, the client network nodes 358, 360 are able to discover the presence and specific type of NAT, and obtain the mapped (external) IP address (NAT address) and port number that the NAT has allocated for the clients' UDP connections to remote hosts. The client network nodes 358, 360 then use the external IP addresses to communicate with one another P2P in accordance with the UDP protocol. Additional details regarding the STUN protocol can be obtained from Jonathan Rosenberg et al., "STUN—Simple Traversal of User Datagram Protocol (UDP) Through Network Address Translators (NATs)," Internet proposed standard RFC 3489 (March 2003).

(x) Keep-Alive

In some embodiments, once a stream is established, the transport on the client network node issues periodic idle StreamKeepAlive definitions. The partner network node returns a StreamKeepAlive definition with the timeout set to whatever it estimates is the maximum interval it can tolerate. The purpose of this message is to keep any NAT firewall pinhole active. The partner network node records the desired timeout and lengthens the interval each time. If the next message comes from a different IP and port, then the NAT timed out and a new pinhole was created by the keepalive. The interval should then be shortened.

If either the client network node or the partner network node notices a StreamKeepAlive is missing either because the idle timer expired and no message was received, or no answer was received to a keepalive message, then it issues an immediate Stream KeepAlive with a very small timeout. This is to distinguish between a dropped station and a dropped UDP packet. Several retries can be attempted. If no answer is received after the retries then a local StreamFailure event is generated with the failed Session ID(s), and the stream definition is deleted.

In some embodiments, the STRAW service 268 responds to a broken link by automatically reestablishing the link and re-linking all subscriptions and data flows based on the local publish and subscribe table entries without application (or client) intervention.

f. Media Channel Service

| APIs: |
|---|
| MediaChannel::Ctor(STRAW&, AudioSource&, IDChannel, IDCodec, TransportParams)<br>MediaChannel::Send( )<br>MediaChannel::Receive(data&)<br>MediaChannel::Dtor( ) |
| Services: |
| Media. DLL<br>   streaming audio channel |
| Client of: |
| Compress.lib compression<br>PlugInMgr |

In some embodiments, the media channel service 271 is a Windows® service DLL.

The media channel service 271 is used to robustly communicate P2P audio and text chat. The media channel service 271 will compress the stream if configured to do so. The compressor library accomplishes compression as requested. The media channel service uses an audio codec plugin configured by variant. The variant GUID is taken from the stream definition.

g. SODA Channel Service

| APIs: |
|---|
| SODAChannel::Ctor(STRAW&, IDChannel, TransportParams)<br>SODAChannel::Send(SODA&)<br>SODAChannel::Receive(SODA&)<br>SODAChannel::Dtor( ) |
| Services: |
| SODA.DLL    SODA channel |
| Client of: |
| Compress.lib compression |

In some embodiments, the SODA channel service 270 is a Windows® service DLL.

The SODA channel service 270 is used to robustly communicate SODA definitions. The SODA channel service 270 will compress the stream if configured to do so. The compressor library accomplishes compression as requested. This is the place where data structures are converted to network byte order. In some embodiments, little-endian (Intel) network byte order is used.

h. Connection and server mix manager

| SODA definitions: |
|---|
| AudioStream<br>AudioCalculation<br>AudioEffect<br>AudioMix<br>AudioDevice<br>AudioParameter<br>  AreaSession<br>  CommunicantState |
| Services: |
| CSMMgr.DLL |
| Client of: |
| STRAW.DLL get instructions from AS, create new connections to clients<br>Media.DLL |

| | |
|---|---|
| SODA.DLL | |
| TransBus.DLL | audio stream connections |

In some embodiments, the connection and server mix manager 262 is a Windows® service DLL.

In some embodiments, the connection and server mix manager 262 exports a procedural API available for the local conference scheduling tool to initiate a session with an area server. This API is the initial entry point for creating a session. The connection and server mix manager 262 publishes an active session definition. The area server receives the session definition on a SODA channel.

The connection and server mix manager 262 also constructs audio graphs from audio graph processing elements. The audio graph processing elements are configured by the area service 26, either directly through SODA records or indirectly through VSDL scripts. In any case SODA definitions are the result. In some embodiments, the connection and server mix manager 262 processes the following SODA definitions sent by area service 26:

AudioDevice
AudioStream
AudioMix
AudioEffect
AudioCalculation
AudioRecord
AudioPlayback These SODA definitions are described in the following paragraphs.

AudioDevice is a definition of a local audio device to be registered with the audio transport bus (which is a component of the transport bus 276) as an AudioSource. The well-known ID of a standard local audio source (microphone, headset) or a registered local audio recording (file, streaming CD audio) is provided, along with an instance ID (which headset if more than one is available). The device is given a new ID for use on the audio transport bus. The connection and server mix manager 262 creates an instance of the appropriate variant of the AudioDevice plug-in using the well-known audio source ID, and hands it off to the audio transport bus.

AudioStream is a definition of an incoming audio stream to be registered with the audio transport bus as an AudioSource. An incoming audio stream is defined by the Channel ID it is transported over. For purposes of dynamic mixing (done by the area/zone manager 264) it is necessary to associate a stream with an Avatar ID. The device uses the Channel ID as its audio transport bus ID. The connection and server mix manager 262 creates an instance of the appropriate variant of the AudioStream plug-in based on the Channel Type ID, and hands it off to the audio transport bus.

AudioMix is a definition of a combination AudioSource and AudioSink plug-in. The definition fully specifies the plug-in API ID, variant ID, one or two Audio Transport Bus source IDs, and an associated Avatar ID (for the area/zone manager 264). The connection and server mix manager 262 creates the indicated variant of the AudioMix plug-in based on the IDs provided, and hands it off to the Audio Transport Bus.

AudioEffect is a definition of a combination AudioSource and AudioSink plug-in. The definition fully specifies the plug-in API ID, variant ID, one audio transport bus Source IDs, and an associated Avatar ID (for the area/zone manager 264). The connection and server mix manager 262 creates the indicated variant of the AudioEffect plug-in based on the IDs provided, and hands it off to the audio transport bus.

AudioCalculation is a definition of an AudioCalculation plug-in. The definition fully specifies the plug-in API ID, variant ID, associated audio transport bus AudioSource object ID, the component's own audio transport bus ID, and two situation-specific parameters. The AudioCalculation objects are not processing audio data directly in audio chains. Instead the AudioCalculation objects calculate settings for other audio graph components based on a "domain object model", external information such as manual settings (mute, volume control in the HUD), avatar position and motion, reverb spaces and Windows® settings (speaker selection in the Control Panel for instance). AudioCalculation objects are executed on a different rendering timer event—much less often than normal audio rendering. This is because the data they use as inputs to calculations change slowly. The connection and server mix manager 262 creates the indicated variant of the AudioCalculation plug-in based on the IDs provided, and hands it off to the audio transport bus.

AudioRecord is a definition of an AudioSink plug-in. The definition links a point in the audio graph with a storage component. At rendering time, an AudioRecord component doesn't trigger rendering itself. But if rendering is triggered by another AudioSink component, then the rendered audio data is provided to the AudioRecord object for transfer to the indicated storage component. The connection and server mix manager 262 creates the AudioSink plug-in and hands it off to the audio transport bus.

AudioPlayback is a definition of an AudioSource plug-in. The definition links a point in the audio graph with a storage component. If an audio chain references this component, then at frame-preparation time one time-slice worth of audio data is fetched from the storage component and provided as output of this component. The connection and server mix manager 262 creates the AudioSource plug-in and hands it off to the audio transport bus.

The connection and server mix manager 262 configures the transport bus 276 and the audio stream service 272 according to definitions received from the area server. Each definition results in the creation of an audio processing graph element, which is an audio stream plugin, an audio calculation plugin, or an audio source plugin. The local audio devices (e.g., microphone, speaker(s), and Skype audio) can be configured according to settings chosen through a HID configuration tool. The HID configuration tool allows the user to choose keyboard and mouse options for navigating the 3D collaborative space. For example, shortcut keys may be defined, and mouse gestures bound to avatar behaviors. In some embodiments, the audio output selection follows the Windows® Control Panel "Sounds and Audio Device" settings for Audio and Voice. This ensures that the same audio settings are used for virtual area communications as are used for ordinary VOIP conversations.

In the event of an area server session transport failure, the connection and server mix manager 262 attempts recovery. It tears down the session and re-launches it on a different area server. In the event of a media stream failure, the connection and server mix manager 262 attempts recovery. In this process, the connection and server mix manager 262 tries to reconnect to the client network node. If the reconnection attempt fails, the connection and server mix manager 262 defines the communicant state as inaudible to the area server.

i. Area/Zone Manager

| SODA definitions: |
|---|
| PhysicsCheckpoint |
| AudioCalculation |
| Zone |
| Services: |
| AreaZone.DLL |
| Client of: |
| STRAW.DLL |
| OpenAL.DLL |
| GIPS.DLL |

In some embodiments, the area/zone manager 264 is a Windows® service DLL.

The area/zone manager 264 adjusts the audio stream service 272 mix parameters according to zone definitions and avatar position definitions. The area service 26 publishes to the area/zone manager 264 SODA definitions that relate each avatar to the audio processing graph element that responds to that avatar's motion. The avatar position data is used to mix the audio streams from each of the client network nodes participating in a virtual area in a way that allows each communicant to hear the other communicants at the right audio location with the right volume according to local zone definitions. The parameter values that are applied to the audio processing graph elements typically depend upon a calculation that includes relative position, orientation of communicants, zone definitions, audio properties of the virtual area, and manual settings (e.g., mute, volume) that are configured by the communicant.

In some embodiments, the area/zone manager 264 processes the following SODA definitions, which pertain to gross features of the simulated audio space in which the current audio graph is rendering.

AudioReverb
AudioAperture
AudioObstruction

These SODA definitions are described in the following paragraphs.

AudioReverb is a definition of a reverb space which is a "hollow space" that results in a certain reverb or echo effect. The definition identifies a simple geometry with a location. This definition is provided in a domain object model (DOM) to all AudioCalculation objects when they are invoked.

AudioAperture is a definition of a connection between two reverb spaces. It identifies two reverb spaces by ID, and specifies an audio connection between them. The connection is a circle at a certain location and orientation. This definition is provided in a domain object model (DOM) to all AudioCalculation objects when they are invoked.

AudioObstruction is a definition of a physical barrier to sound propagation. It is modeled as a sphere at a location. This definition is provided in a domain object model (DOM) to all AudioCalculation objects when they are invoked.

The SODA definitions described above are inputs for AudioCalculation objects, which are scriptable calculation plugins that take the following parameters as an argument:

Physics of both sound source and sink;
Zone definition for source and sink;
Manual settings (individual mutes, volume/AGC);
Ambient settings (global mute, volume); and
Room audio characteristics.
Initial Audio Calculation plugins include:
Manual Mute;
Manual Volume;
Location;
Doppler shift;
Orientation (facing toward/away);
Zone; and
Room Reverb.

Some calculations are appropriate for individual audio sources; some for whole-room final mix. The virtual area application can introduce new plugins at will by referring to them in audio definitions. The area/zone manager 264 will subscribe to plugins that it doesn't have, and receive their definition from the area server.

| Calculation Plugin | Function |
|---|---|
| Manual Mute | This simply returns 0.0 or 1.0 depending upon the mute setting for that source (Avatar). |
| Manual Volume | Returns between 0.0 and 1.0 depending upon the volume setting for that source (Avatar). |
| Location | Takes a mono signal, and returns 5.1. Gains are calculated from the relative angle of the source from the sink, including the sink orientation. This may even include ear separation? |
| Doppler | Shifts frequency depending upon relative velocity of source vs. sink. |
| Orientation | Attenuates source depending upon source orientation e.g. facing toward or away. |
| Zone | Sets Zone Mute for a sound source (1.0 if in same Zone else 0.0). Perhaps it could have a graduated setting for elegant zone boundary fade-out. |
| Room | Applies room audio characteristics to a source relative to a sink including reverb zones, apertures and obstructions. Functions on 5.1 signal, produces multi-variant setting for a Reverb widget |

Figure 23:
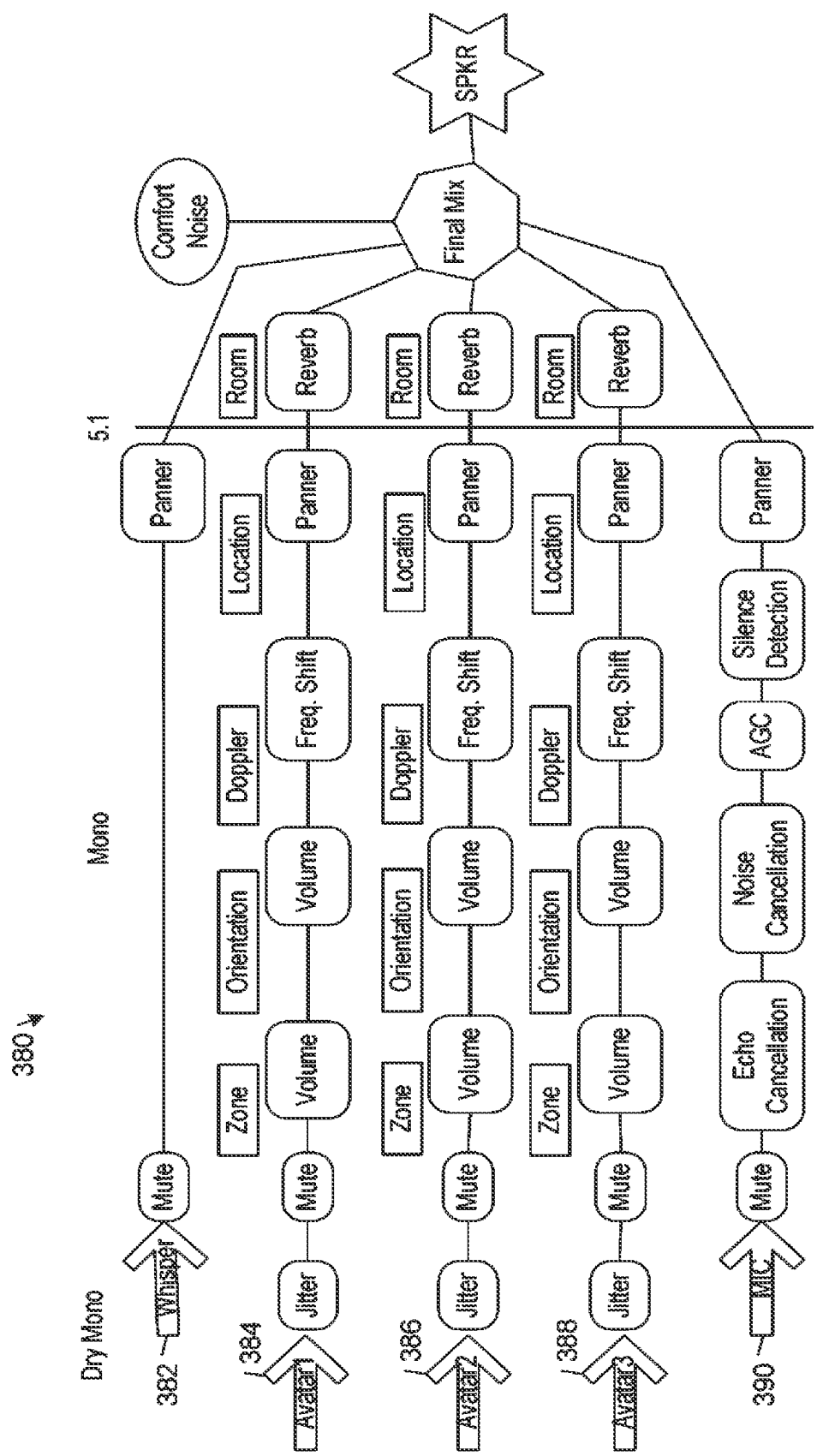
FIG. 23 shows elements of an exemplary embodiment of a four-communicant audio processing graph.

FIG. 23 shows an example of a four-communicant audio processing graph 380, which might be specified by an area server application. Certain audio processing graph elements (e.g., codecs, the network, filtering, special effects, and error concealment graph elements), which typically are present in a complete audio processing graph, have been left out of this example for simplicity.

The arrows 382, 384, 386, 388, 390 represent AudioSources, which are all dry mono audio sources. Avatars 1, 2 and 3 are network streams from remote client network nodes. Whisper is an optional local audio feed from a designated source. Everything to the left of the audio Panners is mono with a series of effects added. These effects include adjusting volume according to Zone and speaker Orientation and applying a Doppler shift to account for relative velocity of speaker and listener. The audio Panners position each adjusted mono signal in the three hundred sixty degree audio space of the currently occupied zone of a virtual area. The Location of the speaker relative to the listener is used. Everything to the right of an audio Panner is 5.1 audio. The Room audio processing graph element calculates the effect of the room acoustics on the audio signal. It takes into account position of speaker and listener, room characteristics, and obstructions. The Final Mix audio processing graph element adds all of the processed audio signals together to produce a resultant stream that is piped to the designated audio output device (i.e., SPKR, which represents the local speaker(s) in the illustrated example).

Some audio processing graph elements (inserts) have fixed parameters and, therefore, are not associated with any runtime calculation plugin scripts. These elements include echo and noise cancellation, automatic gain control (AGC), silence detection, fixed-source Panner, and Final Mix.

j. Asset Cache Service

| SODA definitions |
| --- |
| See Art resource API document |
| Services: |
| ArtCache.DLL |
| Client of: |
| File system or db |
| So3D |

In some embodiments, the asset cache service 275 is a Windows® service DLL.

Assets are recorded in a local database or table service indexed by GUID. The asset data is kept in an amorphous storage pool. The ID on a particular asset never changes, thereby avoiding any cache consistency issues. Assets are cached by SODA record. This means that large assets may be stored in many pieces, since SODA records are limited in size to the UDP MTU (around 1000 bytes). The asset cache must index records by GUID and the data offset, which is a field in the SODA record.

(i) Asset Index

Assets are represented in a class table, and an optional attribute table.

The asset class table maps the asset GUID to a class GUID and a data store reference.

| Asset ID | Asset Class | Data store |
| --- | --- | --- |
| guidSurface | guidClass Texture | <image1> |
| guidConfTableSurface | guidClass Texture | <image2> |
| guidSococoConfTableSurface | guidClass Texture | <image3> |
| guidDogShowMesh | guidClassMesh | <image4> |
| guidNameSococoConfName | guidClass Text | "Conference" |
| guidAuthorDVW | guidClass Text | "David Van Wie" |

The asset attribute table attaches a tagged attribute scalar value to an asset.

(ii) Data Store

The asset storage interface of the virtual area based rendering platform allows heaping data, storing a separate index transactionally, and scavenging unused asset storage for reuse. A combination of a database and file will serve for asset storage. The database contains two tables: a storage allocation table, and a GUID/offset index. The file is created with a fixed size according to the cache size configured. Assets are stored in the file using a heap-bucket algorithm.

The asset cache data store will be indexed by GUID and offset. The heap is partitioned into buckets by data size, in powers of two. The smallest bucket is 32 bytes; the largest is 2 kilobytes, which makes a total of 7 buckets. Each bucket is budgeted the same amount of storage, which means there are half as many items in each successive bucket. Each bucket is a heap table large enough to hash enough items to fulfill the storage budget, which makes the chance of hash collision reasonably small.

(iii) SODA Asset Definition Records

Assets are encapsulated in SODA records for transmission. The definition includes the asset GUID, its content (unstructured data) and it's offset if it is larger than one record, and a table of attributes. A SODA record encapsulating an asset never contains any reference to the storage system.

| Asset: length 1400 |
| --- |
| ID: guidSococoConfTableSurface |
| TOTAL_SIZE: 4096 |
| ATTRIBUTES |
| CLASS, TEXTURE |
| APPLICATION, guidAppSococoConf |
| AUTHOR, guidAuthorDVW |
| NAME, guidName SococoConfName |
| COLLADA_NAME, Tex7 |
| COLLADA_ID, 449 |
| OFFSET: 0 |
| DATA |
| 00 02 2B 6C 00 01 ... |

The offset and data fields can be repeated as long as they fit in one record.

A query for an asset is a definition

| Asset query: length 60 |
| --- |
| ID |
| Array: length 28 (1 entry) |
| Offset: 0 |
| Length: 10000 |

An asset is forgotten using a definition

| Asset dereference: length 36 |
| --- |
| Array: length 20 (1 entry) |
| ID |

(iv) Attribute Hierarchy

Assets have attributes, the most important of which are Type and Default. Type specifies the purpose of the asset. Default specifies a base asset that can be used in place of the given asset. An exemplary attribute hierarchy is shown in the following table:

| Name | Type | Default | Value |
| --- | --- | --- | --- |
| Blank | Texture | NULL | <image5> |
| WoodGrain7 | Texture | Blank | <image6> |
| TableTop1 | Texture | WoodGrain7 | <image7> |
| ConfTableWood | Texture | TableTop1 | <image8> |
| SococoTable | Texture | ConfTableWood | <image9> |

In this example, a virtual area scene that includes the SococoTable texture will be rendered using the first texture available, searching from SococoTable through ConfTableWood, then TableTop1, etc.

The Artbase will have a huge hierarchical tree of assets based on default assets, all finally based on a small number of fundamental assets. These fundamental assets are installed as part of the client software package. This feature is intended to allow designing a level with specific art assets called out, and to allow rendering it before all of the art assets are actually designed. Also it may be desirable to start rendering a virtual area before all of the art assets are loaded.

Optional attributes include Default, Author, Application and Collada ID which is a reference to the Collada source from which the asset is derived. Browsing tools running on an author station will index assets by any and all Attributes.

k. Audio Transport Bus

The audio transport bus is a component of the transport bus 276 that handles audio streams. In some embodiments, the audio transport bus is implemented by a library that manages an audio graph as a collection of component objects. All of the audio graph objects are registered with the audio transport bus by a unique ID. The audio transport bus is responsible for managing the audio graph objects when rendering audio. The audio transport bus traces the audio graph components by ID. In this process, the audio transport bus invokes each audio graph component in turn, providing the audio data from the input component named by ID.

The audio transport bus buffers one time-interval of each audio stream available on the client network node. The audio transport bus feeds these streams to zero or more subscribers as configured by the audio stream service 272. Streaming data uses a pull model, where the final output stage calls preceding stages for data as needed. Each stage calls the one before until the original audio stream source is reached. If the source needs to control rate (flow control) it typically does its own buffering and has its own particular signaling scheme. For instance a local file source can double-buffer and read ahead one time-interval while processing the preceding one. A network file source can signal flow rates and buffer limits over the network to the server. A local microphone source, on the other hand, has no ability to control flow rate at all.

The audio transport bus operates in two phases: upon a rendering timer event, it provides existing rendered data to AudioSink components; the audio transport bus then traverses the audio graph, causing the next time-slice worth of audio data to be rendered and buffered. This technique gives the audio graph a good chance of providing continuous playback, even in the presence of variable-latency audio source data.

In some embodiments, the audio transport bus measures the rendering latency of each audio graph component, and aggregates each rendering chain latency by adding up all dependent (source) audio component latencies. The audio transport bus collects and registers the rendering latency statistics. Based on these statistics, the realtime scheduler 278 determines when and how the audio graph should be modified in order to achieve an audio graph processing target. In some embodiments, the realtime scheduler 278 executes one or more of the methods described above in connection with FIGS. 13 and 14 in the process of determining when and how the audio graph should be modified in order to achieve an audio graph processing target.

Another function of the audio transport bus is to invoke AudioCalculation objects periodically. The AudioCalculation objects are used to change settings of associated ones of the audio graph processing elements. The period of AudioCalculation execution typically is much longer (less often) than the audio graph rendering period.

The audio transport bus typically has the ability to record streams and replay recorded streams. The raw audio streams typically are recorded so that during playback the mix can be re-rendered according to the viewer's point of view. Some embodiments include a hub that receives all of the raw audio streams. In these embodiments, the hub typically handles the recording of sessions. When it is not desirable to re-render a session, the audio transport bus typically only records audio streams at the client network node.

The AudioSource object is the base for all audio sources. This object delivers data when polled, and defines its desired latency and channels (e.g., mono, stereo, 5.1). Derived objects include Microphone, MediaStream, Clip, WaveFile, DirectX audio, and the output side of the Mix plugins.

The AudioSink object is the base object for audio output devices. This object requests data from an AudioSource when polled. Derived objects include Speaker, MediaStream and the input side of the Mix plugins.

(i) Audio Plugin API

In some embodiments, the audio plugins incorporate VST audio effect C++ objects that are available from Steinberg Media Technologies GmbH. In particular, the audio plugins incorporate VST objects wrapped as plugins. A shim library is provided for wrapping a VST object as an audio plugin. This wrapper supplies the audio plugin API. The API of the VST objects will be used as the audio plugin class-specific API. This API includes:

setBusArrangements (inputs, nInput, output, nOutput)
getBusArrangements (direction, index, speaker&)
canProcessSampleSize(size)
getLatencySamples( )
setupProcessing(process)
setProcessing(state)
process(data&)
getTailSamples( )

In these embodiments, a VST plugin is wrapped as an AudioSource and AudioSink. For instance, the AudioSource::Frame(data&, size) call will be implemented as a call to the preceding AudioSource::Frame(data&, size&), followed by setupProcessing(process) and process(data&). The Configuration(latency&, channelLayout&) call is implemented in terms of getLatencySamples( ) and getBusArrangements(output, i, channelLayout&) for each supported channel. The existence of a wrapper means that VST source code is required to shim an existing VST plugin into the audio bus.

(ii) OpenAL

Most audio processing graph mixing and effect elements are executed using the OpenAL cross-platform audio API available from www.openal.org. The OpenAL library is capable of calculating all parameters listed above in the area/zone manager section using the best features of the available soundcard to implement the features. In particular, OpenAL Sources, Listeners, and program Buffers are created for each operation in the audio graph from mute through final mix. Before each update, the buffer parameters are modified according to the calculation plugins.

In some embodiments the GIPS componentized audio library available from Global IP Solutions, Inc. is used for implementing stream-processing components (inserts). The GIPS audio library directly supports the following audio plugins: Codecs, Error Concealment, Jitter control, Echo and Noise cancellation, AGC, and Silence detection.

Interfaces:

TransBus::Ctor(bufferHint)
TransBus::Register(AudioSource&, AudioSink&, GUID)
TransBus::Reference(GUID, AudioSource&)
TransBus::Link(GUID, indexSrc, GUID, indexSink)
TransBus::Record(GUID)
TransBus::Playback(stream, GUID)
TransBus::EnumerateRecordings( )
TransBus::EnumeratePlayback( )
TransBus::QueryLink(GUID, indexSrc)
TransBus::Dtor( )
AudioSource::Ctor( )
AudioSource::Frame(data&, size)
AudioSource::Configuration(latency&, channelLayout&)
AudioSource::Configure(parameter, value)

-continued

```
AudioSource::Dtor( )
AudioSink::Ctor( )
AudioSink::Link(AudioSource &)
AudioSink::Frame( )
AudioComponent::Ctor(guidld, latency&, channelLayout&)
AudioComponent::Frame(data&, size)
AudioComponent::Link(AudioSource &)
AudioComponent::Dtor( )
```

Plugins:

| | |
|---|---|
| AUDVol. DLL | Volume control |
| AUDMix. DLL | Aggregate streams |
| AUDMute.DLL | Mute |
| AUDPan.DLL | Panner |
| AUDFreq.DLL | Frequency shifter |
| AUDJitr.DLL | Jitter reducer |
| AUDRevrb.DLL | Reverb |
| AUDLPF.DLL | Low-pass filter |
| AUDHPF.DLL | High-pass filter |
| AUDError.DLL | Error concealment (lost media packet) |
| AUDIPCM.DLL | iPCM-wb codec |
| AUDILBC.DLL | ILBC codec |
| AUDEcho.DLL | Echo cancellation |
| AUDNoise. DLL | Noise cancellation |
| AUDSilnc.DLL | Silence detection |
| AUDAGC.DLL | Automatic Gain Control | l. Local Stream Sources

Local Stream sources are the microphone, local sound sources such as recorded way files and music, and sound art resources. A Windows® operating system API is used to attach each of these sources and present them to the audio transport bus for distribution. Each source is "wrapped" as an AudioSource derived class. Source object wrappers are created when a definition is received (see the AudioDevice SODA definition in section VI). DirectSound APIs are used on Windows® based computing systems for microphone, clip, Skype, and CD sound. RTP streaming is simply an AudioSource wrapper around the Real-Time Protocol (RTP) service, which is used to deliver streaming data (e.g., audio) over a UDP socket. Streaming audio over the internet supports web-based download-and-play and also Microsoft Media Server streams.

Plugins:

| | |
|---|---|
| AUDMic. DLL | Microphone |
| AUDClip.DLL | Audio clip file |
| AUDRtp.DLL | Streaming audio over network |
| AUDSkype.DLL | Skype session live capture |
| AUDCD.DLL | Local music playback |
| AUDWeb. DLL | Web service audio |
| AUDComft.DLL | Comfort noise generator |

In some embodiments, the realtime kernel 260 supports sourcing and mixing of sessions of virtual area based communications with non-virtual area based communications (e.g., Skype and VOIP audio). In these embodiments, the realtime kernel intercepts non-virtual area based communications and presents them as local audio sources. The non-virtual area based communication session is initiated by one of the communicants on a client network node that is responsible for sharing the non-virtual area based communication session raw audio with other client network nodes. The hosting client network node also mixes audio associated with a virtual area communication environment for the communicant who is communicating via the non-virtual area based communication application.

Figure 24:
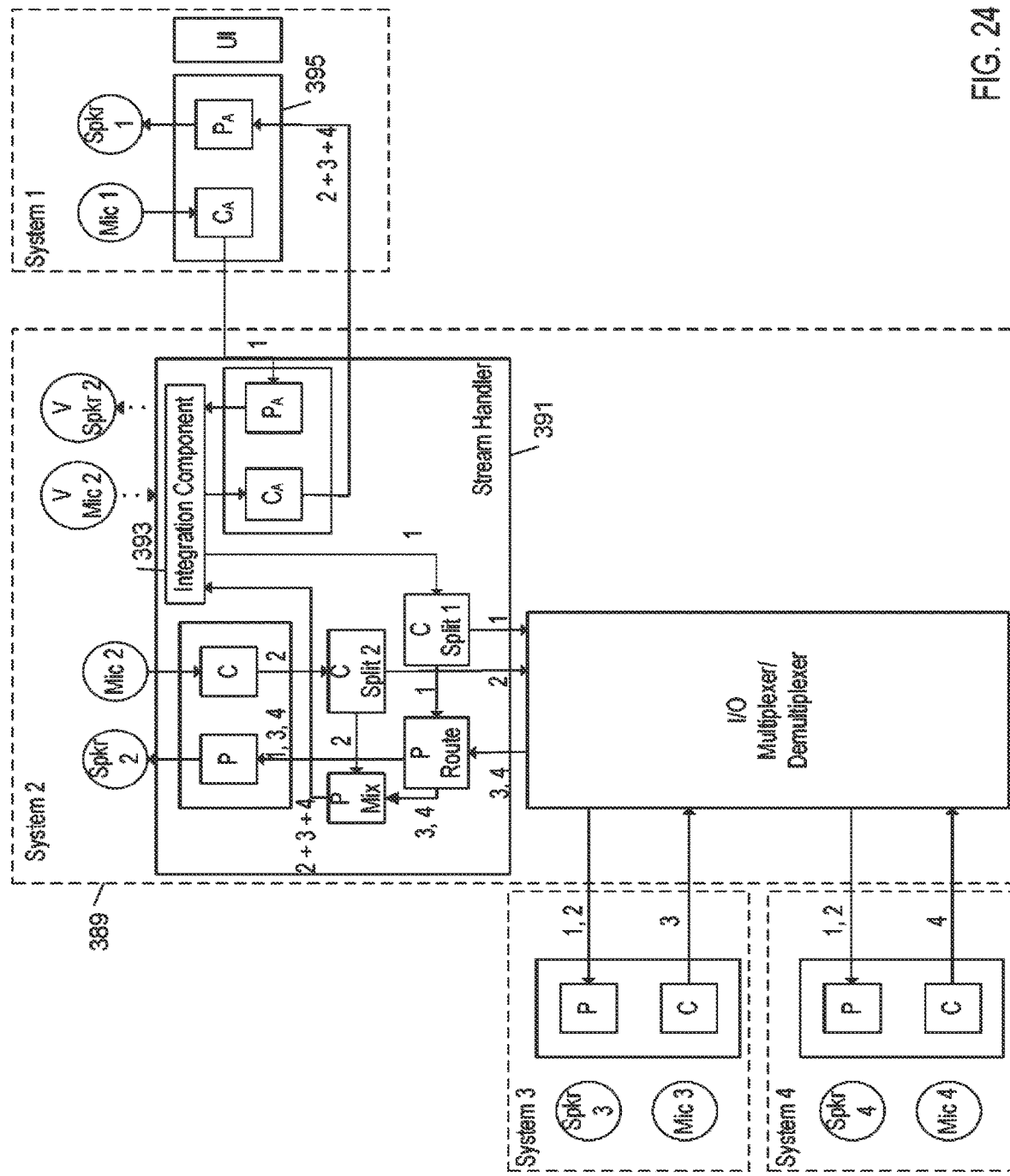
FIG. 24 shows an embodiment of a computer system that enables people to communicate with virtual area communicants via non-virtual area based communication applications.

FIG. 24 shows an embodiment of a computer system 389 (labeled "System 2") that enables people to communicate with virtual area communicants via different communication applications (e.g., Skype and VOIP). In FIG. 24, audio communication channels are established between four network nodes (i.e., System 1, System 2, System 3, and System 4) sharing a virtual area. System 1 represents a client network node that does not run a virtual area based communication application; instead, System 1 is configured to operate an alternative communication application (e.g., Skype). System 2 represents a communicant's network node that is running an embodiment of the realtime kernel 260, which includes a stream handler 391 that sources and mixes virtual area based sessions with System 1. In this process, the stream handler 391 uses an integration component 393 that virtualizes the playback and audio capture streams of System 1. Systems 3 and 4 represent two other client terminals that are running virtual area based communications applications. The components of the system shown in FIG. 24 include:

Stream Handler 391: composed of the following audio graph processing elements:

The integration component 393 virtualizes alternate playback and capture streams. In this process, the integration component 393 sends Microphone (Mic) 1 to C Split 1 received from virtualized Alternate Playback, receives Microphones 2, 3 and 4 mix from P Mix, and sends to virtualized Alternate Capture for transmission to System 1.

C Split 1 receives Microphone 1 from the integration component 393 and sends Microphone 1 to both P Route and I/O Multiplexer/Demultiplexer.

C Split 2 receives Microphone 1 from System 2 Capture and sends Microphone 2 to P Mix and the I/O Multiplexer/Demultiplexer.

P Route receives Microphone 1 from C Split 1, and Microphones 2 and 3 from the I/O Multiplexer/Demultiplexer. P Route also sends Microphones 1, 3 and 4 to System 2 Playback and Microphones 3 and 4 to P Mix.

P Mix receives Microphone 2 from C Split 2 and Microphones 3 and 4 from P Route, sends a mix of Microphones 2, 3 and 4 to the stream handler 391 for transmission out virtualized.

C: Audio Capture by a virtual area based communication application

P: Audio Playback by a virtual area based communication application $C_A$: Audio Capture by the alternate audio application of System 1

$P_A$: Audio Playback by the alternate audio application of System 2

V Mic: virtual microphone associated with System 2 alternate audio

V Spkr: virtual speaker(s) associated with System 2 alternate audio

In operation of the computer system 389, the I/O Multiplexer/Demultiplexer sends the audio signals 1 and 2 received from Systems 1 and 2 to both System 3 and System 4. The I/O Multiplexer/Demultiplexer also sends the audio signals 3 and 4 received from Systems 3 and 4 to the P Route component of the stream handler 391. The P Route component sends the audio signals 1, 3, and 4 to the playback component of System 2 and passes the audio signals 3 and 4 to the P mix component of System 2. The P Mix component of the stream handler 391 mixes the audio signals 2, 3, 4 and passes the mixed signal to the integration component of System 2. The integration component 393 passes the mixed signal to the audio capture component of an alternative communications application (e.g., Skype) that is running on System 2 and that corresponds to the communications application 395 (e.g., Skype) that is used by System 1. The alternative audio capture system (C A) passes the captured mixed signal 2+3+4 to the playback component of the alternative communications application 395 running on System 1.

In some embodiments of the communication infrastructure 389, P Mix subscribes to I/O Multiplexer/Demultiplexer directly so that the system is more symmetric. In these embodiments, P Route becomes P Mix 1, and receives 3, 4 from I/O and 1 from C Split 1. Since these are sent as independent channels, the output of C Split 1 could be sent directly to the Playback Component, but that isn't quite as flexible (since P Mix could perform an actual mix instead of a pass through of independent channels, see 3 below). In this case, P Mix becomes P Mix 2 and receives 3, 4 from I/O and 2 from C Split 2. The output of this mixer is a true mix, since the Alternate Audio System is a single channel communication system (even if the channel is stereo, we there is no multi-track mixer at the other end to combine signals from multiple sources).

FIG. 24 does not show the interaction between System 3 and System 4 with one another, only with System 2 and by extension, System 1. The interaction between System 3 and 4 could be either peer-to-peer or server mediated as described above.

In FIG. 24, any time two streams are delimited with a comma (meaning that it is a multichannel route), the system could also be sending mixed streams to conserve internal communication resources (e.g., out of the I/O Multiplexer/Demultiplexer). The stream to be mixed is indicated with plus signs (i.e. the virtualized microphone signal sent by the integration component 393 to the alternate capture component $C_A$).

m. Realtime Scheduler

| Services: |
| --- |
| SORK.DLL |
| Client of: |
| TimeSID.DLL |
| TransBus.DLL |
| So3D |

In some embodiments, the realtime scheduler service 278 is a Windows® service DLL.

In some embodiments, rendering of audio and the 3D scene is done on a frame-by-frame basis. Initially, the streams are started, then after a delay the realtime scheduler service 278 begins processing the first frame. The delay is calibrated by the combined desired latency of each audio and video processing chain. The realtime scheduler service 278 initiates consumption of the previously prepared frame and then processes the next frame, on a time Tick that has a period of 50 milliseconds.

The final rendering objects in each chain are registered with the realtime scheduler service 278. The objects are derived from a SoFrameRenderer class, which has a method
  FrameRender(timeFrameMs)
This method prepares one frame for the time indicated, from data sources that are particular to the rendering chain (audio or video). The SoFrameRenderer class includes another method FrameDeliver( )
This method delivers the previously prepared frame to the final destination, which is particular to the rendering chain. SoFrameRenderer objects are not required to be able to buffer more than one complete frame. The realtime scheduler service 278 will FrameDeliver the previously prepared frame on schedule, and then call FrameRender to prepare the frame for the next interval.

A Windows® operating system has no "hard scheduling" ability. In some embodiments, the realtime scheduler service 278 is configured to call one or more SoFrameRenderer classes, which include audio processors, graphical processors, physical modeling and scripts. The SoFrameRenderer classes enable the realtime scheduler service 278 to readjust frame processing in response to a determination that the client network node cannot keep up with the target processing level. In some embodiments, the realtime scheduler 278 implements one or more of the methods described above in connection with FIGS. 13 and 14. In some of these embodiments, the realtime scheduler service 278 measures the rendering time for all frames, and make statistics available through a SODA interface. If the statistics fall out of range (e.g., it takes too long to prepare a frame) then a log event is generated. A heuristic will be triggered, to try to "catch up", perhaps by skipping a frame, dropping out-of-range rendering chains (which typically are out-of-range due to a hardware or network error), or by dropping lower-priority rendering chain(s). For the purpose of implementing priority-based scheduling, the SoFrameRenderer class defines the method:

FramePriority( )
This method returns a number, with lower numbers being most important. The heuristic can determine from the chains' latency and priority, which chain(s) should be dropped to produce the most benefit with the least impact on total priority.

In some embodiments, the realtime scheduler service 278 additionally is able to drop stages within a chain. For this purpose, the realtime scheduler service 278 is able to call the method:

Latency=FramePrune(priority)
Where the processing chain is responsible for "dropping links" that are lower than the indicated priority. The realtime scheduler service 278 can start calling at the maximum priority and count backwards until all frames render within the desired total latency. A combined heuristic of iteratively dropping low-priority chains and pruning the chains themselves typically terminates at some priority level. If the priority level is below a threshold, a log entry can be made and, in some cases, the session is closed.

The realtime scheduler service 278 also is responsible for managing the interface to a SIS time service (a network resource), so as to synchronize the client network node clock with the clocks of the other client network nodes in the network. In some embodiments the time services are implemented by plugins, as described below.

7. Failure Recovery

The realtime kernel 260 makes a best-effort attempt to continue operating in the presence of network and server failures. In this process, the realtime kernel 260 implements a two-tier failure recovery algorithm. First the SODA channel service 270 and the Media service 271 independently attempt to reestablish connections upon failure. The media recovery will allow a conference to continue in the presence of individual audio channel failure, or to recover in the case of NAT timeout. Second, if the SODA channel service 270 and the media service 271 fail to reestablish connections, they will signal failure to their clients. In some embodiments, the actions of multiple communicants simultaneously attempting recovery are coordinated by registering the client node sessions with an area vault server that can synchronize the recovery attempts.

In some embodiments, the area/zone manager 264 also attempts a recovery in the event of a server failure. The area/zone manager 264 fields the stream failure and then tears down the session and re-launched it on a different area server.

8. Plugins

In some embodiments, the realtime kernel 260 has a componentized, open, and platform-independent architecture that allows developers to independently and develop and remotely add and update components of the realtime kernel 260.

a. Plugin Design

Plugins are platform-specific binary images that are downloaded from a plugin server. On Windows® based computer systems, plugins are implemented as DLLs (e.g., .NET or COM style plugins). Plugins differ from normal dynamic linked libraries, however, by the way in which they are loaded. In particular, during loading there is no need to link to the plugin library; nor is there any need for any compilation of software code. Instead, the plugin manager 266 simply loads the plugins that are contained in the plugin directory. In this way, plugins can be added or removed from a client network node without any further configuration of the station (e.g. registry entries), simply by downloading or deleting the executable. The plugins connect to each plugin host in a well defined way.

Figure 25:
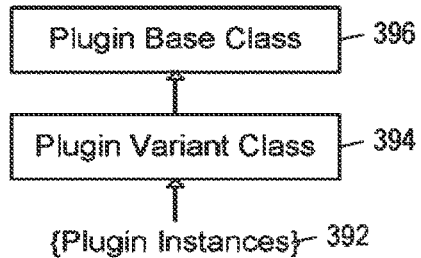
FIG. 25 shows a diagrammatic view of an embodiment of a plugin class hierarchy.

As shown in FIG. 25, an active instance of a plugin 392 is derived from a respective plugin variant class 394, which in turn is derived from a respective plugin base class 396. In some embodiments, a plugin instance 392 is instantiated by creating a base plugin object and casting the base plugin object to an identified variant through inheritance. Each base class 396 and variant class 394 signifies that it provides a service by declaring that it implements an interface.

Figure 26:
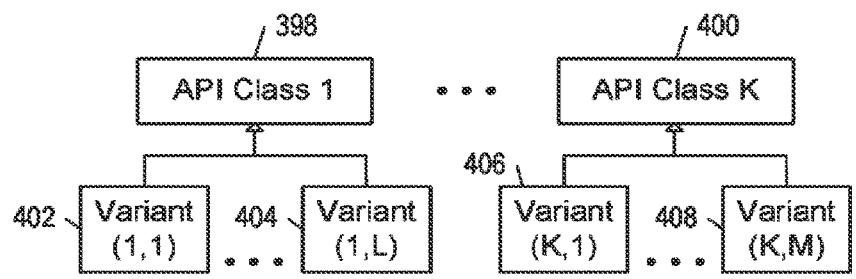
FIG. 26 is a diagrammatic view of an embodiment of set of plugin base classes each of which is associated with a respective set of one or more derived variant classes.

FIG. 26 shows an exemplary set of plugin base classes 398, 400 each of which is associated with a respective set of one or more derived variant classes 402, 404 and 406, 408. Each of the plugin base classes 398, 400 defines a particular category of functionality, whereas each plugin variant class defines a particular purpose or category of behavior of the functionality of the corresponding base class (e.g., API=human interface device, Variant=mouse). The plugins typically use header files to define interfaces, function prototypes of interface functions, and macros for invoking the interface functions.

Plugins are identified by GUID as well as human-readable name. A single plugin can have multiple APIs supported as well as multiple variants on the same API. In some embodiments, a plugin API is a C language data structure containing function pointers to the plugin functions implementing the services defined by the interface.

The following table shows an example of a fictitious Physics plugin that is identified as guidPhysicsSet1.

| File Name | Internal Name | Identifier | API | Variant |
|---|---|---|---|---|
| Physics.DLL | Frictionless physics set 1.0 | guidPhysicsSet1 | guidJoint | guidJointBall |
| Physics.DLL | Frictionless physics set 1.0 | guidPhysicsSet1 | guidJoint | guidJointHinge |
| Physics.DLL | Frictionless physics set 1.0 | guidPhysicsSet1 | guidJoint | guidJointSlider |
| Physics.DLL | Frictionless physics set 1.0 | guidPhysicsSet1 | guidJoint | guidJointSpring |
| Physics.DLL | Frictionless physics set 1.0 | guidPhysicsSet1 | guidCollision | guidCollisionOctTree |
| Physics.DLL | Frictionless physics set 1.0 | guidPhysicsSet1 | guidCollision | guidCollisionDynamic |

In this example there are four variants of a "Joint" API and two of the "Collision Detection" API. The file name is name under which the plugin is stored in the file system. The Internal Name is intended to describe the plugin as a whole. The Identifier identifies the entire plugin binary image, and is only used by the plugin manager 266. The API is a well-known GUID that specifies a procedural API that is supported by the plugin. The Variant is a well-known GUID that client applications can use to choose a plugin for a particular purpose. For instance the SODA channel service 270 may negotiate a compression plugin variant for use on a session.

Figure 27:
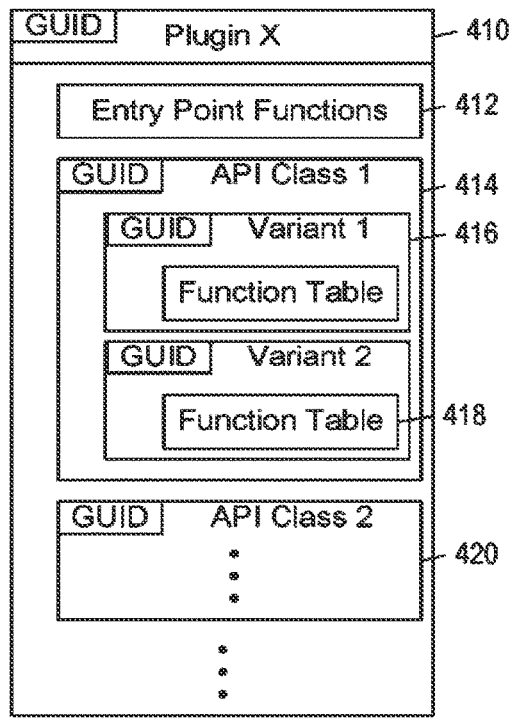
FIG. 27 is a block diagram of an embodiment of a plugin architecture.

FIG. 27 shows an exemplary architecture of a plugin 410 that is compatible with the Microsoft® COM (Component Object Model) architecture. The plugin 410 includes a set of entry point functions 412, a first API class 414 that includes first and second variants 416, 418, and a second API class 420. The plugin 410 implements all of the functions in all of the supported API classes 414, 420 and in all of the variants within each API class. Each API class and each variant within an API class is associated with a respective entry point function (also referred to as a "factory"). When the plugin 410 is loaded, a respective entry point function is registered with the plugin host for each of the supported API classes. The plugin host uses the entry point function that is associated with an API class in order to instantiate the API class and to obtain a pointer to its IUnknown interface. The plugin host uses the IUnknown interface to search for entry point functions of the variants supported by the API class. The plugin host uses the entry point function that is associated with a variant in order to instantiate the variant and to obtain a pointer to its IUnknown interface. The plugin host uses the IUnknown interface to query the variant for its interface function table. The function tables give the host access to the variant's API implementations.

Each plugin executable supports a core Plugin API that allows the plugin manager 266 to manage the plugin. The core Plugin API makes the plugin executables self-describing. In particular, each plugin exports a function that can be called by the plugin manager 266 to allow the plugin to register itself. In some embodiments, each plugin executable exports the following core Plugin API:

| | |
|---|---|
| Plugin:GUID( ) | returns GUID of this plugin |
| Plugin:NameGet( ) | get human-readable name of API |
| PlugIn:APIEnumerate( ) | returns GUIDs of supported APIs |
| PlugIn:VariantEnumerate (guidPluginApi) | return GUIDs of supported Variants for given API |
| Plugin:DependencyEnumerate (guidPluginApi) | return GUIDs of plugins API depends upon |
| Plugin:Create (guidPluginApi, guidVariant, PlugInVariant&*) | return PlugInVariant instance |

(i) Plugin Variant

An active instance of a plugin variant is derived from the class PlugInVariant. They are always created using a PlugIn object. All useful plugins extend this class to include API-specific methods. The only common methods are generic configuration methods.

| | |
|---|---|
| PlugInVariant: Configure( ) | launch dialog |
| PlugInVariant: ConfigurationSet (parameters) | set configuration parameters |
| PlugInVariant: ConfigurationGet (parameters&) | get configuration parameters |

(ii) Plugin Manager

Figure 28:
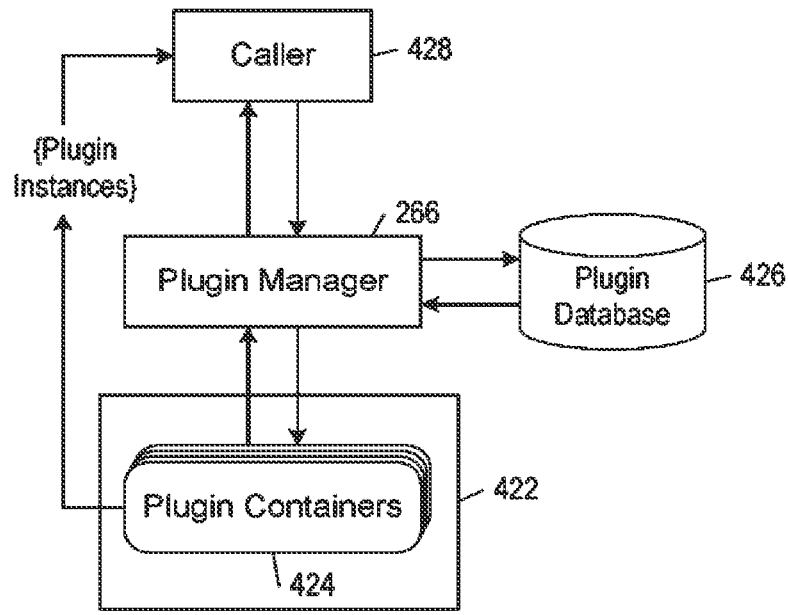
FIG. 28 is a block diagram of an embodiment of a plugin architecture that includes a plugin manager, a plugin directory that contains a set of plugin containers, a plugin database, and a caller.

FIG. 28 shows an embodiment of a plugin architecture that includes the plugin manager 266, a plugin directory 422 that contains a set of plugin containers 424, a plugin database 426, and a caller 428. The plugin manager 266 queries the plugin containers 424 in the plugin directory 422, registers the plugins in the plugin database 426, and responds to API requests from the caller 428 to send information about the available plugins and to instantiate specified plugin variants. The caller 428 typically is a kernel component (e.g., the installation loader component, a kernel manager, such as the connection and server mix manger 262 and the area/zone manager 264, and a kernel service); although, in some embodiments, the caller 428 may correspond to a software application or service running on the client node or on a remote network node (e.g., a server).

Figure 29:
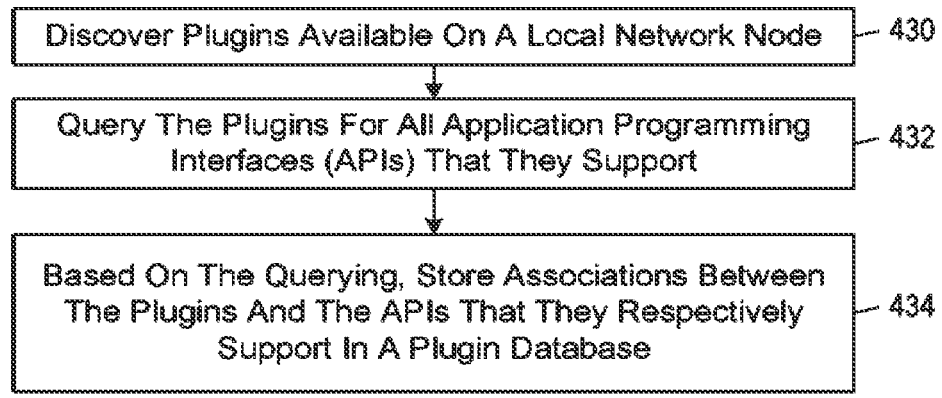
FIG. 29 is a flow diagram of an embodiment of a method that is implemented by an embodiment of the plugin manager of FIG. 28 in the process of registering the plugins that are available on a client network node.

FIG. 29 shows an embodiment of a method that is implemented by the plugin manager 266 in the process of registering the plugins that are available on a client network node.

In accordance with the method of FIG. 29, the plugin manager 266 discovers the plugins that are available on the client network node (FIG. 29, block 430). In some embodiments, all plugins are stored in a shared plugin directory that is created in the file system of the client network node. In these embodiments, the plugin manager 266 discovers the available plugins by checking the shared plugin directory. In other embodiments, the plugin manager 266 may be configured to check other file locations for available plugins.

The plugin manager 266 queries the discovered plugins for all APIs that they support (FIG. 29, block 432). In this process, the plugin manager 266 makes calls to the core API in order to enumerate the parameter values associated with the available plugins. For example, the plugin manager 266 queries the plugins with core API calls that return the GUIDs of the plugins, the GUIDs of supported APIs, and the GUIDs of supported variants for given API.

Figure 30:
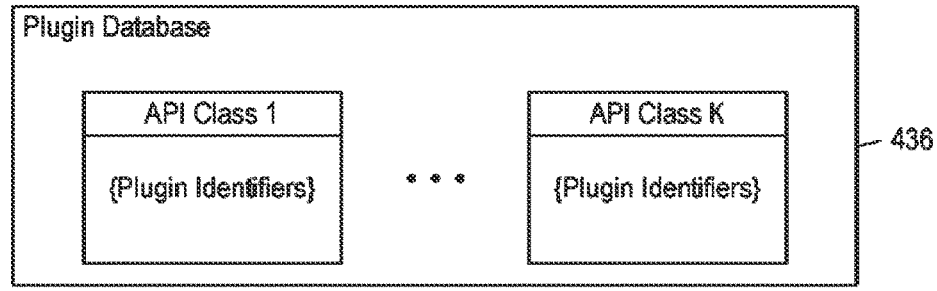
FIG. 30 is a diagrammatic view of an embodiment of a plugin database.

Based on the results of the querying, the plugin manager 266 stores associations between the plugins and the APIs that they respectively support in the plugin database 426 (FIG. 29, block 434). In this process, the plugin manager 266 classifies all of the plugins in the directory 422 by the APIs that that support. The plugin manger 266 automatically enters the plugins into the plugin database 426 under all supported APIs. In this way, the plugin database 426 allows plugins with the same API to be queried for a variant. In addition, plugins in the plugin database 426 can be enumerated by API and variant and instances created when referenced by a virtual area application. FIG. 30 shows an exemplary embodiment of a plugin database 436.

The Plugin Manager exports the following API:

| | |
|---|---|
| PlugInMgr:PluginEnumerate (guidPluginApi) | get list of available plugins by name, identifier |
| PlugInMgr: VariantEnumerate (guidIdentifier, guidPluginApi) | get list of variants |
| PlugInMgr:DependencyEnumerate (guidIdentifier, guidPluginApi) | return GUIDs of plugins this plugin depends upon |
| PlugInMgr: CreateInstance(guidIdentifier, guidPluginApi, guidVariant, Plugin&*) | load plugin and get PlugIn instance |
| PlugInMgr:EntryPointEnumerate (guidPlugin) | get list of available entry points |
| PlugInMgr:EntryPointGet(guidPlugin, EntryPoint) | get entry point |
| PlugInMgr: Configure(guidPlugin) | display configuration dialog modally |
| PlugInMgr:ConfigurationSet(guidPlugin) | set SODA record of plugin configuration |
| PlugInMgr:ConfigurationGet(guidPlugin) | get SODA record of plugin configuration |
| PlugInMgr:NameGet(guidPlugin) | get human-readable name |

Figure 31:
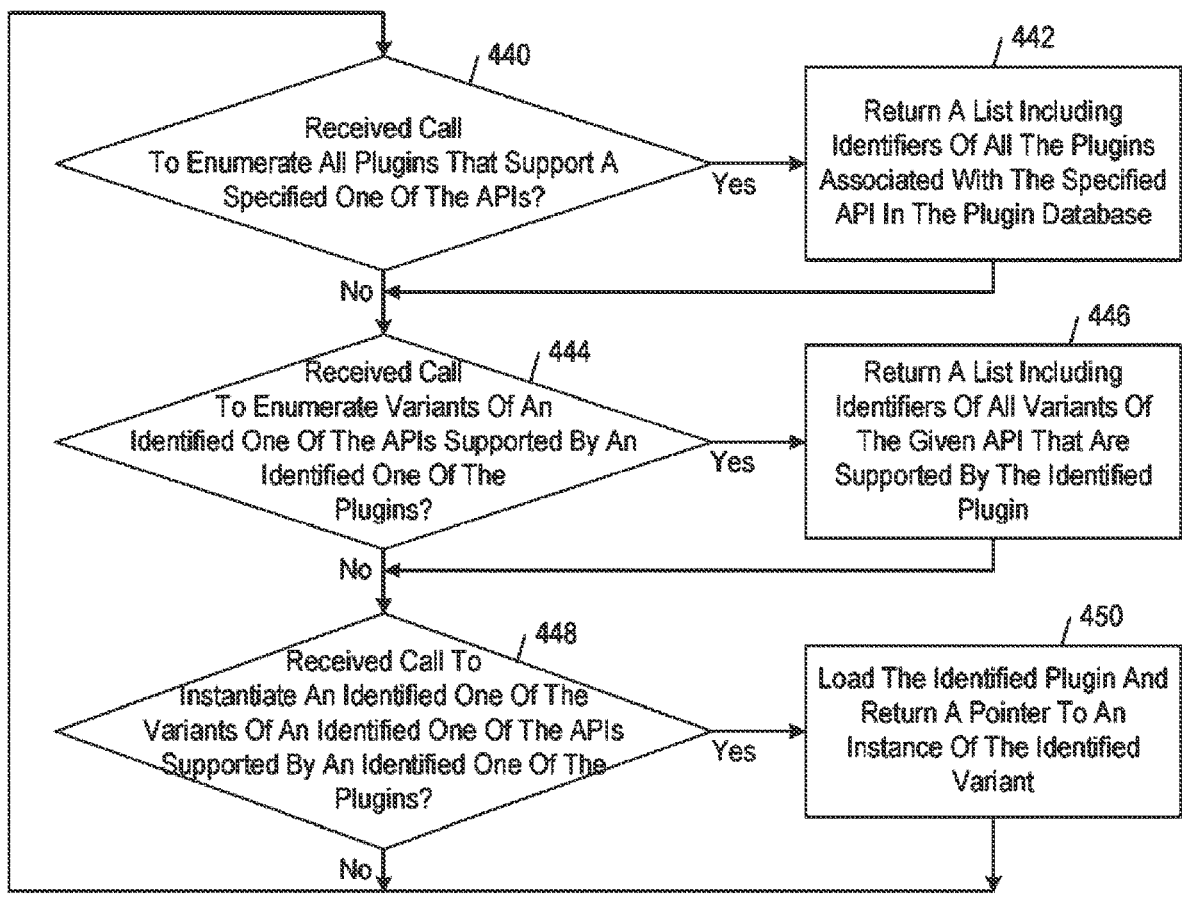
FIG. 31 is a flow diagram of an embodiment of a method that is implemented by an embodiment of the plugin manager of FIG. 28 in response to receipt of an API call from a caller.

FIG. 31 shows an embodiment of a method that is implemented by the plugin manager 266 in response to receipt of an API call from the caller 428. In accordance with this method, in response to receipt of a call to enumerate all plugins that support a specified one of the APIs (FIG. 31, block 440), the plugin manager 266 returns a list that includes identifiers of all the plugins that are associated with the specified API in the plugin database (FIG. 31, block 442). In response to receipt of a call to enumerate variants of an identified one of the APIs supported by an identified one of the plugins (FIG. 31, block 444), the plugin manager 266, returns a list that includes identifiers of all variants of the given API that are supported by the identified plugin (FIG. 31, block 446). In response to receipt of a call to instantiate an identified one of the variants of an identified one of the APIs supported by an identified one of the plugins (FIG. 31, block 448), the plugin manager 266 loads the identified plugin and returns a pointer to an instance of the identified variant (FIG. 31, block 450). In this process, the specified variant is located, the specified variant is loaded into the caller's address space, and an internal table of pointers is populated with the function table addresses of the variant functions implementing the services defined by the API.

(iii) Plugin Server

Plugins are present on a server in appropriate downloadable form for each supported platform. Servers always support a minimum set of encryption, compression and authentication plugins, so client network nodes always succeed when attempting a server connection.

When first registered on a server by a third party developer, the plugin is examined by an automated tool to ensure it conforms to the API specification, and is checked for unacceptable client station API references. For instance, no dynamic binding is allowed to any native interfaces not already in the Plugin environment. Then the plugin is scanned for viruses. All images on the server are then virus-safe.

Plugins are access-controlled by authenticating users. In this way a user who has paid for access can use the plugin from any location. In some embodiments, user is authenticated for plugin download via an electronic commerce engine.

b. Classes of Plugin

All plugins conform to the plugin API. Some plugins are specific to certain tools (e.g., OpenGL) and have their own standard. Each class of plugin has APIs that are class-specific. In some embodiments, plugins depend upon a native application runtime for all client station access. In each component where plugins are used, protocols allow negotiation of the feature using a GUID namespace. For example, in some instances, when connecting a network stream the offering client network node offers its encryption plugin GUID list in order of preference and the receiving network node chooses among those offered and responds with a choice or a refusal.

In some exemplary embodiments, the following classes of plugins are defined and used by developers to develop plugins for use in creating virtual area communicant environments.

encryption algorithm
compression algorithm
authentication algorithm
credential
graphic effect
physics extension
script extension
input device hosting
audio mix
audio source
audio insert
stream transport
time service These plugin classes are defined in the following paragraphs.

Encryption Algorithm

Encryption is a stream transport feature, and is negotiated at stream creation time. The session definition will include the encryption Variant ID. Exemplary encryption variants include AES and RC4 block encryption.

Compression Algorithm

Compression is an optional Channel content feature. Channels choose compression when the transport negotiates a channel definition. The subscribing station offers available compression options, and the publishing station indicates its selection when the publication is offered. Audio codecs may choose to skip compression, since their content is already compressed. An exemplary audio compression plugin variant implements the ITU-T V.44 compression process with a channel-specific priming stream.

Authentication Algorithm

Network infrastructure servers require certain authentication protocols in order to connect. Third party servers may have specific authentication requirements. Authentication protocols may be amended from time to time. In addition to the core Plugin API, an authentication plugin has APIs for executing authentication protocols and gaining access to local credentials. Exemplary authentication plugin variants include plugin variants that support SSL type of authentication for an initial server and that support subsequent server login using a signed ID as a token.

Credential

Credentials may be created and must be encapsulated in a plugin for storage and use by the authentication algorithm. Exemplary credentials are certificates containing public keys.

Graphical Effect

OpenGL and Collada support scriptable shaders, samplers, profiles and annotations. Some embodiments support Collada cg_surface_type and glsl_surface_type which are shaders, and gl_samplerX and cg_samplerX which are samplers.

Physics Extension

In some embodiments, the Open Dynamics Engine (ODE) is amended to included specific hooks into the dynamic behavior loop. Virtual area applications typically specify physics by applying physical properties to entities in the scene graph. Physics extension plugins have an API for querying associated property GUID(s) that are processed by that plugin. In this way, the physics plugins are only invoked for pertinent objects and virtual areas. Some embodiments support Collada rigid_constraint which is a joint in a model, and OpenGL collision detection which is a global motion algorithm for avatars and artifacts.

Script Extension

Script extension plugins have an additional API to allow wrapping a scripting runtime (e.g., Java and JavaScript) and to provide to it the native application runtime. Scripts are defined through a SODA record that includes the GUID of the script extension plugin.

Input Device Hosting

Input device plugins generate SODA records for standard input events (e.g., events generated by computer keyboard, computer mouse, Xbox® controller, and Wii® controller) that are processed by application logic.

Audio Mix, Audio Source, and Audio Insert

Audio processing is desirable at the origin (e.g., microphone) and effects and mixing at the destination (e.g., speaker). Audio plugins typically are not able to change audio network routing, because that affects other user's experience. Audio plugins on the Windows® platform are DLLs that conform to the Audio Plugin API. They are registered with the realtime kernel 260 and are available for reference by SODA. Virtual area developers may request audio plugins as part of a virtual area application (e.g., using extended Collada fields or VSDL semantics).

Avatar scripts can request audio plugins as well.

Mix variants include echo, echo cancellation, reverb and compose.

Source variants include microphone, clip, media, Skype and streaming file.

Insert variants include panner, volume, iLBC, RCU, iPCM-wb, equalizer, LPF, HPF, AGC, Noise Cancellation, Error Concealment, Jitter Control, mute, delay, silence detection, comfort noise.

Stream Transport

STRAW uses a stream transport plugin to host sessions on a network. A Stream transports packets and provides reliability, authentication and encryption.

Time Service

The realtime scheduler 260 is interested in synchronizing time between client network nodes. For this purpose each client network node will synchronize with an internet time standard, such as SIS, NTP (Network Time Protocol), or ITS (Internet Time Service).

c. Plugin Class APIs

All Plugin class objects are based on Plug InVariant.

Encryption Algorithm

This plugin is based on PlugInVariant. It performs a block encryption algorithm including keying. This plugin is stateless except for the key i.e. each encryption is independent of any other.

Encryption::Ctor(algorithm, key)
Encryption::Encrypt(data, size, target)
Encryption::Decrypt(data, size, target)
Encryption::Dtor( )

Compression Algorithm

This plugin is based on PlugInVariant. It performs one or more lossless compression/decompression algorithms. It compresses is a continuous stream, and may keep an internal state table. The algorithm is restarted on each KeyFrame, which may include processing a "priming" block which is not emitted but contributes to the compression state.

Compression::Ctor(algorithm)
Compression::KeyFrame(preload)
Compression::Compress(data, size, target)
Compression::Decompress(data, size, target)
Compression::Dtor( )

Authentication Algorithm

This plugin is based on PlugInVariant. It accesses local credentials, and implements a client authentication state machine of one or more states. The authentication state machine does NOT control the communication link to the authentication server. It only processes messages and produces subsequent messages.

Authentication::Ctor(algorithm, credential)
Authentication::InitialState( )
Authentication::State(state)
Authentication::Advance(messageData, messageConsumer&)
Authentication::SessionKey(key&)
Authentication::Dtor( )

Credential

This plugin is based on PlugInVariant. It accesses platform-specific credential stores.

Credential::Ctor( )
Credentia:Select(index)
Credential::Accept(data, size, index&)
Credential::PrivateKey(key&)
Credential::PublicKey(key&)
Credential::Passphrase(passpharase&)
Credential::Dtor( )

Graphical Effects—Shader

This plugin is based on PlugInVariant. It affects 3D rendering.

The Shader API supports shaders (scripted procedural surface generators).

Shader::Ctor(gl&)
Shader::Initialize(format, size, mip, type, code, technique)
Shader::SetTextureParameters(texture)
Shader::SetTextureStream(idStream)
Shader::Render(pass)
Shader::Dtor( )

Graphical effects—Sampler

The Sampler API is based on PlugInVariant. It supports mapping texture to surfaces.

Sampler::Ctor(gl&)
Samplerinitialize(type, wrap, minFilter, magFilter, mipFilter, color, mipmap_maxLevel, mipmap_bias)
Sampler::Dtor( )

Physics Extension—Joint

This plugin is based on PlugInVariant. It extends the dynamics of motion.

The Joint API supports joint constraints and dynamics for avatar and artifact subassemblies.

Joint::Ctor(ode&, dimension, nUnbounded)
Joint::Initialize(body1, anchor1, orientation1, body2, anchor2, orientation2, axis, erp, cfm)
Joint::Torque(torque)
Joint::GetState(fps&, erp&, jLin1&, jAng1&, jLin2&, jAng2&, c&, cfm&, low&, high&)

Physics Extension—Collision

The Collision API is based on PlugInVariant. It supports rapidly calculating collision detection. In some embodiments, a collision plugin variant may implement the quadtree class dxSpace algorithm in the Open Dynamics Engine (ODE).

Collision::Ctor(ode&, space)
Collision::Step( )

Script Extension

This plugin is based on PlugInVariant. It supports execution of code supplied by the virtual area application. This code is in binary form and labeled by the language and the API the particular code definition supports. The plugin varies by language. It loads a particular code definition and calls it, supplying a native application runtime object appropriate for the API.

ScriptExtension::Ctor(sonar&)
ScriptExtension::Execute(code, api)
ScriptExtension::Dtor( )

Input Device Hostinq

This plugin is based on PlugInVariant. It supports user event capture (other than audio). This includes everything from a mouse to a video camera with facial recognition. The plugin generates user events to the queue.

InputDevice::Ctor(arg, queue)
InputDevice::Configure(arg)

Audio Mix

This plugin is based on AudioComponent. It combines two audio streams.

AudioMix::Ctor(audioSrc1, audioSrc2, param)
AudioMix::Configure(param)
AudioMix::Dtor( )

Audio Source

This plugin is based on AudioComponent. It provides a pollable audio stream.

AudioSource::Ctor( )
AudioSource::Configure(arg)
AudioSource::GetLatency(latency&)
AudioSource::Poll(data)

Audio Insert

This plugin is based on AudioComponent. It translates an audio stream. It may compress, decompress or simply modify the stream.

AudioInsert::Ctor(AudioSource&)
AudioInsertGetLatency(latency&)
AudioInsert::Process( )

Audio Send

This plugin is based on AudioComponent. It divides an audio stream into two equal streams (copies the stream). Any AudioSource can be routed to any other audio element.

AudioSend::Ctor(AudioSource&)
AudioSend::Dtor( )
AudioSend::Copy(data&)

Stream Transport

This plugin is based on PlugInVariant. An exemplary stream transport plugin variant supports an IP UDP transport with configurable authentication and encryption.

Transport::Ctor(port, station, session, encryption)
Transport::MTU( )
Transport::Hello( )
Transport::Challenge(credential)
Transport::Respond(challenge, encryption)
Transport::Response(response, encryption)
Transport::IdentifyingToken( )
Transport::IdentifyingToken(token)
Transport::Send(data, size, idChannel)
Transport::Receive(record)
Transport::Dtor( )

Time Service

This plugin is based on PlugInVariant. It synchronizes a client network node time with an Internet standard.

TimeSvc::Ctor( )
TimeSvc::Sync( )
TimeSvc::Dtor( )

VI. SODA DEFINITIONS

Session
IDStation1 GUID
IDStation2 GUID
IDSession GUID
SessionFailure
IDSession GUID
Reason long
Parameter long
Station
ID GUID
STRAW_Address IP, Port
STRAW_Transport [GUID]
Publish
IDClient GUID
IDServer GUID
IDChannel GUID
IDCompression [GUID]
Subscribe
IDClient GUID
IDServer GUID
IDChannel GUID
IDChannelIndex GUID
Reliable bit
Compressed bit
KeyFrameUser bit
IDCompression GUID
Preload text
StreamKeepAlive
IDSession GUID
Timeout long
Stream Failure
IDSession GUID
ChannelFailure
IDChannelIndex GUID
CommunicantState
IDSelf GUID
IDCommunicant GUID
State short
HID
IDDeviceClass GUID
IDDevice GUID
ID GUID
AudioParameter
ID GUID
IDParameter GUID
Value short
AudioDevice
IDDeviceClass GUID
IDDevice GUID
ID GUID
AreaSession
IDArea GUID
ID GUID
PhysicsCheckpoint
Location doubleX3
Velocity doubleX3
Acceleration doubleX3
Orientation doubleX3
Center Of Gravity doubleX4
Inertia Tensor doubleX3
Mass double
Zone
ID GUID
Shape Mesh
Origin doubleX3
Avatar [GUID]
AudioAperture
ID GUID
Radius double
Origin doubleX3
Orientation doubleX3
AudioObstruction
ID GUID
Radius double
Origin doubleX3
AudioReverb
ID GUID
Shape Mesh
Origin doubleX3
AudioMix
ID GUID
Type GUID
Variant GUID
Avatar GUID
Source1 GUID
Source2 GUID
AudioEffect
ID GUID
Type GUID
Variant GUID
Avatar GUID
Source1 GUID
AudioStream
IDAudio GUID
Avatar GUID
AudioCalculation
IDSource GUID
IDSink GUID
IDComponent GUID
IDOperation GUID
Param1 long
Param2 long
PlugIn
Type GUID
Name Text
ID GUID
API Supported [GUID]
UpgradeDependencyList
Base Installation GUID
Description Text Upgrade ID [GUID]
Upgrade
ID GUID
Offset long
Data [ ]
AudioRecord
ID GUID
IDAudio GUID
IDStore GUID
AudioPlayback
ID GUID
IDAudio GUID
IDStore GUID
NetworkDNS
Address String
NetworkProxy
Address String
DebugInfo
ID GUID
Statistic GUID
Reset Boolean
DebugTrap
ID GUID
Trap GUID
Rearm Boolean.
HID
IDKvm GUID
HID event

VII. CONCLUSION

The embodiments that are described herein provide a realtime kernel that supports the realtime communications between communicants operating on respective network nodes. The realtime kernel handles the complex tasks of connecting to communicants, virtual areas, and other network resources, switching those connections in response to user inputs, and mixing realtime data streams. The realtime kernel enables developers to focus on developing high-level communications functionality instead of low-level plumbing code. The realtime kernel imposes relatively low computational resource requirements so that realtime communications performance can be achieved using a wide range of currently available computing devices and network connections.

Other embodiments are within the scope of the claims.

The invention claimed is:

1. A method comprising:
administering realtime communications between network nodes respectively associated with communicants in a network communications environment, wherein administering the realtime communications comprises:
establishing a respective peer-to-peer session over a respective link with each of multiple network nodes in accordance with a connectionless transport protocol;
on behalf of one or more of the communicants, automatically opening one or more channels over which data is transmitted between the network nodes in the one or more respective peer-to-peer sessions, wherein each channel is identified by a respective unique identifier;
in response to a determination that one of the peer-to-peer sessions with a particular one of the network nodes has stopped, automatically attempting to establish another peer-to-peer session with the particular one of the network nodes in accordance with the connectionless transport protocol; and
in response to successful establishment of the other peer-to-peer session with the particular one of the network nodes, automatically opening one or more of the channels that previously were open in the prior respective session.

2. The method of claim 1 further comprising:
receiving real world data comprising one or more attributes defining a physical state of one or more of the communicants;
applying one or more conditions to the one or more attributes; and
based on results of the applying, changing a particular communicant's presence state in the network communications environment.

3. The method of claim 1, further comprising multiplexing respective ones of the channels across the respective links with the network nodes.

4. The method of claim 1, further comprising transmitting media records over the channels in packets that include respective headers comprising the unique channel identifiers.

5. The method of claim 1, further comprising, by the local network node, monitoring each of the peer-to-peer sessions independently of one another, and taking recovery action upon timeout or failure without closing the channels.

6. The method of claim 1, further comprising in the first session, by the local network node, maintaining for each network node a respective table identifying open ones of the channels and associating respective attribute values with the identified channels, wherein the establishing comprises, for each network node, determining a respective station definition assigned to the network node and the maintaining comprises storing the respective station definition in the table as an attribute of each of the open channels.

7. The method of claim 6, further comprising by the local network node, discovering for each network node a failure of the respective session, wherein the discovering comprises determining a current station definition assigned to the network node and determining that the respective session has failed in response to a determination that the respective station definition has changed.

8. The method of claim 6, wherein the determining comprises parsing a station definition record received from a respective one of the network nodes, wherein the station definition record comprises a set of fields, each of the fields is defined by a respective field type and an associated field value, and each of the field types is identified by a respective globally unique identifier (GUID).

9. The method of claim 1, further comprising by a local network node, recording attributes of local publish channels available from the local network node, local subscribe channels requested by the one or more software entities, remote publish channels available from one or more of the network nodes that are remote from the local network node, and remote subscribe channels requested by the remote network nodes.

10. The method of claim 9, wherein the recording comprises maintaining for each of the local publish channels a record comprising an identifier of one of the software entities indicating a capacity to publish data on the local publish channel, an identifier of at least one of the remote network nodes subscribing to the local publish channel, and an identifier of the local publish channel.

11. The method of claim 9, wherein the recording comprises maintaining for each of the local subscribe channels a record comprising an identifier of one of the software entities subscribing to the local subscribe channel, an identifier of a remote network node indicating a capacity to publish data on the local subscribe channel, an identifier of the local subscribe channel, and one or more network transport parameters associated with the local subscribe channel.

12. The method of claim 9, wherein the recording comprises maintaining for each of the remote publish channels a record comprising an identifier of at least one of the remote network nodes indicating a capacity to publish data on the remote publish channel, and an identifier of the remote publish channel.

13. The method of claim 9, wherein the recording comprises maintaining for each of the remote publish channels a record comprising an identifier of at least one of the remote network nodes indicating a capacity to publish data on the remote publish channel, and an identifier of the remote publish channel.

14. The method of claim 1, wherein the establishing comprises: ascertaining a definition of the session comprising an internet protocol (IP) address, a port address, and a globally unique identifier of a transport protocol; and sending the definition to the remote network node.

15. The method of claim 1, further comprising transmitting data between the particular one of the network nodes and a network node that is remote from the particular one of the network nodes on the one or more open channels in the first peer-to-peer session.

16. The method of claim 15, wherein the transmitting comprises transmitting media records containing media data comprising packets of renderable data, and transmitting configuration records containing configuration data comprising definitions of configuration settings.

17. The method of claim 16, wherein the transmitting comprises encapsulating media records and configuration records in transport records that are transmitted between the local network node and the remote network node in the first peer-to-peer session.

18. The method of claim 17, wherein the encapsulating comprises associating the transport records with identifiers of respective ones of the channels on which they are transmitted, encrypting the transport records, and sequencing the encrypted transport records.

19. The method of claim 18, further comprising by the particular one of the network nodes, receiving ones of the transport records transmitted from one of the network nodes that is remote from the particular one of the network nodes, wherein the receiving comprises decrypting the transport records and dispatching the media records and the configuration records contained in the decrypted transport records to subscribing ones of the software entities.

* * * * *